United States Patent
Wang et al.

(10) Patent No.: US 12,549,269 B2
(45) Date of Patent: Feb. 10, 2026

(54) RANDOM ACCESS METHOD AND APPARATUS, AND COMMUNICATION DEVICE

(71) Applicant: HUAWEI TECHNOLOGIES CO., LTD., Shenzhen (CN)

(72) Inventors: Zhou Wang, Shenzhen (CN); Lixia Xue, Beijing (CN); Yun Liu, Shenzhen (CN); Haibo Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 449 days.

(21) Appl. No.: 18/254,115

(22) PCT Filed: Nov. 23, 2021

(86) PCT No.: PCT/CN2021/132469
§ 371 (c)(1),
(2) Date: May 23, 2023

(87) PCT Pub. No.: WO2022/111477
PCT Pub. Date: Jun. 2, 2022

(65) Prior Publication Data
US 2023/0413338 A1    Dec. 21, 2023

(30) Foreign Application Priority Data

Nov. 24, 2020    (CN) .......................... 202011332311.X
Jan. 25, 2021    (CN) .......................... 202110096649.8

(51) Int. Cl.
*H04W 74/08*    (2024.01)
*H04B 17/318*    (2015.01)
(Continued)

(52) U.S. Cl.
CPC .......... *H04B 17/328* (2023.05); *H04W 24/08* (2013.01); *H04W 74/0833* (2013.01)

(58) Field of Classification Search
CPC ............... H04B 17/328; H04B 7/0617; H04W 24/08; H04W 74/0833; H04W 72/542; H04W 72/046; H04W 74/0866; H04W 72/23
See application file for complete search history.

(56) References Cited

U.S. PATENT DOCUMENTS

2019/0215749 A1*  7/2019  Shih .................. H04W 36/0069
2019/0280836 A1   9/2019  Bhattad et al.
(Continued)

FOREIGN PATENT DOCUMENTS

| CN | 110049557 A | 7/2019 |
| CN | 110859003 A | 3/2020 |
| WO | 2020027627 A1 | 2/2020 |

OTHER PUBLICATIONS

"3rd Generation Partnership Project; Technical Specification Group Radio Access Network; NR; Medium Access Control (MAC) protocol specification (Release 16)," 3GPP TS 38.321 V16.2.1, pp. 1-154, 3rd Generation Partnership Project, Valbonne, France (Sep. 2020).

(Continued)

*Primary Examiner* — Walli Z Butt
(74) *Attorney, Agent, or Firm* — Leydig, Voit & Mayer, Ltd.

(57) ABSTRACT

The method includes: receiving, by user equipment UE, supplementary uplink SUL configuration information, wherein the SUL configuration information comprises a plurality of SULs, a plurality of supplementary downlink SDLs respectively matching the plurality of SULs, and SDL measurement configuration information; measuring, by the UE, reference signal strength of the plurality of SDLs based on the SDL measurement configuration information; selecting, by the UE, at least one first SDL from the plurality of SDLs based on the reference signal strength of the plurality of SDLs, and selecting a second SDL from the at least one (Continued)

first SDL, wherein the second SDL has highest reference signal strength in the at least one first SDL; and initiating, by the UE, random access over an SUL corresponding to the second SDL.

20 Claims, 20 Drawing Sheets

(51) Int. Cl.
*H04W 24/08* (2009.01)
*H04W 74/0833* (2024.01)

(56) References Cited

U.S. PATENT DOCUMENTS

| | | | |
|---|---|---|---|
| 2020/0053799 A1* | 2/2020 | Jeon | H04L 5/0048 |
| 2020/0146059 A1 | 5/2020 | Cirik et al. | |
| 2022/0417804 A1* | 12/2022 | Freda | H04W 36/30 |
| 2024/0251396 A1* | 7/2024 | Choi | H04W 72/23 |

OTHER PUBLICATIONS

Huawei et al., "Discussion on the capability for SUL and SDL combinations," 3GPP TSG-RAN WG2 Meeting#103, Gothenburg, Sweden, R2-1812556, Total 2 pages, 3rd Generation Partnership Project, Valbonne, France (Aug. 20-24, 2018).

"3rd Generation Partnership Project; Technical Specification Group Radio Access Network; NR; Radio Resource Control (RRC) protocol specification (Release 16)," 3GPP TS 38.331 V16.2.0, pp. 1-921, 3rd Generation Partnership Project, Valbonne, France (Sep. 2020).

Nokia et al., "On UE capability xDD differentiation for SUL/SDL bands," 3GPP TSG-RAN4 Meeting #96-e, Electronic Meeting, R4-2009592, Total 4 pages, 3rd Generation Partnership Project, Valbonne, France (Aug. 17-28, 2020).

* cited by examiner

RANDOM ACCESS METHOD AND APPARATUS, AND COMMUNICATION DEVICE

CROSS-REFERENCE TO RELATED APPLICATIONS

This application is a national stage of International Application No. PCT/CN2021/132469, filed on Nov. 23, 2021, which claims priority to Chinese Patent Application No. 202110096649.8, filed on Jan. 25, 2021 and Chinese Patent Application No. 202011332311.X, filed on Nov. 24, 2021. All the aforementioned applications are hereby incorporated by reference in their entireties.

TECHNICAL FIELD

This application relates to the field of communication technologies, and in particular, to a random access method and apparatus, and a communication apparatus.

BACKGROUND

An SUL (Super Uplink/Supplementary Uplink, super uplink/supplementary uplink) is introduced to the 3rd generation partnership project (3GPP) new radio (NR) protocol. The SUL is mainly used to carry users at an NR coverage edge, and uplink coverage for a high-frequency NR may be supplemented by introducing the SUL. A terminal may perform uplink transmission over a normal uplink (NUL) or the SUL. When coverage of an uplink carrier deteriorates, the terminal may perform switching over the NUL to the SUL.

With development of network technologies, in 5th generation (5G) mobile communication new radio (NR) standardization work, an NR supports frequency bands from below 6 GHz to 60 GHz. Usually, frequency bands below 3 Ghz are mainly used for deploying a long term evolution (LTE) carrier, and frequency bands above 3 Ghz are mainly used for deploying an NR carrier.

In an actual use process, to make full use of an uplink resource on the LTE carrier, uplink transmission in the NR and uplink transmission in LTE may share the uplink resource on the LTE carrier. The shared uplink resource that is on the LTE carrier and that can be used for the uplink transmission in the NR may be referred to as a supplementary uplink resource on the NR carrier.

SUMMARY

In view of this, a random access method and apparatus, and a communication device are proposed.

According to a first aspect, an embodiment of this application provides a random access method. The method includes: A first network device sends, to user equipment UE by using a normal downlink NDL beam, supplementary uplink SUL configuration information corresponding to the NDL beam, where the SUL configuration information includes an SUL identifier of at least one SUL and at least one SUL threshold, and different NDL beams correspond to different SUL configuration information, where the at least one SUL is an SUL provided by a second network device; and the SUL identifier of the at least one SUL includes a first SUL identifier, and the at least one SUL threshold includes a first SUL threshold corresponding to the first SUL identifier, so that when the UE measures reference signal strength corresponding to the NDL beam, if the reference signal strength is less than the first SUL threshold, the UE initiates random access over a first SUL corresponding to the first SUL identifier.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access. Different SULs are distinguished from each other by using different beams. According to the random access method provided in this embodiment of this application, a technical problem that different SULs cannot be distinguished from each other by using a single RSRP threshold can be resolved.

In a first possible implementation of the first aspect, the SUL configuration information includes SUL identifiers of a plurality of SULs and a plurality of SUL thresholds, and the SUL configuration information further includes one or a combination of the following parameters of each SUL: a first validity identifier and priority information; and/or the NDL beam further includes an SSB index, different NDL beams include different SSB indexes, and the SSB index indicates an SUL used to initiate random access. The SUL may be flexibly configured with reference to the validity identifier, the priority information, and the SSB index, so that the UE may select the accessed SUL based on different scenarios.

With reference to the first aspect or the first possible implementation of the first aspect, in a second possible implementation, the SUL configuration information further includes a second validity identifier of the SUL threshold. In an area not covered by the SUL, in a SIB of the NDL beam sent by the first network device, the SUL threshold included in the SUL configuration information may be invalid. In this way, the UE may initiate the random access over the NUL. This may be used to distinguish between an area covered by the SUL and the area not covered by the SUL, to resolve a problem that the area not covered by the SUL cannot be distinguished by using a single RSRP threshold.

According to a second aspect, an embodiment of this application provides a random access method. The method includes: User equipment UE receives a normal downlink NDL beam sent by a first network device, where the NDL beam includes supplementary uplink SUL configuration information corresponding to the NDL beam, and the SUL configuration information includes an SUL identifier of at least one SUL and at least one SUL threshold, where the NDL beam is a beam sent by the first network device, and the at least one SUL is an SUL provided by a second network device; and the SUL identifier of the at least one SUL includes a first SUL identifier, and the at least one SUL threshold includes a first SUL threshold corresponding to the first SUL identifier. The UE measures reference signal strength corresponding to the NDL beam. If the reference signal strength is less than the first SUL threshold, the UE initiates random access over a first SUL corresponding to the first SUL identifier.

In a first possible implementation of the second aspect, NDL beams received by the UE in different areas are different, and different NDL beams include different SUL configuration information.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access. Different SULs are distinguished from each other by using different beams. According to the random access method provided in this embodiment of this application, a technical problem that different SULs cannot be distinguished from each other by using a single RSRP threshold can be resolved.

In a second possible implementation of the second aspect, the first network device is a base station, a small cell, or another user equipment.

With reference to the second aspect, or the first possible implementation or the second possible implementation of the second aspect, in a third possible implementation, the SUL configuration information includes SUL identifiers of a plurality of SULs and a plurality of SUL thresholds, and the SUL configuration information further includes a first validity identifier and/or priority information of each SUL; and the SUL corresponding to the first SUL identifier has a valid first validity identifier and/or a highest priority.

With reference to the second aspect or the third possible implementation of the second aspect, in a fourth possible implementation, the SUL configuration information includes SUL identifiers of a plurality of SULs and a plurality of SUL thresholds, the NDL beam further includes an SSB index, different NDL beams received by the UE include different SSB indexes, and the SSB index indicates the first SUL.

With reference to the fourth possible implementation of the second aspect, in a fifth possible implementation, the first SUL identifier is a remainder between a value of the SSB index and a total quantity of the plurality of SULs, or the first SUL identifier is a value of the SSB index.

The SUL may be flexibly configured with reference to the validity identifier, the priority information, and the SSB index, so that the UE may select the accessed SUL based on different scenarios.

With reference to the second aspect, or any one of the third to fifth possible implementations of the second aspect, in a sixth possible implementation, the SUL configuration information further includes a second validity identifier of the at least one SUL threshold, and the method further includes: initiating random access over the NUL if the second validity identifier of the SUL threshold is invalid or the SUL threshold is 0 or a negative value.

In an area not covered by the SUL, in a SIB of the NDL beam sent by the first network device, the SUL threshold included in the SUL configuration information may be invalid. In this way, the UE may initiate the random access over the NUL. This may be used to distinguish between an area covered by the SUL and the area not covered by the SUL, to resolve a problem that the area not covered by the SUL cannot be distinguished by using a single RSRP threshold.

According to a third aspect, an embodiment of this application provides a random access apparatus, applied to a first network device. The apparatus includes: a sending module, configured to send, to user equipment UE by using a normal downlink NDL beam, supplementary uplink SUL configuration information corresponding to the NDL beam, where the SUL configuration information includes an SUL identifier of at least one SUL and at least one SUL threshold, and different NDL beams correspond to different SUL configuration information, where the at least one SUL is an SUL provided by a second network device; and the SUL identifier of the at least one SUL includes a first SUL identifier, and the at least one SUL threshold includes a first SUL threshold corresponding to the first SUL identifier, so that when the UE measures reference signal strength corresponding to the NDL beam, if the reference signal strength is less than the first SUL threshold, the UE initiates random access over a first SUL corresponding to the first SUL identifier.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access. Different SULs are distinguished from each other by using different beams. According to the random access apparatus provided in this embodiment of this application, a technical problem that different SULs cannot be distinguished from each other by using a single RSRP threshold can be resolved.

In a first possible implementation of the third aspect, the SUL configuration information includes SUL identifiers of a plurality of SULs and a plurality of SUL thresholds, and the SUL configuration information further includes one or a combination of the following parameters of each SUL: a first validity identifier and priority information; and/or the NDL beam further includes an SSB index, different NDL beams include different SSB indexes, and the SSB index indicates an SUL used to initiate random access. The SUL may be flexibly configured with reference to the validity identifier, the priority information, and the SSB index, so that the UE may select the accessed SUL based on different scenarios.

With reference to the third aspect or the first possible implementation of the third aspect, in a second possible implementation, the SUL configuration information further includes a second validity identifier of the SUL threshold. In an area not covered by the SUL, in a SIB of the NDL beam sent by the first network device, the SUL threshold included in the SUL configuration information may be invalid. In this way, the UE may initiate the random access over the NUL. This may be used to distinguish between an area covered by the SUL and the area not covered by the SUL, to resolve a problem that the area not covered by the SUL cannot be distinguished by using a single RSRP threshold. According to a fourth aspect, an embodiment of this application provides a random access apparatus, which may be applied to user equipment UE. The apparatus includes:

a second receiving module, configured to receive a normal downlink NDL beam sent by a first network device, where the NDL beam includes supplementary uplink SUL configuration information corresponding to the NDL beam, and the SUL configuration information includes an SUL identifier of at least one SUL and at least one SUL threshold, where the NDL beam is a beam sent by the first network device, and the at least one SUL is an SUL provided by a second network device; and the SUL identifier of the at least one SUL includes a first SUL identifier, and the at least one SUL threshold includes a first SUL threshold corresponding to the first SUL identifier; a third measurement module, configured to measure reference signal strength corresponding to the NDL beam; and a first access module, configured to: if the reference signal strength is less than the first SUL threshold, initiate random access over a first SUL corresponding to the first SUL identifier.

In a first possible implementation of the fourth aspect, NDL beams received by the UE in different areas are different, and different NDL beams include different SUL configuration information.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access. Different SULs are distinguished from each other by using different beams. According to the random access apparatus provided in this embodiment of this application, a technical problem that different SULs cannot be distinguished from each other by using a single RSRP threshold can be resolved.

In a second possible implementation of the fourth aspect, the first network device is a base station, a small cell, or another user equipment.

With reference to the fourth aspect, or the first possible implementation or the second possible implementation of the fourth aspect, in a third possible implementation, the SUL configuration information includes SUL identifiers of a plurality of SULs and a plurality of SUL thresholds, and the SUL configuration information further includes a first validity identifier and/or priority information of each SUL; and the SUL corresponding to the first SUL identifier has a valid first validity identifier and/or a highest priority.

With reference to the fourth aspect or the third possible implementation of the fourth aspect, in a fourth possible implementation, the SUL configuration information includes SUL identifiers of a plurality of SULs and a plurality of SUL thresholds, the NDL beam further includes an SSB index, different NDL beams received by the UE include different SSB indexes, and the SSB index indicates the first SUL.

With reference to the fourth possible implementation of the fourth aspect, in a fifth possible implementation, the first SUL identifier is a remainder between a value of the SSB index and a total quantity of the plurality of SULs, or the first SUL identifier is a value of the SSB index.

The SUL may be flexibly configured with reference to the validity identifier, the priority information, and the SSB index, so that the UE may select the accessed SUL based on different scenarios.

With reference to the fourth aspect, or the third to fifth possible implementations of the fourth aspect, in a sixth possible implementation, the SUL configuration information further includes a second validity identifier of the at least one SUL threshold, and the apparatus further includes: a second access module, configured to initiate random access over the NUL if the second validity identifier of the SUL threshold is invalid or the SUL threshold is 0 or a negative value. In an area not covered by the SUL, in a SIB of the NDL beam sent by the first network device, the SUL threshold included in the SUL configuration information may be invalid. In this way, the UE may initiate the random access over the NUL. This may be used to distinguish between an area covered by the SUL and the area not covered by the SUL, to resolve a problem that the area not covered by the SUL cannot be distinguished by using a single RSRP threshold.

According to a fifth aspect, an embodiment of this application provides a random access method. The method includes: A network device sends supplementary uplink SUL configuration information to user equipment UE, where the SUL configuration information includes a plurality of SULs, a plurality of supplementary downlink SDLs respectively matching the plurality of SULs, and SDL measurement configuration information, so that the user equipment UE measures reference signal strength of the plurality of SDLs based on the SDL measurement configuration information, and initiates random access over an SUL corresponding to a second SDL, where the second SDL has highest reference signal strength in at least one first SDL, and the at least one first SDL is selected by the UE from the plurality of SDLs based on the reference signal strength of the plurality of SDLs.

The plurality of SULs and the plurality of SDLs in pairs (a plurality of pairs of SULs and SDLs) and the SDL measurement configuration information corresponding to the SDLs are configured, so that the UE may measure the reference signal strength of the SDLs based on the SDL measurement configuration information, and select the SUL based on the reference signal strength of the SDLs to initiate the random access. In this way, the UE may distinguish between different SULs according to a selection policy, and a technical problem that different SULs cannot be distinguished from each other by using a single RSRP threshold can be resolved.

In a first possible implementation of the fifth aspect, that a network device sends SUL configuration information to UE includes: The network device omnidirectionally broadcasts the SUL configuration information.

With reference to the first possible implementation of the fifth aspect, in a second possible implementation, the SUL configuration information further includes: a normal downlink NDL threshold and/or a plurality of SDL thresholds.

With reference to the NDL threshold, a distance from the UE to the network device that provides an NUL resource can be more accurately determined, and a more appropriate UL is selected to initiate the random access. With reference to the SDL thresholds, some SULs that cannot provide services can be filtered out, and a finally accessed SUL may be selected from SULs that can provide the services. This can improve access efficiency.

In a third possible implementation of the fifth aspect, that a network device sends SUL configuration information to UE includes: The network device sends, to the UE by using an NDL beam, SUL configuration information corresponding to the NDL beam, where the SUL configuration information corresponding to the NDL beam includes one SUL, one SDL matching the SUL, and SDL measurement configuration information, where different NDL beams correspond to different SUL configuration information.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access. According to the random access method in this application, a technical problem that different SULs cannot be distinguished from each other by using a single RSRP threshold can be resolved.

With reference to the third possible implementation of the fifth aspect, in a fourth possible implementation, the SUL configuration information corresponding to the NDL beam further includes: an NDL threshold and/or an SDL threshold.

With reference to the NDL threshold, a distance from the UE to the network device that provides an NUL resource can be more accurately determined, and a more appropriate UL is selected to initiate the random access. With reference to the SDL thresholds, some SULs that cannot provide services can be filtered out, and a finally accessed SUL may be selected from SULs that can provide the services. This can improve access efficiency.

In a fifth possible implementation of the fifth aspect, that a network device sends SUL configuration information to UE includes: The network device sends, to the UE by using an NDL beam, SUL configuration information corresponding to the NDL beam, where the SUL configuration information corresponding to the NDL beam includes a plurality of SUL, a plurality of SDLs respectively matching the plurality of SULs, and SDL measurement configuration information; and the NDL beam further includes an SSB index, different NDL beams include different SSB indexes, and the SSB index indicates an SUL used to initiate random access; and/or the SUL configuration information corresponding to the NDL beam further includes one or a combination of the following parameters of each SUL: a validity identifier and priority information.

The SUL may be flexibly configured with reference to the validity identifier, the priority information, and the SSB index, so that the UE may select the accessed SUL based on different scenarios.

With reference to the fifth possible implementation of the fifth aspect, in a sixth possible implementation, the SUL configuration information corresponding to the NDL beam further includes: an NDL threshold and/or an SDL threshold.

According to a sixth aspect, an embodiment of this application provides a random access method. The method includes: User equipment UE receives supplementary uplink SUL configuration information sent by the network device in the fifth aspect, where the SUL configuration information includes a plurality of SULs, a plurality of supplementary downlink SDLs respectively matching the plurality of SULs, and SDL measurement configuration information. The UE measures reference signal strength of the plurality of SDLs based on the SDL measurement configuration information. The UE selects at least one first SDL from the plurality of SDLs based on the reference signal strength of the plurality of SDLs, and selects a second SDL from the at least one first SDL, where the second SDL has highest reference signal strength in the at least one first SDL. The UE initiates random access over an SUL corresponding to the second SDL.

The first network device configures the plurality of SULs and the plurality of SDLs in pairs (a plurality of pairs of SULs and SDLs) and the SDL measurement configuration information corresponding to the SDLs, so that the UE may measure the reference signal strength of the SDLs based on the SDL measurement configuration information, and select the SUL based on the reference signal strength of the SDLs to initiate the random access. In this way, the UE may distinguish between different SULs according to a selection policy, and a technical problem that different SULs cannot be distinguished from each other by using a single RSRP threshold can be resolved.

In a first possible implementation of the sixth aspect, that UE receives SUL configuration information includes: The UE receives a normal downlink NDL beam, where the NDL beam includes SUL configuration information corresponding to the NDL beam, and the SUL configuration information corresponding to the NDL beam includes one SUL, one SDL matching the one SUL, and SDL measurement configuration information.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access. According to the random access method in this application, a technical problem that different SULs cannot be distinguished from each other by using a single RSRP threshold can be resolved.

With reference to the first possible implementation of the sixth aspect, in a second possible implementation, the SUL configuration information corresponding to the NDL beam includes a plurality of SULs, a plurality of SDLs respectively matching the plurality of SULs, and SDL measurement configuration information; and the NDL beam further includes an SSB index, different NDL beams include different SSB indexes, and the SSB index indicates an SUL used to initiate random access; and/or the SUL configuration information corresponding to the NDL beam further includes one or a combination of the following parameters of each SUL: a validity identifier and priority information.

With reference to the second possible implementation of the sixth aspect, in a third possible implementation, that the UE selects at least one first SDL from the plurality of SDLs based on the reference signal strength of the plurality of SDLs includes: The UE selects the at least one first SDL from the plurality of SDLs based on the reference signal strength of the plurality of SDLs and one or a combination of the following parameters: the SSB index, the validity identifier, and the priority information, where an SUL corresponding to the first SDL is the SUL indicated by the SSB index, and has a valid validity identifier or a highest priority. The SUL may be flexibly configured with reference to the validity identifier, the priority information, and the SSB index, so that the UE may select the accessed SUL based on different scenarios.

In a fourth possible implementation of the sixth aspect, that UE receives SUL configuration information includes: The UE receives the SUL configuration information broadcast by the network device in the fifth aspect.

With reference to the sixth aspect, or any one of the first to fourth possible implementations of the sixth aspect, in a fifth possible implementation, the SUL configuration information further includes NDL measurement configuration information, and the method further includes: The UE measures reference signal strength of a normal downlink NDL. That the UE selects at least one first SDL from the plurality of SDLs based on the reference signal strength of the plurality of SDLs includes: The UE selects the at least one first SDL from the plurality of SDLs based on the reference signal strength of the plurality of SDLs and the reference signal strength of the NDL, where reference signal strength of the at least one first SDL is greater than the reference signal strength of the NDL.

With reference to the fifth possible implementation of the sixth aspect, in a sixth possible implementation, the method further includes: The UE initiates random access over the NUL if the reference signal strength of the plurality of SDLs is not measured, or the measured reference signal strength of the plurality of SDLs is less than or equal to the reference signal strength of the NDL, and the reference signal strength of the NDL is measured.

With reference to the sixth aspect, or any one of the first to fourth possible implementations of the sixth aspect, in a seventh possible implementation, the SUL configuration information further includes an NDL threshold, and the method further includes: The UE measures reference signal strength of a normal downlink NDL, where when the reference signal strength of the NDL is less than the NDL threshold, an SDL whose reference signal strength is measured is the at least one first SDL.

With reference to the seventh possible implementation of the sixth aspect, in an eighth possible implementation, the method further includes: If the reference signal strength of the NDL is not less than the NDL threshold, the UE initiates random access over the NUL. If the reference signal strength of the plurality of SDLs is not measured, and the reference signal strength of the NDL is measured, the UE initiates the random access over the NUL.

With reference to the sixth aspect, or any one of the first to fourth possible implementations of the sixth aspect, in a ninth possible implementation, the SUL configuration information further includes an NDL threshold and SDL thresholds corresponding to the SDLs, and the method further includes: The UE measures reference signal strength of a normal downlink NDL. When reference signal strength of the at least one first SDL is greater than the corresponding SDL threshold, the selecting a second SDL from the at least one first SDL includes: If the reference signal strength of the NDL is less than the NDL threshold, the UE selects the second SDL with the highest reference signal strength from the at least one first SDL to initiate random access.

With reference to the ninth possible implementation of the sixth aspect, in a tenth possible implementation, the method further includes: If the reference signal strength of the plurality of SDLs is not measured, or the measured reference signal strength of the plurality of SDLs is less than or equal to the corresponding SDL thresholds, and the reference signal strength of the NDL is measured, the UE initiates random access over an NUL. If the reference signal of the NDL is greater than or equal to the NDL threshold, the UE initiates the random access over the NUL. With reference to the sixth aspect, or any one of the first to fourth possible implementations of the sixth aspect, in an eleventh possible implementation, the SUL configuration information includes SDL thresholds corresponding to the SDLs, and the method further includes: The UE measures reference signal strength of a normal downlink NDL. That the UE selects at least one first SDL from the plurality of SDLs based on the reference signal strength of the plurality of SDLs includes: The UE selects the at least one first SDL from the plurality of SDLs based on the reference signal strength of the plurality of SDLs, the SDL thresholds, and the reference signal strength of the NDL, where reference signal strength of the at least one first SDL is greater than corresponding SDL thresholds, and is greater than the reference signal strength of the NDL.

With reference to the eleventh possible implementation of the sixth aspect, in a twelfth possible implementation, the method further includes: The UE initiates random access over the NUL if the reference signal strength of the plurality of SDLs is not measured, or the measured reference signal strength of the plurality of SDLs is less than or equal to the corresponding SDL thresholds, or the measured reference signal strength of the plurality of SDLs is less than reference signal strength of the NDL, and the reference signal strength of the NDL is measured.

With reference to the NDL threshold, a distance from the UE to the network device that provides an NUL resource can be more accurately determined, and a more appropriate UL is selected to initiate the random access. With reference to the SDL thresholds, some SULs that cannot provide services can be filtered out, and a finally accessed SUL may be selected from SULs that can provide the services. This can improve access efficiency.

According to a seventh aspect, an embodiment of this application provides a random access apparatus, applied to a network device. The apparatus includes: a configuration module, configured to send supplementary uplink SUL configuration information to user equipment UE, where the SUL configuration information includes a plurality of SULs, a plurality of supplementary downlink SDLs respectively matching the plurality of SULs, and SDL measurement configuration information, so that the user equipment UE measures reference signal strength of the plurality of SDLs based on the SDL measurement configuration information, and initiates random access over an SUL corresponding to a second SDL, where the second SDL has highest reference signal strength in at least one first SDL, and the at least one first SDL is selected by the UE from the plurality of SDLs based on the reference signal strength of the plurality of SDLs.

The first network device configures the plurality of SULs and the plurality of SDLs in pairs (a plurality of pairs of SULs and SDLs) and the SDL measurement configuration information corresponding to the SDLs, so that the UE may measure the reference signal strength of the SDLs based on the SDL measurement configuration information, and select the SUL based on the reference signal strength of the SDLs to initiate the random access. In this way, the UE may distinguish between different SULs according to a selection policy, and a technical problem that different SULs cannot be distinguished from each other by using a single RSRP threshold can be resolved.

In a first possible implementation of the seventh aspect, the configuration module includes: a broadcast unit, configured to omnidirectionally broadcast the SUL configuration information.

With reference to the first possible implementation of the seventh aspect, in a second possible implementation, the SUL configuration information further includes: a normal downlink NDL threshold and/or a plurality of SDL thresholds.

With reference to the NDL threshold, a distance from the UE to the network device that provides an NUL resource can be more accurately determined, and a more appropriate UL is selected to initiate the random access. With reference to the SDL thresholds, some SULs that cannot provide services can be filtered out, and a finally accessed SUL may be selected from SULs that can provide the services. This can improve access efficiency.

In a third possible implementation of the seventh aspect, the configuration module includes: a first sending unit, configured to send, to the UE by using an NDL beam, SUL configuration information corresponding to the NDL beam, where the SUL configuration information corresponding to the NDL beam includes one SUL, one SDL matching the SUL, and SDL measurement configuration information, where different NDL beams correspond to different SUL configuration information.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access. According to the random access apparatus in this application, a technical problem that different SULs cannot be distinguished from each other by using a single RSRP threshold can be resolved.

With reference to the third possible implementation of the seventh aspect, in a fourth possible implementation, the SUL configuration information corresponding to the NDL beam further includes: an NDL threshold and/or an SDL threshold. With reference to the NDL threshold, a distance from the UE to the network device that provides an NUL resource can be more accurately determined, and a more appropriate UL is selected to initiate the random access. With reference to the SDL thresholds, some SULs that cannot provide services can be filtered out, and a finally accessed SUL may be selected from SULs that can provide the services. This can improve access efficiency.

In a fifth possible implementation of the seventh aspect, the configuration module includes: a second sending unit, configured to send, by using an NDL beam, SUL configuration information corresponding to the NDL beam, where the SUL configuration information corresponding to the NDL beam includes a plurality of SUL, a plurality of SDLs respectively matching the plurality of SULs, and SDL measurement configuration information; and the NDL beam further includes an SSB index, different NDL beams include different SSB indexes, and the SSB index indicates an SUL used to initiate random access; and/or the SUL configuration information corresponding to the NDL beam further includes one or a combination of the following parameters of each SUL: a validity identifier and priority information. The SUL may be flexibly configured with reference to the validity identifier, the priority information, and the SSB index, so that the UE may select the accessed SUL based on different scenarios.

With reference to the fifth possible implementation of the seventh aspect, in a sixth possible implementation, the SUL configuration information corresponding to the NDL beam further includes: an NDL threshold and/or an SDL threshold.

According to an eighth aspect, an embodiment of this application provides a random access apparatus, applied to user equipment UE. The apparatus includes: a first receiving module, configured to receive supplementary uplink SUL configuration information sent by the network device in the seventh aspect, where the SUL configuration information includes a plurality of SULs, a plurality of supplementary downlink SDLs respectively matching the plurality of SULs, and SDL measurement configuration information; a first measurement module, configured to measure reference signal strength of the plurality of SDLs based on the SDL measurement configuration information; a selection module, configured to select at least one first SDL from the plurality of SDLs based on the reference signal strength of the plurality of SDLs, and select a second SDL from the at least one first SDL, where the second SDL has highest reference signal strength in the at least one first SDL; and a first access module, configured to initiate random access over an SUL corresponding to the second SDL.

The first network device configures the plurality of SULs and the plurality of SDLs in pairs (a plurality of pairs of SULs and SDLs) and the SDL measurement configuration information corresponding to the SDLs, so that the UE may measure the reference signal strength of the SDLs based on the SDL measurement configuration information, and select the SUL based on the reference signal strength of the SDLs to initiate the random access. In this way, the UE may distinguish between different SULs according to a selection policy, and a technical problem that different SULs cannot be distinguished from each other by using a single RSRP threshold can be resolved.

In a first possible implementation of the eighth aspect, the first receiving module includes: a first receiving unit, configured to receive a normal downlink NDL beam, where the NDL beam includes SUL configuration information corresponding to the NDL beam, and the SUL configuration information corresponding to the NDL beam includes one SUL, one SDL matching the one SUL, and SDL measurement configuration information.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access. According to the random access apparatus in this application, a technical problem that different SULs cannot be distinguished from each other by using a single RSRP threshold can be resolved.

With reference to the first possible implementation of the eighth aspect, in a second possible implementation, the SUL configuration information corresponding to the NDL beam includes a plurality of SULs, a plurality of SDLs respectively matching the plurality of SULs, and SDL measurement configuration information; and the NDL beam further includes an SSB index, different NDL beams include different SSB indexes, and the SSB index indicates an SUL used to initiate random access; and/or the SUL configuration information corresponding to the NDL beam further includes one or a combination of the following parameters of each SUL: a validity identifier and priority information.

With reference to the second possible implementation of the eighth aspect, in a third possible implementation, the selection module includes: a first selection unit, configured to select the at least one first SDL from the plurality of SDLs based on the reference signal strength of the plurality of SDLs and one or a combination of the following parameters: the SSB index, the validity identifier, and the priority information, where an SUL corresponding to the first SDL is the SUL indicated by the SSB index, and has a valid validity identifier or a highest priority.

The SUL may be flexibly configured with reference to the validity identifier, the priority information, and the SSB index, so that the UE may select the accessed SUL based on different scenarios.

In a fourth possible implementation of the eighth aspect, the first receiving module includes: a second receiving unit, configured to receive the SUL configuration information broadcast by the network device.

With reference to the eighth aspect, or any one of the first to fourth possible implementations of the eighth aspect, in a fifth possible implementation, the SUL configuration information further includes NDL measurement configuration information, and the apparatus further includes: a second measurement module, configured to measure reference signal strength of a normal downlink NDL. The selection module includes: a second selection unit, configured to select the at least one first SDL from the plurality of SDLs based on the reference signal strength of the plurality of SDLs and the reference signal strength of the NDL, where reference signal strength of the at least one first SDL is greater than the reference signal strength of the NDL.

With reference to the fifth possible implementation of the eighth aspect, in a sixth possible implementation, the apparatus further includes: a second access module, configured to initiate random access over the NUL if the reference signal strength of the plurality of SDLs is not measured, or the measured reference signal strength of the plurality of SDLs is less than or equal to the reference signal strength of the NDL, and the reference signal strength of the NDL is measured.

With reference to the eighth aspect, or any one of the first to fourth possible implementations of the eighth aspect, in a seventh possible implementation, the SUL configuration information further includes an NDL threshold, and the apparatus further includes: a second measurement module, configured to measure reference signal strength of a normal downlink NDL. When the reference signal strength of the NDL is less than the NDL threshold, an SDL whose reference signal strength is measured is the at least one first SDL.

With reference to the seventh possible implementation of the eighth aspect, in an eighth possible implementation, the apparatus further includes: a second access module, configured to initiate random access over the NUL if the reference signal strength of the NDL is not less than the NDL threshold. If the reference signal strength of the plurality of SDLs is not measured, and the reference signal strength of the NDL is measured, the UE initiates the random access over the NUL.

With reference to the eighth aspect, or any one of the first to fourth possible implementations of the eighth aspect, in a ninth possible implementation, the SUL configuration information further includes an NDL threshold and SDL thresholds corresponding to the SDLs, and the apparatus further includes: a second measurement module, configured to measure reference signal strength of a normal downlink NDL. When reference signal strength of the at least one first SDL is greater than the corresponding SDL threshold, the selection module includes: a third selection unit, configured to, if the reference signal strength of the NDL is less than the NDL threshold, select the second SDL with the highest reference signal strength from the at least one first SDL.

With reference to the ninth possible implementation of the eighth aspect, in a tenth possible implementation, the apparatus further includes: a second access module, configured to initiate random access over the NUL if the reference signal strength of the plurality of SDLs is not measured, or the measured reference signal strength of the plurality of SDLs is less than or equal to the corresponding SDL thresholds, and the reference signal strength of the NDL is measured.

With reference to the eighth aspect, or any one of the first to fourth possible implementations of the eighth aspect, in an eleventh possible implementation, the SUL configuration information includes SDL thresholds corresponding to the SDLs, and the apparatus further includes: a second measurement module, configured to measure reference signal strength of a normal downlink NDL. The selection module includes: a fourth selection unit, configured to select the at least one first SDL from the plurality of SDLs based on the reference signal strength of the plurality of SDLs, the SDL thresholds, and the reference signal strength of the NDL, where reference signal strength of the at least one first SDL is greater than corresponding SDL thresholds, and is greater than the reference signal strength of the NDL.

With reference to the eleventh possible implementation of the eighth aspect, in a twelfth possible implementation, the apparatus further includes: a second access module, configured to initiate random access over the NUL if the reference signal strength of the plurality of SDLs is not measured, or the measured reference signal strength of the plurality of SDLs is less than or equal to the corresponding SDL thresholds, or the measured reference signal strength of the plurality of SDLs is less than reference signal strength of the NDL, and the reference signal strength of the NDL is measured.

With reference to the NDL threshold, a distance from the UE to the network device that provides an NUL resource can be more accurately determined, and a more appropriate UL is selected to initiate the random access. With reference to the SDL thresholds, some SULs that cannot provide services can be filtered out, and a finally accessed SUL may be selected from SULs that can provide the services. This can improve access efficiency.

According to a ninth aspect, an embodiment of this application provides a terminal device. The terminal device may perform the random access method according to the second aspect or one or more of a plurality of possible implementations of the second aspect.

According to a tenth aspect, an embodiment of this application provides a terminal device. The terminal device may perform the random access method according to the fourth aspect or one or more of a plurality of possible implementations of the fourth aspect.

According to an eleventh aspect, an embodiment of this application provides a computer program product, including computer-readable code or a nonvolatile computer-readable storage medium carrying computer-readable code. When the computer-readable code is run in an electronic device, a processor in the electronic device performs the random access method according to the first aspect or one or more of the possible implementations of the first aspect.

According to a twelfth aspect, an embodiment of this application provides a computer program product, including computer-readable code or a nonvolatile computer-readable storage medium carrying computer-readable code. When the computer-readable code is run in an electronic device, a processor in the electronic device performs the random access method according to the third aspect or one or more of the possible implementations of the third aspect.

These aspects and other aspects of this application are more concise and more comprehensive in descriptions of the following (a plurality of) embodiments.

BRIEF DESCRIPTION OF DRAWINGS

The accompanying drawings included in this specification and constituting a part of this specification and this specification jointly show example embodiments, features, and aspects of this application, and are intended to explain principles of this application.

DESCRIPTION OF EMBODIMENTS

Figure 1A:
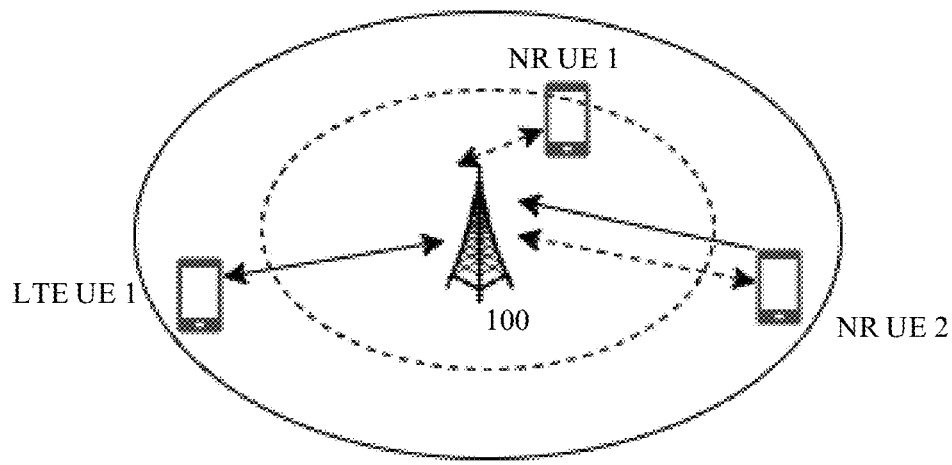
FIG. 1A is an example diagram of a communication scenario according to an embodiment of this application.

The following describes various example embodiments, features, and aspects of this application in detail with reference to the accompanying drawings. Same reference numerals in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, an embodiment, or an illustration". Any embodiment described as "example" is not necessarily explained as being superior or better than other embodiments.

In addition, to better describe this application, numerous specific details are provided in the following specific implementations. A person skilled in the art should understand that this application can also be implemented without some specific details. In some examples, methods, means, elements, and circuits that are well-known to a person skilled in the art are not described in detail, so that the subject matter of this application is highlighted.

Explanation of Terms

LTE (long term evolution) is a wireless communication technology standard, and mainly includes two mainstream modes: TDD (time division duplex) and FDD (frequency division duplex).

NR (new radio) is anew air radio interface developed for 5G. The air radio interface is a radio frequency part of a loop between a mobile device and an active base station. The active base stations can be continuously switched when a user moves.

UE (user equipment) is a terminal device, or a user terminal in mobile communication, and is, for example, a smartphone, a netbook, a tablet computer, a notebook computer, a wearable electronic device (such as a smart band or a smart watch), a TV, a virtual reality device, a speaker, or an electronic ink.

An eNB/eNodeB (evolved NodeB), a network device, or a 4G base station is a radio base station in an LTE network, is also a network element in an LTE radio access network.

The eNB/eNodeB is responsible for air interface-related functions: a radio link maintenance function, including maintenance of a radio link with a terminal and protocol conversion between radio link data and IP data; a radio resource management function, including establishment and release of a radio link, radio resource scheduling and allocation, and the link; some mobility management functions, including terminal configuration for measurement, terminal radio link quality evaluation, determining of cell handover for a terminal, and the like.

A gNB (next Generation NodeB), an NR NodeB, a new radio network device, and a 5G base station are provided.

RSRP (reference signal received power) is a key parameter that can represent radio signal strength in the LTE network and is one of physical layer measurement requirements.

An NUL (normal uplink) is provided, where an NR technology provides an uplink resource.

An NDL (normal downlink) is provided, where an NR technology provides a downlink resource.

An SUL (super uplink/supplementary uplink), is used to carry users at an NR coverage edge and supplement the NUL.

An SDL (supplementary downlink) is configured in pairs with the SUL.

A SIB (system information block) constitutes system information. The system information is cell-level information, and each system information block includes a set of a series of parameters related to a function.

An SSB (synchronization signal block), is a combination of a synchronization signal and a PBCH block (Synchronization Signal and PBCH block), and includes three parts: a primary synchronization signal (Primary Synchronization Signal, PSS for short), a secondary synchronization signal (SSS), and a PBCH (PBCH (physical broadcast channel)). The SSB is used to synchronize information such as a frequency and time between a terminal and a base station.

A cell, also referred to as a cellular cell, is an area covered by a base station or a part (a sector antenna) of the base station in a cellular mobile communication system. Within this area, a mobile station may reliably communicate with the base station through a wireless channel.

To improve uplink coverage enhancement, a low frequency band (for example, <3 GHz) is introduced as an SUL band (a supplementary uplink frequency band). One SUL may be associated with a TDD or FDD frequency band (including an NDL/NUL) and still become a cell. In an SUL technology, UE may be allowed to select an uplink resource from an NUL carrier and an SUL carrier to initiate random access. For example, the UE may learn, by parsing SUL configuration information in a SIB, that the cell has the SUL carrier, and initiate the random access on the SUL carrier or the NUL carrier based on corresponding configuration parameters (an access resource and an access rule). Initial access and data transmission are performed on the SUL, so that a defect that the NUL has smaller UL coverage than the NDL can be compensated.

Figure 1B:
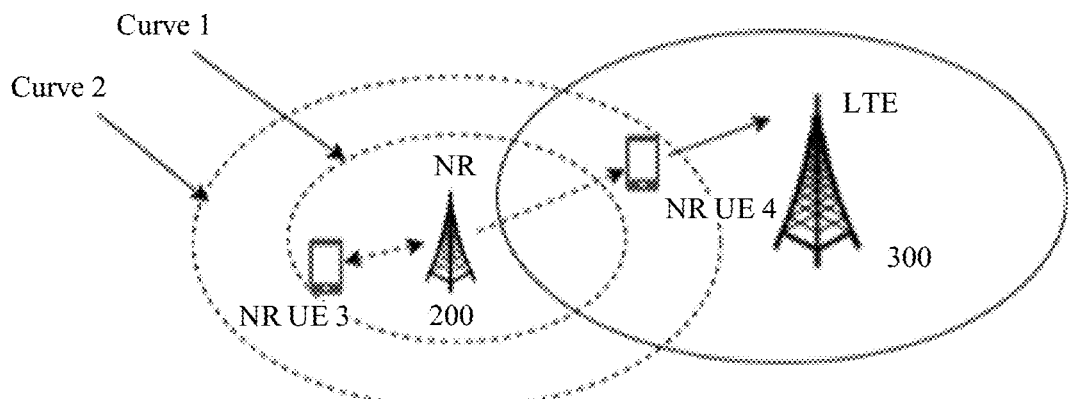
FIG. 1B is an example diagram of a communication scenario according to an embodiment of this application.
Figure 1C:
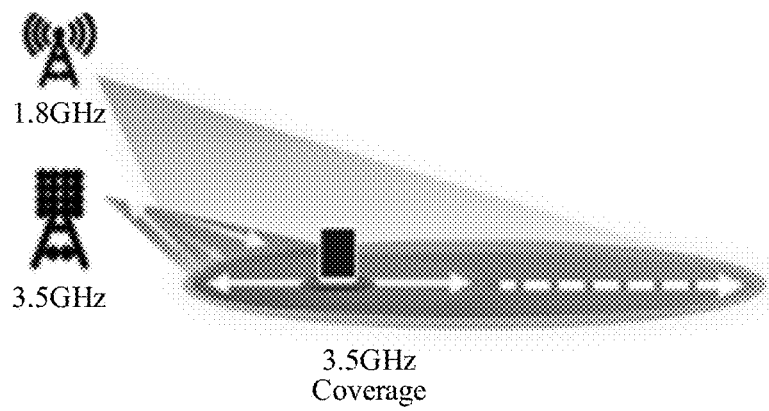
FIG. 1C is a schematic diagram of a specific scenario of non-co-site deployment according to an embodiment of this application.

FIG. 1A is an example diagram of a communication scenario according to an embodiment of this application. FIG. 1B is an example diagram of a communication scenario according to an embodiment of this application. FIG. 1A shows a wireless communication scenario of LTE-NR co-site deployment. FIG. 1B shows a wireless communication scenario of LTE-NR non-co-site deployment. FIG. 1C is a schematic diagram of a specific scenario of non-co-site deployment according to an embodiment of this application. An SUL may be applied to the wireless communication scenario of the co-site deployment and the wireless communication scenario of the non-co-site deployment.

As shown in FIG. 1A, a network device 100 supports both an LTE technology and an NR technology. This belongs to the LTE-NR co-site deployment. In FIG. 1A, a dashed circle may represent an uplink coverage range of an NR carrier of the network device 100, and a solid circle may represent an uplink coverage range of an LTE carrier. LTE UE 1 is an LTE terminal (to be specific, may perform signal transmission with the network device 100 by using uplink and downlink resources on the LTE carrier), NR UE 1 is an NR terminal (to be specific, may perform signal transmission with the network device 100 by using uplink and downlink resources on the NR carrier), and NR UE 2 is an NR terminal that supports uplink sharing (to be specific, may perform signal transmission with the network device 100 by using the uplink and downlink resources on the NR carrier, and may further perform uplink transmission with the network device 100 by using an SUL resource). If the NR UE 2 sends an uplink signal to the network device 100 by using the uplink resource on the NR carrier, quality of the uplink signal may be received by the network device 100 may be poor due to a high frequency and a large path loss of the NR carrier, a limited power of the NR UE 2, or the like, and the uplink signal cannot be correctly received. Therefore, the NR UE 2 may send the uplink signal to the network device 100 by using the SUL resource (which has a small path loss at a low frequency), to improve NR uplink coverage. In this embodiment of this application, signal transmission may also be described as information transmission or data transmission.

As shown in FIG. 1B, a network device 200 is an NR base station, and a network device 300 is an LTE base station. For the network device 200, a curve 1 represents a boundary line of an NR uplink coverage area, a curve 2 represents a boundary line of an NR downlink coverage area, and an annular area between the curve 2 and the curve 1 is an area in which uplink coverage does not match downlink coverage. NR UE 3 is an NR terminal (to be specific, may perform signal transmission with the network device 2 by using uplink and downlink resources on an NR carrier). NR UE 4 is an NR terminal that supports uplink sharing (to be specific, may perform signal transmission with the network device 200 by using the uplink and downlink resources on the NR carrier, and may further perform uplink transmission with the network device 300 by using an SUL resource). If the NR UE 4 sends an uplink signal to the network device 200 by using the uplink resource on the NR carrier, quality of the uplink signal received by the network device 200 may be poor due to a high frequency and a large path loss of the NR carrier, and the uplink signal cannot be correctly received. Therefore, the NR UE 4 may send the uplink signal to the network device 300 by using the SUL resource (in other words, a downlink sending node and an uplink receiving node of the NR UE 4 are not on a same node), and the network device 300 may then send the uplink signal to the network device 200, to improve a part of NR uplink coverage in the network device 200. As shown in FIG. 1B, in the annular area between the curve 2 and the curve 1, an NUL may be supplemented by using another LTE carrier, to improve the NR uplink coverage, or the NR uplink coverage may be seamlessly improved by using a plurality of other LTE carriers, so that the UE may initiate random access by using the SUL resource.

For example, as shown in FIG. 1C, a downlink coverage range of an NR carrier of a base station (an NR network device) working at 3.5 GHz is shown by a large circle in FIG. 1C, and an uplink coverage range of the NR carrier is a range covered by a circle using a solid line arrow as a diameter shown in FIG. 1C. A sector area in a dashed line part is an area in which uplink coverage does not match downlink coverage, and an LTE carrier of a base station (an LTE network device) working at 1.8 GHz may be used as a supplement to an uplink resource, to improve the NR uplink coverage. If UE in FIG. 1C is located in an area in which a dashed line arrow is located, the UE may initiate random access over an SUL, and send an uplink signal to the LTE network device by using an SUL resource, and the LTE network device may then send the uplink signal to the NR network device, so that NR uplink coverage of the NR network device is improved.

In the communication scenario of the co-site deployment shown in FIG. 1A, a process in which the UE performs random access may include:

The network device 100 sends SUL configuration information to the user equipment, where the SUL configuration information may include: frequency domain information of an uplink resource, common configuration information of the uplink resource, and the like. The frequency domain information of the uplink resource may include: uplink carrier frequency channel number information, uplink subcarrier offset information, and the like. The common configuration information of the uplink resource may include: random access channel (RACH) configuration information, physical uplink shared channel (PUSCH) configuration information, physical uplink control channel (PUCCH) configuration information, sounding reference signal (SRS) configuration information, power control configuration information, and the like. The RACH configuration information may include: a time-domain (a subframe, a slot, a symbol, a periodicity, and/or the like) resource, a frequency-domain (resource block information, whether frequency hopping is performed, and/or the like) resource, and a code division multiplexing (an orthogonal cover code, a cyclic shift, and/or the like) resource that are of a physical random access channel (PRACH). In other words, a PRACH resource includes at least one of the time-domain resource, the frequency-domain resource, and the code-domain resource.

In a possible implementation, the configuration information (the SUL configuration information) of the uplink resource may be carried in a system information block SIB, or certainly, may be carried in another message. This is not limited in this embodiment of this application.

In a possible implementation, the UE may determine, based on a distance from the NR base station, whether to initiate the random access over the SUL or the NUL. The distance from the UE to the NR base station may be measured based on reference signal strength (RSRP) of an NDL. The SUL configuration information may carry an RSRP threshold. After receiving the SUL configuration information, the UE may measure RSRP of an NDL of a cell in which the UE is located, measure a distance from the UE to a network device based on the RSRP of the NDL, and compare the RSRP of the NDL with the RSRP threshold. If the RSRP of the NDL is less than the RSRP threshold, it indicates that the distance from the UE to the network device is large, and in this case, the UE may initiate the random access over the SUL. If the RSRP of the NDL is not less than the RSRP threshold, it indicates that the distance from the UE to the network device is within a specific range, and in this case, the UE may initiate the random access over the NUL.

Figure 2A:
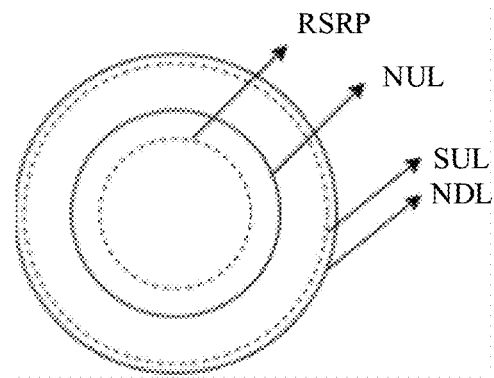
FIG. 2A is a schematic diagram of random access in a communication scenario of co-site deployment.

FIG. 2A is a schematic diagram of random access in a communication scenario of co-site deployment. As shown in FIG. 2A, an inner-side curve may represent a boundary of a range that can be covered by a reference signal based on an RSRP threshold, a curve NUL represents a boundary of a range that can be covered by an NUL signal of a network device 100, a curve SUL represents a boundary of a range that can be covered by an SUL signal of the network device 100, and a curve NDL represents a boundary of a range that can be covered by an NDL signal of the network device 100. In this way, after measuring RSRP of the NDL, UE may compare the RSRP of the NDL with the RSRP threshold. If the RSRP of the NDL is greater than the RSRP threshold, the UE may be within a coverage range of a curve RSRP. In this case, a service of the NUL may meet a requirement of the UE, and the UE may select the NUL to initiate random access. If the RSRP of the NDL is not greater than the RSRP threshold, a service of the NUL may not cover a position of the UE, or the NUL signal at a position of the UE is poor. However, if the UE is located within a coverage range of a service of the SUL, the UE may select the SUL to initiate random access.

An existing access rule may be used to resolve a problem of the random access of the UE in the scenario of the co-site deployment. From a perspective of SUL long-term evolution, there are increasing applications of random access in a communication scenario of non-co-site deployment. However, the existing rule application cannot implement good random access in the communication scenario of the non-co-site deployment.

Figure 2B:
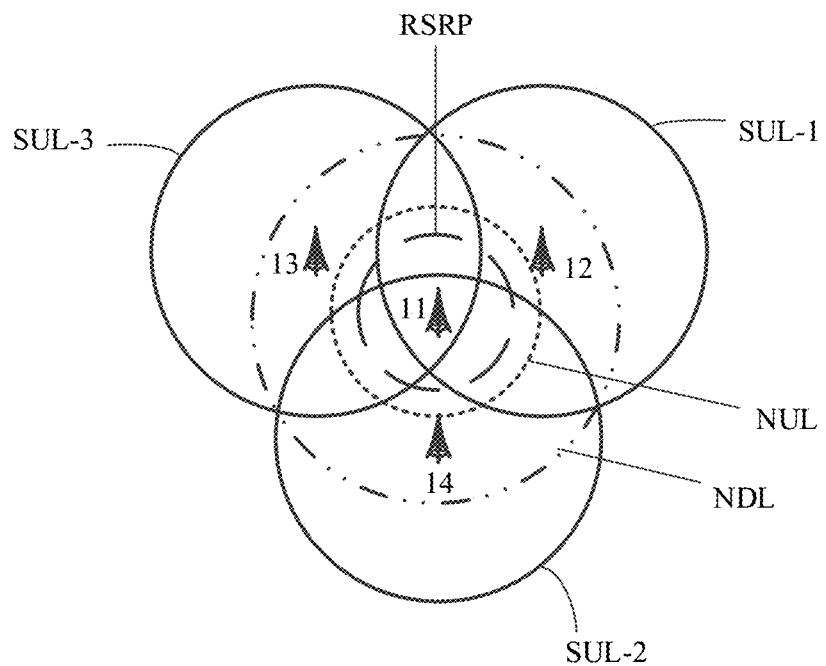
FIG. 2B is a schematic diagram of a communication scenario of non-co-site deployment according to an embodiment of this application.

FIG. 2B is a schematic diagram of a communication scenario of non-co-site deployment according to an embodiment of this application. As shown in FIG. 2B, a network device 11 may support an NR technology, and a network device 12, a network device 13, and a network device 14 may support an LTE technology. A boundary line of a downlink coverage area of the network device 11 is shown by a curve NDL in FIG. 2B, a boundary line of an uplink coverage area of the network device 11 is shown by a curve NUL in FIG. 2B, and a curve RSRP may represent a boundary of a coverage area of an RSRP threshold. As described above, in this example in FIG. 2B, in an annular area between the curve NUL and the curve NDL, NR uplink coverage may be seamlessly improved by using three LTE carriers, so that when UE is located at a coverage edge of the network device 11, the UE may select an SUL to initiate random access. However, in the scenario shown in FIG. 2B, different SULs cannot be distinguished from each other by using a single RSRP threshold. To be specific, the UE may measure only a distance from the UE to the network device 11 based on measured RSRP of the NDL and the RSRP threshold, but based on the RSRP threshold, the UE cannot determine a distance from the network device 12, the network device 13, or the network device 14 that provides the SUL, in other words, cannot distinguish between different SULs. The UE cannot select an accessed SUL based on a result of comparing the detected RSRP of the NDL with the RSRP threshold. In other words, when determining that the RSRP of the NDL is less than the RSRP threshold, and selecting the accessed SUL, the UE cannot further select, based on the RSRP threshold, an appropriate SUL from three SULs shown in FIG. 2B: an SUL-1, an SUL-2, and an SUL-3 to initiate the random access. In addition, in the communication scenario shown in FIG. 1B, if the UE is out of a coverage range of the SUL of the network device 300, the UE either cannot select the accessed SUL based on the result of comparing the RSRP of the NDL with the RSRP threshold. In other words, an area not covered by the SUL cannot be distinguished by using the single RSRP threshold.

To resolve the foregoing technical problem, this application provides a random access method. SULs associated with one NDL are distinguished from each other in sent SUL configuration information, so that user equipment of a terminal can distinguish between different SULs based on the SUL configuration information, to more effectively implement SUL access in a communication scenario of non-co-site deployment.

It should be noted that the random access method provided in this application may be applied to the scenario of the non-co-site deployment, and may also be applied to a scenario of co-site deployment.

The network device in this application may include but is not limited to: a base station (BS) and a transmission reception point (TRP). The network device may be a device that is deployed in a radio access network and that can communicate with a terminal. The base station may also be referred to as a radio access network (RAN) device. The network device in embodiments of this application may be a base station (base transceiver station, BTS) in a global system for mobile communications (GSM) or code division multiple access (CDMA), or a base station (NodeB, NB) in wideband code division multiple access (WCDMA), or an evolved NodeB (evolved NodeB, eNB or eNodeB) in long term evolution (LTE), or a relay station or an access point, or a base station in a future 5G network, or the like. This is not limited herein. The base station in the 5G network may also be referred to as a gNB.

The user equipment in embodiments of this application may be a terminal device. The terminal device may also be referred to as a terminal, a wired terminal, or a wireless terminal. The wireless terminal may be a device having a wireless transceiver function. The terminal device in embodiments of this application may be deployed on the land, including an indoor device, an outdoor device, a handheld device, or a vehicle-mounted device; or may be deployed on a water surface (for example, on a ship); or may be deployed in the air (for example, on a plane, a balloon, or a satellite). Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In embodiments of this application, an apparatus that implements a function of the terminal may be a terminal, or may be an apparatus that supports the terminal in implementing the function. In embodiments of this application, an example in which the apparatus that implements the function of the terminal is a terminal and the terminal is UE is used for describing the technical solutions provided in embodiments of this application.

The user equipment (UE) in embodiments of this application may include a handheld device, a vehicle-mounted device, a wearable device, or a computing device that has a wireless communication function. For example, the UE may be a mobile phone, a tablet computer, or a computer having a wireless transceiver function.

Embodiment 1

The application scenario shown in FIG. 2B is used as an example. In a possible implementation, a first network device (a network device 11) may send SIBs with different configurations to UE by using NDL beams, where the SIB includes SUL configuration information, and the SIBs in different NDL beams include different SUL configuration information. Because NDL beams received by the UE in different areas are different, the UE may distinguish between the accessed SULs based on the NDL beams.

The SUL configuration information may include an SUL identifier of at least one SUL and at least one SUL threshold. The SUL identifier may be a symbol that can be used to distinguish between the corresponding SUL and other SULs, and the SUL threshold may indicate reference signal strength when the UE selects an accessed uplink based on the measured reference signal strength. The SUL in the SUL configuration information is an SUL provided by a second network device (a network device 12, a network device 13, or a network device 14). The first network device may be a base station, a small cell, or another user equipment. The another user equipment is user equipment that sends the NDL beams relative to the UE that receives the NDL beams. The second network device may alternatively be a base station, a small cell, another user equipment, or the like.

In a possible implementation, the SUL configuration information may further include NDL measurement configuration information. The NDL measurement configuration information may include a reference signal class and a reference signal configuration (such as a subframe configuration).

In this way, after receiving the NDL beams, the UE may measure, based on the NDL measurement configuration information, reference signal strength corresponding to the NDL beams in an area in which the UE is located. The SUL threshold may be an RSRP threshold. The UE may compare the reference signal strength with the at least one SUL threshold, for example, may compare RSRP of an NDL with the at least one RSRP threshold, and initiate random access based on a comparison result.

In an implementation of this application, the network device and a terminal device may receive and send signals by using a beamforming technology, where beamforming may also be referred to as beamforming or spatial filtering, and is a signal processing technology of using a sensor array to directionally send and receive the signals. In the beamforming technology, a parameter of a basic unit of a phase array may be adjusted, so that signals at some angles obtain constructive interference and signals at other angles obtain destructive interference.

In an implementation of this application, in the SUL configuration information corresponding to different NDL beams, SUL identifiers may be different. In the SUL configuration information corresponding to different NDL beams, the SUL thresholds may be the same or different. This is not limited in this application.

Different SUL configuration information is carried in different NDL beams, so that the SUL configuration information received by the UE within a range covered by the NDL beams is different, in other words, different SUL resources are configured for different areas. In this way, the UE located in different areas can distinguish between the accessed SULs.

Optionally, the random access method in the foregoing implementation of this application may be implemented in a plurality of different manners. The following provides description by using examples.

Example 1

The network device sends SIBs with different configurations by using different NDL beams, in other words, the network device sends different SIBs in the NDL beams in different directions. The SIB includes SUL configuration information. Each SIB is configured with one SUL (SUL identifier) and one SUL threshold, and the SIBs includes different SUL configuration information. For example, different SUL identifiers and/or different SUL thresholds in the SUL configuration information in the SIBs are carried in different NDL beams. Table 1.1 shows an implementation of Example 1.

TABLE 1.1

| Beam | SUL configuration information |
| --- | --- |
| SIB-beam 1 | RACH-ConfigCommon: SUL config1 rsrp-ThresholdSSB-SUL1 |
| SIB-beam 2 | RACH-ConfigCommon: SUL config2 rsrp-ThresholdSSB-SUL2 |
| SIB-beam 3 | RACH-ConfigCommon: SUL config3 rsrp-ThresholdSSB-SUL3 |

Figure 3A:
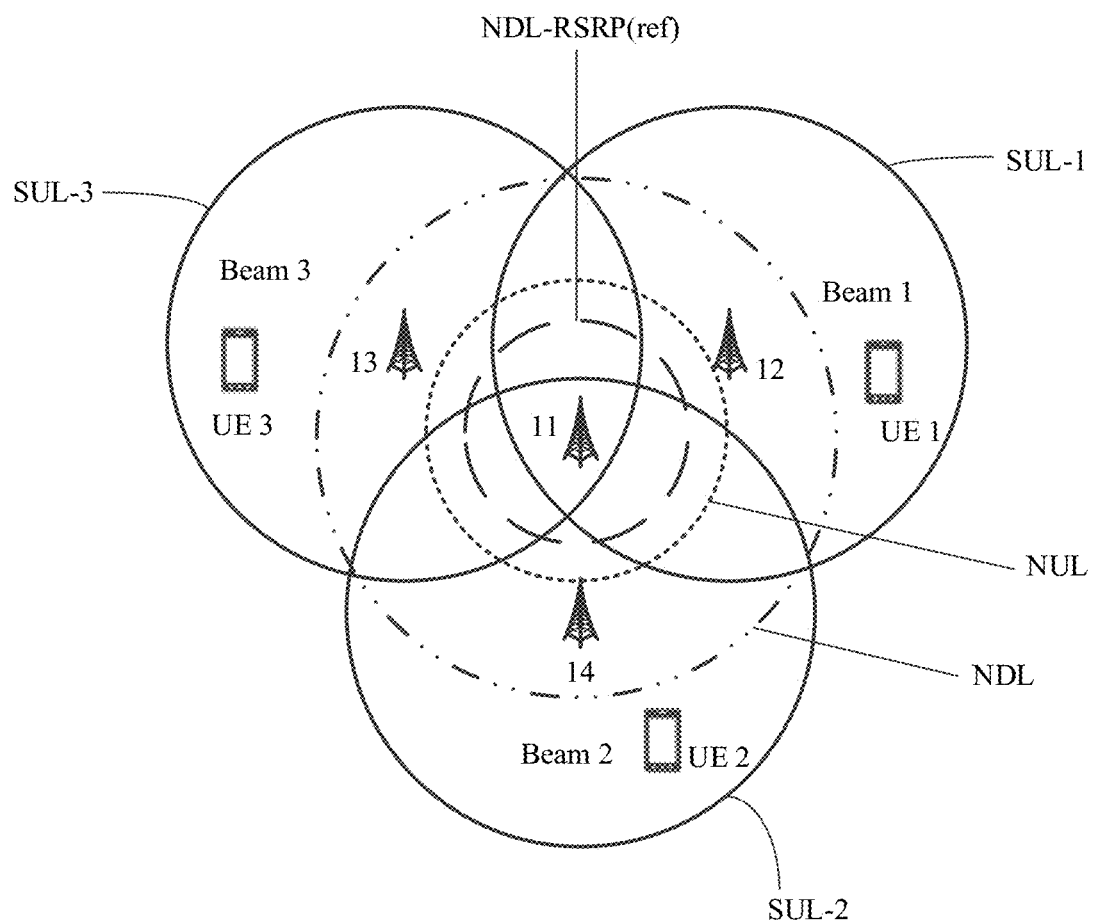
FIG. 3A is a schematic diagram of a scenario of random access according to an example of this application.

FIG. 3A is a schematic diagram of a scenario of random access according to an example of this application. As shown in FIG. 3A and Table 1.1, the SUL configuration information in a SIB sent by the network device 11 by using the beam 1 includes: an SUL identifier SUL config1 of an SUL-1 and an SUL threshold rsrp-ThresholdSSB-SUL1, the SUL configuration information in a SIB sent by using the beam 2 includes: an SUL identifier SUL config2 of an SUL-2 and an SUL threshold rsrp-ThresholdSSB-SUL2, and the SUL configuration information in a SIB sent by using the beam 3 includes: an SUL identifier SUL config3 of an SUL-3 and an SUL threshold rsrp-ThresholdSSB-SUL3. That is, the network device 11 sends the SIBs with different configurations by using different NDL beams.

Figure 3B:
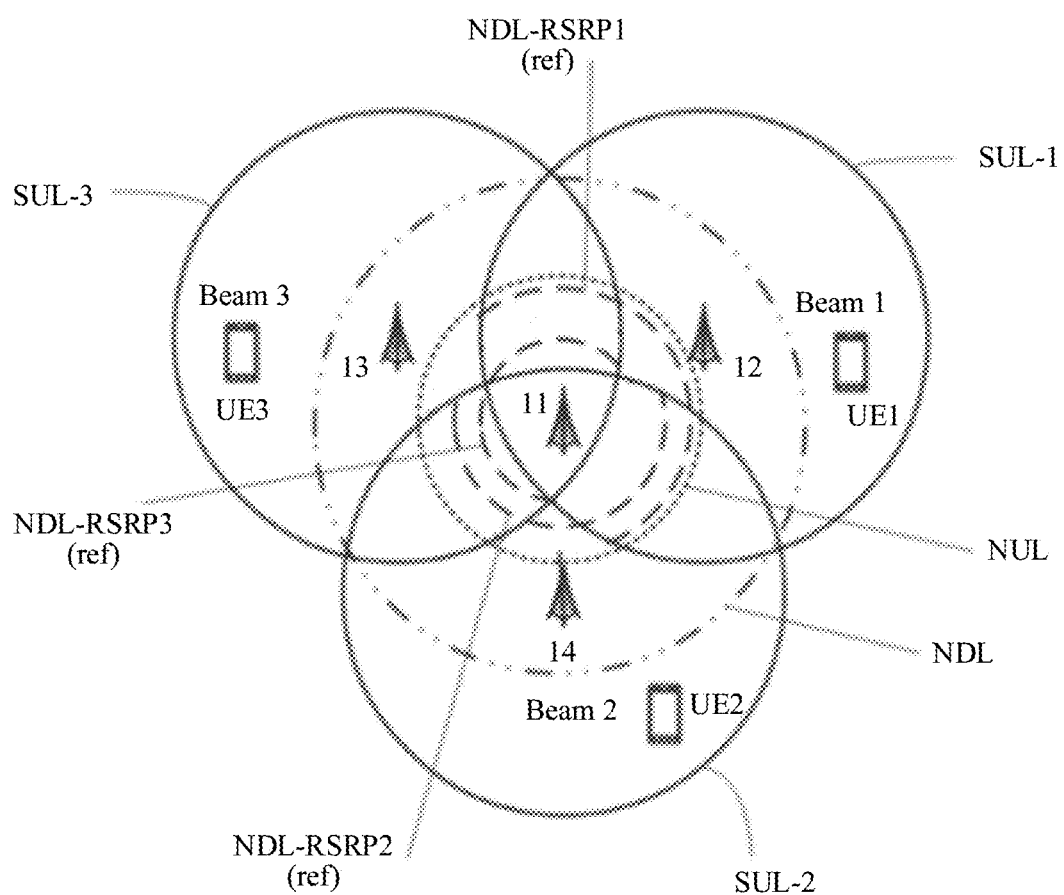
FIG. 3B is a schematic diagram in which different SUL thresholds are configured in different NDL beams according to an embodiment of this application.

It should be noted that the SUL thresholds configured in the beams may be the same or different. This is not limited in this application. In the example shown in FIG. 3A, the SUL thresholds configured in the NDL beams may be the same, and rsrp-ThresholdSSB-SUL1, rsrp-ThresholdSSB-SUL2, and rsrp-ThresholdSSB-SUL3 may all be NDL-RSRP (ref) shown in FIG. 3A. If the SUL thresholds configured in the NDL beams are different, there is an arc curve SUL threshold within a coverage range of the NDL beams. FIG. 3B is a schematic diagram in which different SUL thresholds are configured in different NDL beams according to an embodiment of this application. As shown in FIG. 3B, the SUL threshold rsrp-ThresholdSSB-SUL1 of the SUL-1 may be NDL-RSRP1 (ref), the SUL threshold rsrp-ThresholdSSB-SUL2 of the SUL-2 may be NDL-RSRP2 (ref), and the SUL threshold rsrp-ThresholdSSB-SUL3 of the SUL-3 may be NDL-RSRP3 (ref), and the three respectively correspond to three different arc curves in FIG. 3B. In this way, when the UE is within different beam ranges, the SUL thresholds in the received SUL configuration information may be different, and conditions for initiating random access over the SULs are also different.

When UE 1 within a coverage range of the beam 1 receives the beam 1, the UE 1 measures RSRP of an NDL in an area in which the UE 1 is located, and compares the RSRP of the NDL with NDL-RSRP1 $rsrp$-ThresholdSSB-SUL1 (for example, with the NDL-RSRP (ref) shown in FIG. 3A or the NDL-RSRP1 (ref) shown in FIG. 3B). If the RSRP of the NDL is less than rsrp-ThresholdSSB-SUL1, the UE 1 may initiate the random access over SUL config1 (for example, the SUL-1). If the RSRP of the NDL is not less than rsrp-ThresholdS SB-SUL1, the UE 1 may initiate the random access over the NUL.

When UE 2 within a coverage range of the beam 2 receives the beam 2, the UE 2 measures RSRP of an NDL in an area in which the UE 2 is located, and compares the RSRP of the NDL with rsrp-ThresholdSSB-SUL2 (for example, with the NDL-RSRP (ref) shown in FIG. 3A or the NDL-RSRP2 (ref) shown in FIG. 3B). If the RSRP of the NDL is less than rsrp-ThresholdSSB-SUL2, the UE 2 may initiate the random access over SUL config2 (for example, the SUL-2). If the RSRP of the NDL is not less than rsrp-ThresholdSSB-SUL2, the UE 2 may initiate the random access over the NUL.

When UE 3 within a coverage range of the beam 3 receives the beam 3, the UE 3 measures RSRP of an NDL in an area in which the UE 2 is located, and compares the RSRP of the NDL with rsrp-ThresholdSSB-SUL3 (for example, with the NDL-RSRP (ref) shown in FIG. 3A or the NDL-RSRP3 (ref) shown in FIG. 3B). If the RSRP of the NDL is less than rsrp-ThresholdSSB-SUL3, the UE 2 may initiate the random access over SUL config3 (for example, the SUL-3). If the RSRP of the NDL is not less than rsrp-ThresholdSSB-SUL3, the UE 3 may initiate the random access over the NUL.

Example 2

The network device sends SIBs with different configurations by using different NDL beams. In other words, the network device sends different SIBs in the NDL beams in different directions, and the SIB include SUL configuration information. A difference from Example 1 lies in that each SIB is configured with a plurality of SULs (SUL identifiers), and each SIB may be further configured with one SUL threshold or SUL thresholds respectively corresponding to the plurality of SULs. In this example, the SUL configuration information may further include a validity identifier of each SUL.

In this way, when receiving the beams, by measuring reference signal strength of the NDL, the UE may select an SUL from the plurality of SULs based on the reference signal strength of the NDL, the SUL thresholds, and the validity identifier of each SUL, to initiate random access.

Optionally, the validity identifiers of the plurality of SULs may include one of valid identifiers and invalid identifiers.

For example, the network device sends SIBs with three configurations by using three NDL beams.

TABLE 1.2

| Beam | SUL configuration information |
| --- | --- |
| SIB-beam 1 | RACH-ConfigCommon: |
|  | SUL config1: available |
|  | rsrp-ThresholdSSB-SUL1 |
|  | SUL config2: unavailable |
|  | rsrp-ThresholdSSB-SUL2 |
|  | SUL config3: unavailable |
|  | rsrp-ThresholdSSB-SUL3 |
| SIB-beam 2 | RACH-ConfigCommon: |
|  | SUL config1: unavailable |
|  | rsrp-ThresholdSSB-SUL1 |
|  | SUL config2: unavailable |
|  | rsrp-ThresholdSSB-SUL2 |
|  | SUL config3: available |
|  | rsrp-ThresholdSSB-SUL3 |
| SIB-beam 3 | RACH-ConfigCommon: |
|  | SUL config1: unavailable |
|  | rsrp-ThresholdSSB-SUL1 |
|  | SUL config2: available |

TABLE 1.2-continued

| Beam | SUL configuration information |
| --- | --- |
|  | rsrp-ThresholdSSB-SUL2 |
|  | SUL config3: unavailable |
|  | rsrp-ThresholdSSB-SUL3 |

As shown in FIG. 3A, FIG. 3B, and Table 1.2, the SUL configuration information in a SIB sent by the network device 11 by using the beam 1 includes: SUL config1 and rsrp-ThresholdSSB-SUL1, SUL config2 and rsrp-ThresholdSSB-SUL2, and SUL config3 and rsrp-ThresholdSSB-SUL3, where a validity identifier of SUL config1 is valid, and validity identifiers of SUL config2 and SUL config3 are invalid.

The SUL configuration information in a SIB sent by the network device 11 by using the beam 2 includes: SUL config1 and rsrp-ThresholdSSB-SUL1, SUL config2 and rsrp-ThresholdSSB-SUL2, and SUL config3 and rsrp-ThresholdSSB-SUL3, where a validity identifier of SUL config3 is valid, and validity identifiers of SUL config1 and SUL config2 are invalid.

The SUL configuration information in a SIB sent by the network device 11 by using the beam 3 includes: SUL config1 and rsrp-ThresholdSSB-SUL1, SUL config2 and rsrp-ThresholdSSB-SUL2, and SUL config3 and rsrp-ThresholdSSB-SUL3, where a validity identifier of SUL config2 is valid, and validity identifiers of SUL config1 and SUL config3 are invalid.

When UE 1 within a coverage range of the beam 1 receives the beam 1, the UE 1 measures RSRP of an NDL in an area in which the UE 1 is located, and the UE 1 may determine, based on the validity identifier, that a valid SUL is SUL config1, and may compare the RSRP of the NDL with rsrp-ThresholdSSB-SUL1 (for example, with the NDL-RSRP (ref) shown in FIG. 3A or the NDL-RSRP1 (ref) shown in FIG. 3B). If the RSRP of the NDL is less than rsrp-ThresholdSSB-SUL1, the UE 1 may initiate the random access over SUL config1 (the SUL-1). If the RSRP of the NDL is not less than rsrp-ThresholdSSB-SUL1, the UE 1 may initiate the random access over the NUL.

When UE 2 within a coverage range of the beam 2 receives the beam 2, the UE 2 measures RSRP of an NDL in an area in which the UE 2 is located, and the UE 2 may determine, based on the validity identifiers, that a valid SUL is SUL config3, and may compare the RSRP of the NDL with rsrp-ThresholdSSB-SUL3 (for example, with the NDL-RSRP (ref) shown in FIG. 3A or the NDL-RSRP3 (ref) shown in FIG. 3B). If the RSRP of the NDL is less than rsrp-ThresholdSSB-SUL3, the UE 2 may initiate the random access over SUL config3 (the SUL-3). If the RSRP of the NDL is not less than rsrp-ThresholdSSB-SUL3, the UE 2 may initiate the random access over the NUL.

When UE 3 within a coverage range of the beam 3 receives the beam 3, the UE 3 measures RSRP of an NDL in an area in which the UE 3 is located, and the UE 3 may determine, based on the validity identifiers, that a valid SUL is SUL config2, and may compare the RSRP of the NDL with rsrp-ThresholdSSB-SUL2 (for example, with the NDL-RSRP (ref) shown in FIG. 3A or the NDL-RSRP2 (ref) shown in FIG. 3B). If the RSRP of the NDL is less than rsrp-ThresholdSSB-SUL2, the UE 3 may initiate the random access over SUL config2 (the SUL-2). If the RSRP of the NDL is not less than rsrp-ThresholdSSB-SUL3, the UE 3 may initiate the random access over the NUL.

It should be noted that in the foregoing example, the SUL thresholds corresponding to the SULs may be the same or different. This is not limited in this application. For a specific setting manner, refer to Example 1. Details are not described again.

Example 3

The network device sends SIBs with different configurations by using different NDL beams. In other words, the network device sends different SIBs in the NDL beams in different directions, and the SIB include SUL configuration information. A difference from Example 1 lies in that each SIB is configured with a plurality of SULs (SUL identifiers), and each SIB may be further configured with one SUL threshold or SUL thresholds respectively corresponding to the plurality of SULs. In this example, the SUL configuration information may further include priority information of each SUL.

In this way, when receiving the beams, by measuring reference signal strength of an NDL, the UE may select an SUL from the plurality of SULs based on the reference signal strength of the NDL, the SUL thresholds, and the priority information of each SUL, to initiate random access. For example, when the reference signal strength of the NDL is less than the SUL thresholds, the UE selects an SUL with a highest priority for access.

In a possible implementation, a plurality of priorities may be set, and a priority of each SUL is specified in the SUL configuration information. Optionally, the priorities may be represented by using values. For example, the priorities increase gradually with an ascending order of the values, or the priorities decreases gradually with an ascending order of the values.

For example, the network device sends SIBs with three configurations by using three NDL beams, and in SUL configuration information of the SIBs, priorities increase in an ascending order of values.

TABLE 1.3

| Beam | SUL configuration information |
| --- | --- |
| SIB-beam 1 | RACH-ConfigCommon: |
|  | SUL config1: 3 |
|  | rsrp-ThresholdSSB-SUL1 |
|  | SUL config2: 1 |
|  | rsrp-ThresholdSSB-SUL2 |
|  | SUL config3: 2 |
|  | rsrp-ThresholdSSB-SUL3 |
| SIB-beam 2 | RACH-ConfigCommon: |
|  | SUL config1: 1 |
|  | rsrp-ThresholdSSB-SUL1 |
|  | SUL config2: 3 |
|  | rsrp-ThresholdSSB-SUL2 |
|  | SUL config3: 2 |
|  | rsrp-ThresholdSSB-SUL3 |
| SIB-beam 3 | RACH-ConfigCommon: |
|  | SUL config1: 2 |
|  | rsrp-ThresholdSSB-SUL1 |
|  | SUL config2: 1 |
|  | rsrp-ThresholdSSB-SUL2 |
|  | SUL config3: 3 |
|  | rsrp-ThresholdSSB-SUL3 |

Figure 3C:
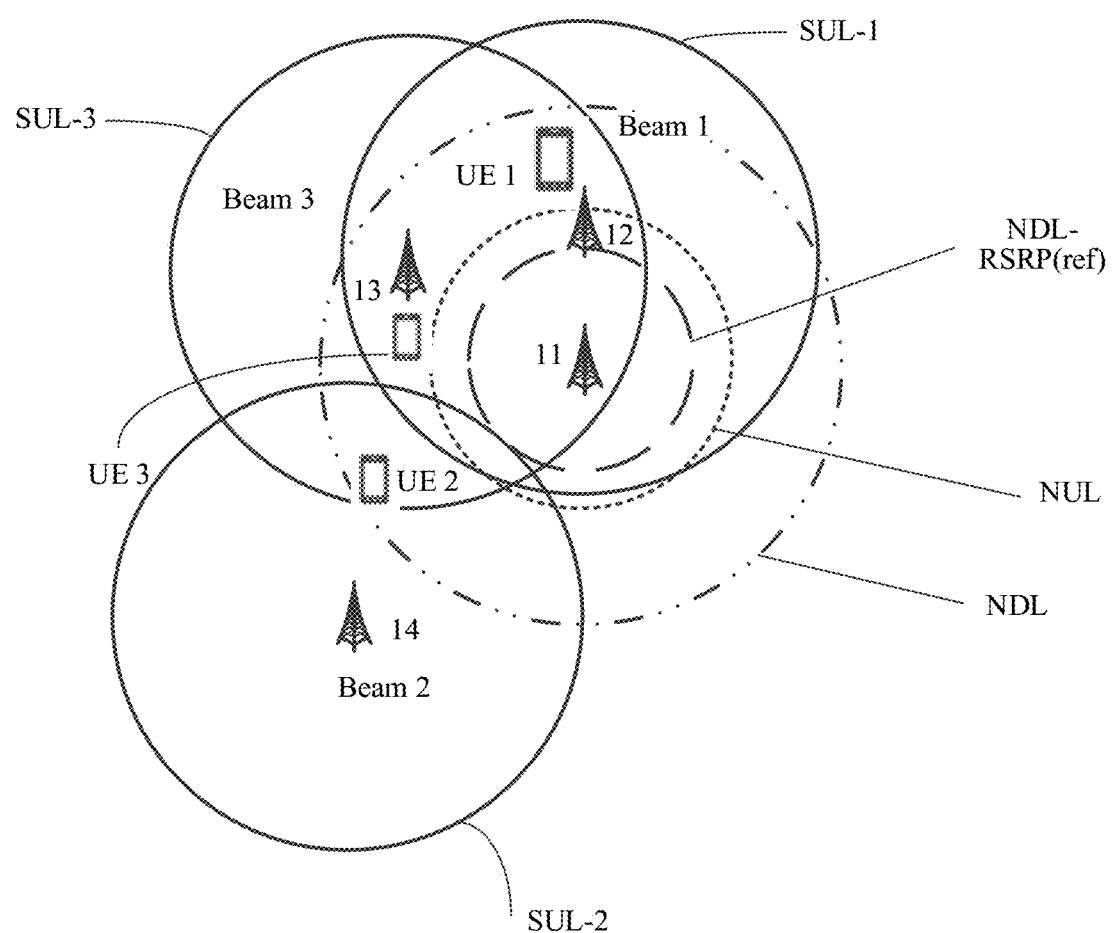
FIG. 3C is a schematic diagram of a scenario of random access according to an example of this application.

FIG. 3C is a schematic diagram of a scenario of random access according to an example of this application. As shown in FIG. 3C and Table 1.3, the SUL configuration information in a SIB sent by a network device 11 by using the beam 1 includes: SUL config1 and rsrp-ThresholdSSB-SUL1, SUL config2 and rsrp-ThresholdSSB-SUL2, and SUL config3 and rsrp-ThresholdSSB-SUL3, where a priority of SUL config1 is 3, a priority of SUL config2 is 1, a priority of SUL config3 is 2, and SUL config1 has the highest priority.

The SUL configuration information in a SIB sent by the network device 11 by using the beam 2 includes: SUL config1 and rsrp-ThresholdSSB-SUL1, SUL config2 and rsrp-ThresholdSSB-SUL2, and SUL config3 and rsrp-ThresholdSSB-SUL3, where a priority of SUL config2 is 3, a priority of SUL config1 is 1, a priority of SUL config3 is 2, and SUL config2 has the highest priority.

The SUL configuration information in a SIB sent by the network device by using the beam 3 includes: SUL config1 and rsrp-ThresholdSSB-SUL1, SUL config2 and rsrp-ThresholdSSB-SUL2, and SUL config3 and rsrp-ThresholdSSB-SUL3, where a priority of SUL config3 is 3, a priority of SUL config1 is 2, a priority of SUL config2 is 1, and SUL config3 has the highest priority.

As shown in FIG. 3C, when UE 1 within a coverage range of the beam 1 receives the beam 1, the UE 1 measures RSRP of an NDL in an area in which the UE 1 is located, and the UE 1 may determine, based on the priority information, that an SUL with a highest priority is SUL config1, and compare the RSRP of the NDL with rsrp-ThresholdSSB-SUL1. If the RSRP of the NDL is less than rsrp-ThresholdSSB-SUL1, the UE 1 may initiate the random access over SUL config1. If the RSRP of the NDL is not less than rsrp-ThresholdSSB-SUL1, the UE 1 may determine, based on the priority information, that a next SUL with a highest priority is SUL config3, and may compare the RSRP of the NDL with rsrp-ThresholdSSB-SUL3. If the RSRP of the NDL is less than rsrp-ThresholdSSB-SUL3, the UE 1 may initiate the random access over SUL config3. If the RSRP of the NDL is not less than rsrp-ThresholdSSB-SUL3, the UE 1 may determine, based on the priority information, that a next SUL with a highest priority is SUL config2, and may compare the RSRP of the NDL with rsrp-ThresholdSSB-SUL2. If the RSRP of the NDL is less than rsrp-ThresholdSSB-SUL2, the UE 1 may initiate the random access over SUL config2. If the RSRP of the NDL is not less than rsrp-ThresholdSSB-SUL2, the UE 1 may initiate the random access over the NUL. It should be noted that if the RSRP of the NDL is not less than rsrp-ThresholdSSB-SUL3, the UE 1 may alternatively directly initiate the random access over the NUL. A specific process of initiating the random access is not limited in this application. The foregoing process is merely an example.

When UE 2 within a coverage range of the beam 2 receives the beam 2, the UE 2 measures RSRP of an NDL in an area in which the UE 2 is located, and the UE 2 may determine, based on the priority information, that an SUL with a highest priority is SUL config2, and compare the RSRP of the NDL with rsrp-ThresholdSSB-SUL2. If the RSRP of the NDL is less than rsrp-ThresholdSSB-SUL2, the UE 2 may initiate the random access over SUL config2. If the RSRP of the NDL is not less than rsrp-ThresholdSSB-SUL2, the UE 2 may determine, based on the priority information, that a next SUL with a highest priority is SUL config3, and may compare the RSRP of the NDL with rsrp-ThresholdSSB-SUL3. If the RSRP of the NDL is less than rsrp-ThresholdSSB-SUL3, the UE 2 may initiate the random access over SUL config3. If the RSRP of the NDL is not less than rsrp-ThresholdSSB-SUL3, the UE 2 may determine, based on the priority information, that a next SUL with a highest priority is SUL config1, and may compare the RSRP of the NDL with rsrp-ThresholdSSB-SUL1. If the RSRP of the NDL is less than rsrp-Threshold- SSB-SUL1, the UE 2 may initiate the random access over SUL config1. If the RSRP of the NDL is not less than rsrp-ThresholdSSB-SUL1, the UE 2 may initiate the random access over the NUL. It should be noted that if the RSRP of the NDL is not less than rsrp-ThresholdSSB-SUL1, the UE 2 may alternatively directly initiate the random access over the NUL. A specific process of initiating the random access is not limited in this application. The foregoing process is merely an example.

When UE 3 within a coverage range of the beam 3 receives the beam 3, the UE 3 measures RSRP of an NDL in an area in which the UE 3 is located, and the UE 3 may determine, based on the priority information, that an SUL with a highest priority is SUL config3, and compare the RSRP of the NDL with rsrp-ThresholdSSB-SUL3. If the RSRP of the NDL is less than rsrp-ThresholdSSB-SUL3, the UE 3 may initiate the random access over SUL config3. If the RSRP of the NDL is not less than rsrp-ThresholdSSB-SUL3, the UE 3 may determine, based on the priority information, that an SUL with a highest priority is SUL config1, and may compare the RSRP of the NDL with rsrp-ThresholdSSB-SUL1. If the RSRP of the NDL is less than rsrp-ThresholdSSB-SUL1, the UE 3 may initiate the random access over SUL config1. If the RSRP of the NDL is not less than rsrp-ThresholdSSB-SUL1, the UE 3 may determine, based on the priority information, that an SUL with a highest priority is SUL config2, and may compare the RSRP of the NDL with rsrp-ThresholdSSB-SUL2. If the RSRP of the NDL is less than rsrp-ThresholdSSB-SUL2, the UE 3 may initiate the random access over SUL config2. If the RSRP of the NDL is not less than rsrp-ThresholdSSB-SUL2, the UE 3 may initiate the random access over the NUL. It should be noted that if the RSRP of the NDL is not less than rsrp-ThresholdSSB-SUL1, the UE 2 may alternatively directly initiate the random access over the NUL. A specific process of initiating the random access is not limited in this application. The foregoing process is merely an example.

It should be noted that in the foregoing example, the SUL thresholds corresponding to the SULs may be the same or different. This is not limited in this application. That is, a curve NDL-RSRP (ref) in FIG. 3C may alternatively be replaced with three different arc curves NDL-RSRP1 (ref), NDL-RSRP2 (ref) and NDL-RSRP3 (ref) in FIG. 3B. For a specific setting manner, refer to Example 1. Details are not described again.

Example 4

The network device sends SIBs with different configurations by using different NDL beams. In other words, the network device sends different SIBs in the NDL beams in different directions, and the SIB include SUL configuration information. A difference from Example 1 lies in that each SIB is configured with a plurality of SULs (SUL identifiers), and each SIB may be further configured with one SUL threshold or SUL thresholds respectively corresponding to the plurality of SULs. In this example, the SUL configuration information may further include a validity identifier and priority information of each SUL.

In this way, when receiving the beams, by measuring reference signal strength of the NDL, the UE may select an SUL from the plurality of SULs based on the reference signal strength of the NDL, the SUL thresholds, and the validity identifier and/or the priority information of each SUL, to initiate random access. Optionally, the validity identifiers of the plurality of SULs may include two types of identifiers: valid identifiers and invalid identifiers.

For example, the network device sends SIBs with three configurations by using three NDL beams, and in SUL configuration information of the SIBs, priorities increase in an ascending order of values.

TABLE 1.4

| Beam | SUL configuration information |
| --- | --- |
| SIB-beam 1 | RACH-ConfigCommon:<br>SUL config1: 3, available<br>rsrp-ThresholdSSB-SUL1<br>SUL config2: 1, unavailable<br>rsrp-ThresholdSSB-SUL2<br>SUL config3: 2, available<br>rsrp-ThresholdSSB-SUL3 |
| SIB-beam 2 | RACH-ConfigCommon:<br>SUL config1: 1, unavailable<br>rsrp-ThresholdSSB-SUL1<br>SUL config2: 3, available<br>rsrp-ThresholdSSB-SUL2<br>SUL config3: 2, available<br>rsrp-ThresholdSSB-SUL3 |
| SIB-beam 3 | RACH-ConfigCommon:<br>SUL config1: 2, available<br>rsrp-ThresholdSSB-SUL1<br>SUL config2: 1, unavailable<br>rsrp-ThresholdSSB-SUL2<br>SUL config3: 3, available<br>rsrp-ThresholdSSB-SUL3 |

As shown in FIG. 3C and Table 1.4, in comparison with Example 3, the SUL configuration information in Example 4 further includes a validity identifier of each SUL. A specific configuration is shown in Table 1.4. Details are not described again.

As shown in FIG. 3C, when UE 1 within a coverage range of the beam 1 receives the beam 1, the UE 1 measures RSRP of an NDL in an area in which the UE 1 is located, and the UE 1 may determine, based on the priority information and the validity identifiers, that a valid SUL with a highest priority is SUL config1, and compare the RSRP of the NDL with rsrp-ThresholdSSB-SUL1. If the RSRP of the NDL is less than rsrp-ThresholdSSB-SUL1, the UE 1 may initiate the random access over SUL config1. If the RSRP of the NDL is not less than rsrp-ThresholdSSB-SUL1, the UE 1 may determine, based on the priority information and the validity identifiers, that a next valid SUL with a highest priority is SUL config3, and may compare the RSRP of the NDL with rsrp-ThresholdSSB-SUL3. If the RSRP of the NDL is less than rsrp-ThresholdSSB-SUL3, the UE 1 may initiate the random access over SUL config3. If the RSRP of the NDL is not less than rsrp-ThresholdSSB-SUL3, the UE 1 may directly initiate the random access over the NUL. It should be noted that, in FIG. 3C, the UE 1 is also within a coverage range of the beam 3. When receiving the beam 3, the UE 1 may also perform random access based on the SUL configuration information in the beam 3. For a specific process, refer to the following descriptions.

When UE 2 within a coverage range of the beam 2 receives the beam 2, the UE 2 measures RSRP of an NDL in an area in which the UE 2 is located, and the UE 2 may determine, based on the priority information and the validity identifiers, that a valid SUL with a highest priority is SUL config2, and compare the RSRP of the NDL with rsrp-ThresholdSSB-SUL2. If the RSRP of the NDL is less than rsrp-ThresholdSSB-SUL2, the UE 2 may initiate the random access over SUL config2. If the RSRP of the NDL is not less than rsrp-ThresholdSSB-SUL2, the UE 2 may determine, based on the priority information and the validity identifiers, that a next valid SUL with a highest priority is SUL config3, and may compare the RSRP of the NDL with rsrp-ThresholdSSB-SUL3. If the RSRP of the NDL is less than rsrp-ThresholdSSB-SUL3, the UE 2 may initiate the random access over SUL config3. If the RSRP of the NDL is not less than rsrp-ThresholdSSB-SUL3, the UE 2 may directly initiate the random access over the NUL. It should be noted that, in FIG. 3C, the UE 2 is also within a coverage range of the beam 3. When receiving the beam 3, the UE 2 may also perform random access based on the SUL configuration information in the beam 3. For a specific process, refer to the following descriptions.

When UE 3 within a coverage range of the beam 3 receives the beam 3, the UE 3 measures RSRP of an NDL in an area in which the UE 3 is located, and the UE 3 may determine, based on the priority information and the validity identifiers, that a valid SUL with a highest priority is SUL config3, and compare the RSRP of the NDL with rsrp-ThresholdSSB-SUL3. If the RSRP of the NDL is less than rsrp-ThresholdSSB-SUL3, the UE 3 may initiate the random access over SUL config3. If the RSRP of the NDL is not less than rsrp-ThresholdSSB-SUL3, the UE 3 may determine, based on the priority information and the validity identifiers, that a next valid SUL with a highest priority is SUL config1, and may compare the RSRP of the NDL with rsrp-ThresholdS SB-SUL1. If the RSRP of the NDL is less than rsrp-ThresholdS SB-SUL1, the UE 3 may initiate the random access over SUL config1. If the RSRP of the NDL is not less than rsrp-ThresholdSSB-SUL1, the UE 3 may directly initiate the random access over the NUL. It should be noted that, in FIG. 3C, the UE 3 is also within the coverage range of the beam 1. When receiving the beam 1, the UE 3 may also perform random access based on the SUL configuration information in the beam 1. For a specific process, refer to the foregoing descriptions.

Example 5

The network device sends SIBs with different configurations by using different NDL beams. In other words, the network device sends different SIBs in the NDL beams in different directions, and the SIB include SUL configuration information. A difference from Example 1 lies in that each SIB is configured with a plurality of SULs (SUL identifiers), each SIB may be further configured with SUL thresholds respectively corresponding to the plurality of SULs, and a plurality of SUL thresholds are different.

In this way, when receiving the beams, by measuring reference signal strength of the NDL, the UE may select an SUL from the plurality of SULs based on the reference signal strength of the NDL and the SUL thresholds, to initiate random access.

TABLE 1.5

| Beam | SUL configuration information |
|---|---|
| SIB-beam 1 | RACH-ConfigCommon:<br>SUL config1 :<br>rsrp-ThresholdSSB-SUL1<br>SUL config2:<br>rsrp-ThresholdSSB-SUL2<br>SUL config3:<br>rsrp-ThresholdSSB-SUL3 |
| SIB-beam 2 | RACH-ConfigCommon:<br>SUL config4:<br>rsrp-ThresholdSSB-SUL1 |

TABLE 1.5-continued

| Beam | SUL configuration information |
|---|---|
| | SUL config5:<br>rsrp-ThresholdSSB-SUL2<br>SUL config6:<br>rsrp-ThresholdSSB-SUL3 |

Figure 3D:
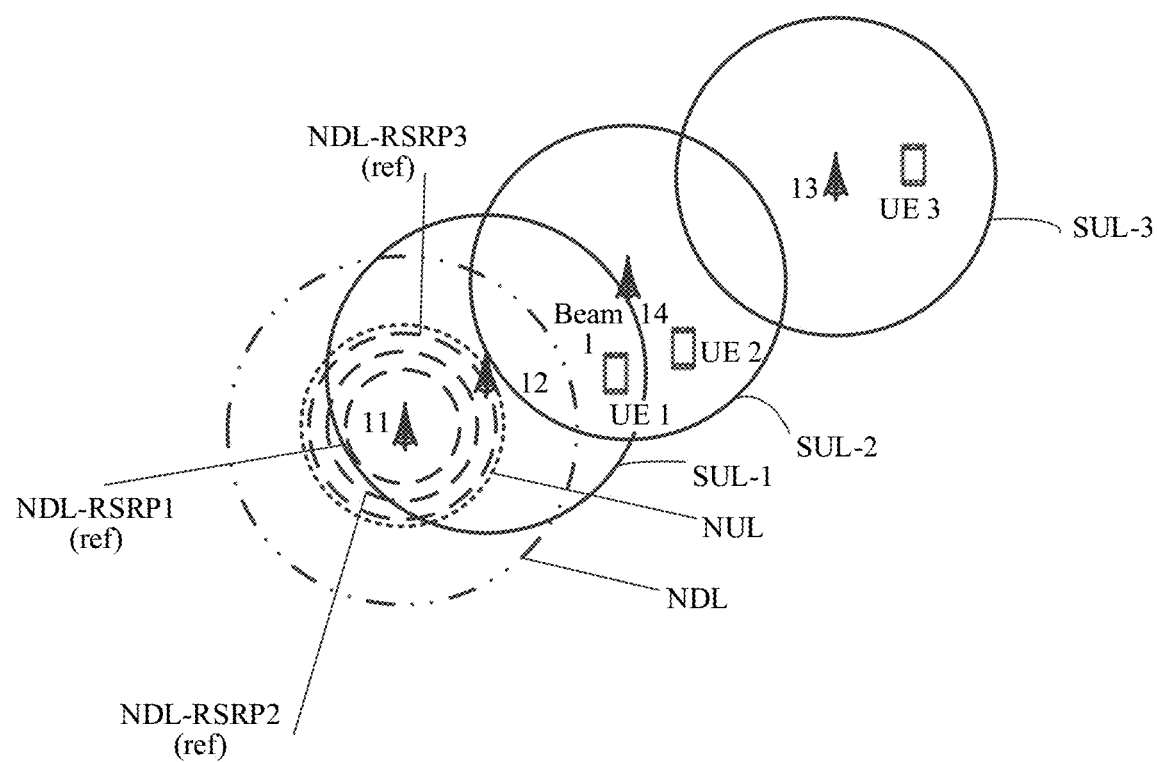
FIG. 3D is a schematic diagram of a scenario of random access according to an example of this application.

FIG. 3D is a schematic diagram of a scenario of random access according to an example of this application. As shown in FIG. 3D and Table 1.5, three SULs: an SUL-4, an SUL-5, and an SUL-6 in a direction of the beam 2 are not drawn in FIG. 3D.

The SUL configuration information in a SIB sent by the network device 11 by using the beam 1 includes: an SUL identifier SUL config1 of an SUL-1 and an SUL threshold rsrp-ThresholdSSB-SUL1, the SUL configuration information in a SIB sent by using the beam 2 includes: an SUL identifier SUL config2 of an SUL-2 and an SUL threshold rsrp-ThresholdSSB-SUL2, and the SUL configuration information in a SIB sent by using the beam 3 includes: an SUL identifier SUL config3 of an SUL-3 and an SUL threshold rsrp-ThresholdSSB-SUL3. That is, the network device 11 sends the SIBs with different configurations by using different NDL beams. The SUL threshold rsrp-ThresholdSSB-SUL1 of the SUL-1 may be NDL-RSRP1 (ref), the SUL threshold rsrp-ThresholdSSB-SUL2 of the SUL-2 may be NDL-RSRP2 (ref), and the SUL threshold rsrp-ThresholdSSB-SUL3 of the SUL-3 may be NDL-RSRP3 (ref).

When UE 1 within a coverage range of the beam 1 receives the beam 1, the UE 1 measures RSRP of an NDL in an area in which the UE 1 is located, and compares the RSRP of the NDL with the NDL-RSRP1 (ref), the NDL-RSRP2 (ref), and the NDL-RSRP3 (ref). Assuming the NDL-RSRP1 (ref)<the NDL-RSRP2 (ref)<the NDL-RSRP3 (ref), if the RSRP of the NDL is less than the NDL-RSRP1 (ref), UE 1 may initiate the random access over SUL config1. If the RSRP of the NDL is not less than the NDL-RSRP1 (ref) but less than the NDL-RSRP2 (ref), the UE 1 may initiate random access over the SUL-2. If the RSRP of the NDL is not less than the NDL-RSRP2 (ref) but less than the NDL-RSRP3 (ref), the UE 1 may initiate random access over the SUL-3. If the RSRP of the NDL is not less than the NDL-RSRP3 (ref), the UE 1 may initiate the access over the NUL.

Embodiment 2

The application scenario shown in FIG. 2B is used as an example. In a possible implementation, a first network device (a network device 11) may send SIBs with different configurations to UE by using NDL beams. The SIB includes SUL configuration information. SUL configuration information configured in different NDL beams may be the same or different. This is not limited in this application. The SUL configuration information may include a plurality of SULs (SUL identifiers), and each SIB may be further configured with one SUL threshold or SUL thresholds respectively corresponding to the plurality of SULs.

In this embodiment, one NDL cell may correspond to a plurality of SSBs, and one SSB may have one index (SSB index). In this embodiment, the NDL beams sent by the first network device may further include SSBs, and SSB indexes corresponding to the SSBs are indicated in the SSBs. Different NDL beams include different SSB indexes, and the SSB index may further indicate an SUL used to initiate access.

During initial access, the UE may blindly detect that the SSBs implement downlink time-frequency synchronization, and may obtain the SSB indexes of the SSBs. The UE selects an SUL from the plurality of SULs based on the SSB indexes to initiate random access.

Example 1

The first network device sends configured SIBs by using NDL beams, where the SIB includes SUL configuration information. Each SIB is configured with a plurality of SULs (SUL identifiers), and each SIB is further configured with one SUL threshold or SUL thresholds respectively corresponding to the plurality of SULs. The NDL beams sent by the first network device may further include SSBs, and SSB indexes corresponding to the SSBs are indicated in the SSBs. Different NDL beams include different SSB indexes.

In this example, the SUL configuration information configured in the NDL beams in different directions is the same.

Table 2.1 shows an example of SUL configuration information in this example.

TABLE 2.1

| Beam | SUL configuration information |
| --- | --- |
| SIB-beam 1<br>SSB index 1 | RACH-ConfigCommon:<br>SUL config1:<br>rsrp-ThresholdSSB-SUL1<br>SUL config2:<br>rsrp-ThresholdSSB-SUL2<br>SUL config3:<br>rsrp-ThresholdSSB-SUL3 |
| SIB-beam 2<br>SSB index 2 | RACH-ConfigCommon:<br>SUL config1:<br>rsrp-ThresholdSSB-SUL1<br>SUL config2:<br>rsrp-ThresholdSSB-SUL2<br>SUL config3:<br>rsrp-ThresholdSSB-SUL3 |
| SIB-beam 3<br>SSB index 3 | RACH-ConfigCommon:<br>SUL config1:<br>rsrp-ThresholdSSB-SUL1<br>SUL config2:<br>rsrp-ThresholdSSB-SUL2<br>SUL config3:<br>rsrp-ThresholdSSB-SUL3 |

Figure 3E:
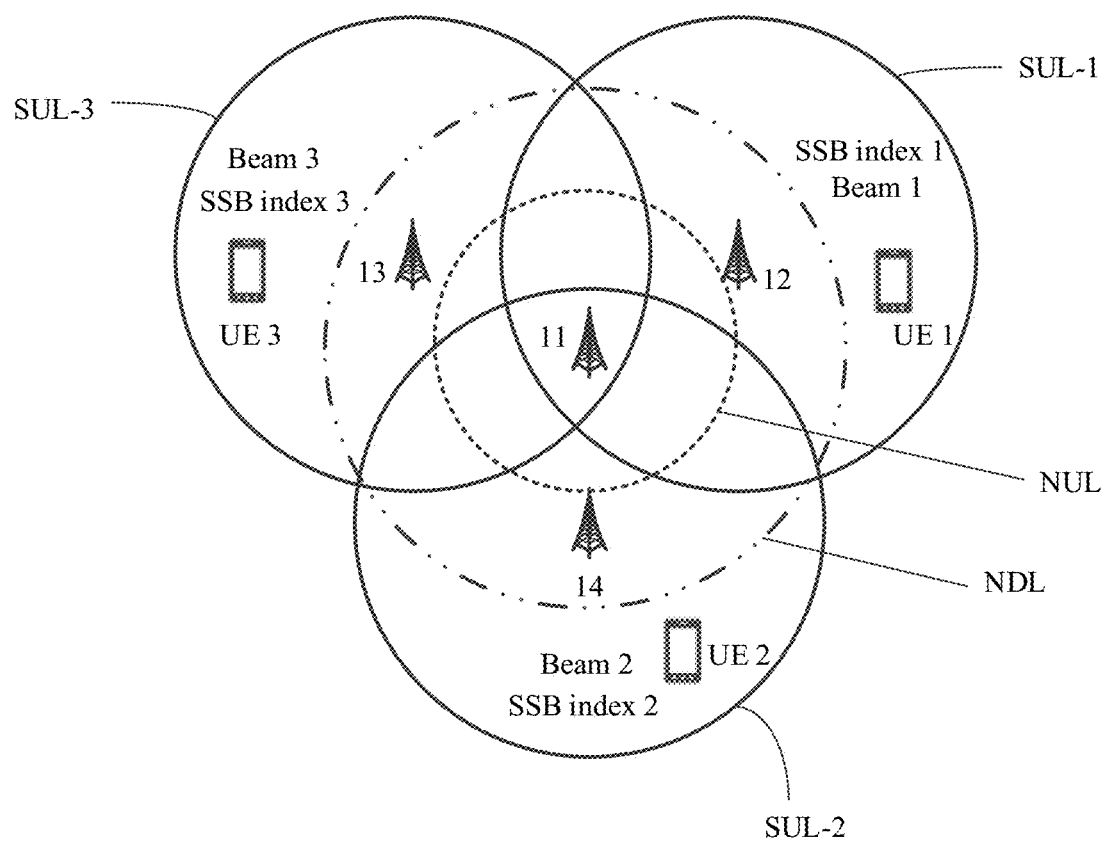
FIG. 3E is a schematic diagram of a scenario of random access according to an example of this application.

FIG. 3E is a schematic diagram of a scenario of random access according to an example of this application. As shown in FIG. 3E and Table 2.1, the SUL configuration information in a SIB sent by the network device 11 by using the beam 1 includes: SUL config1 and rsrp-ThresholdSSB-SUL1, SUL config2 and rsrp-ThresholdSSB-SUL2, and SUL config3 and rsrp-ThresholdSSB-SUL3, and an index of an SSB carried in the beam 1 sent by the network device 11 is an SSB index 1.

The SUL configuration information in a SIB sent by the network device 11 by using the beam 2 includes: SUL config1 and rsrp-ThresholdSSB-SUL1, SUL config2 and rsrp-ThresholdSSB-SUL2, and SUL config3 and rsrp-ThresholdSSB-SUL3, and an index of an SSB carried in the beam 2 sent by the network device 11 is an SSB index 2.

The SUL configuration information in a SIB sent by the network device 11 by using the beam 3 includes: SUL config1 and rsrp-ThresholdSSB-SUL1, SUL config2 and rsrp-ThresholdSSB-SUL2, and SUL config3 and rsrp-ThresholdSSB-SUL3, and an index of an SSB carried in the beam 3 sent by the network device 11 is an SSB index 3.

For a configuration of the SUL thresholds in each piece of SUL configuration information, refer to the foregoing descriptions. Details are not described again. In this example, the SUL configuration information in the NDL beams is the same, but the SSB indexes carried in different NDL beams are different.

In a possible implementation, the UE obtains the SSB indexes. After receiving the SUL configuration information, the UE obtains a total quantity of configured SUL cells, and may select an SUL based on a remainder between a value of the SSB index and the total quantity of SUL cells, to initiate random access. For example, in this example, assuming that the SSB index 1 is 1, the SSB index 2 is 2, and the SSB index 3 is 3, an accessed SUL indicated by the SSB index 1 is an SUL-1, an accessed SUL indicated by the SSB index 2 is an SUL-2, and an accessed SUL indicated by the SSB index 3 is an SUL-3.

In another possible implementation, one NDL cell may correspond to a plurality of SSBs, and one SSB may have one index (SSB index). SSB indexes corresponding to the plurality of SSBs are numbered in sequence, and each NDL beam corresponds to one SUL cell. The SSB index carried in the NDL beam sent by the first network device has the same number as the SUL cell. In this way, the SSB index is obtained. After receiving SUL configuration information, the UE directly selects, based on the SSB index, an SUL with the same number to initiate random access.

In this example, one SSB index is configured in each NDL beam. This application is not limited thereto.

Example 2

In this example, the network device may further configure a plurality of SSBs and an SSB index corresponding to each SSB in each NDL beam, for example, configure a corresponding SSB index for each SUL. When a plurality of SSB indexes are configured, the UE may select an SUL based on reference signal strength of the plurality of SSBs to initiate random access, for example, the UE may select an SUL corresponding to an SSB with highest reference signal strength to initiate the random access.

For example, SUL configuration information in a SIB sent by the network device 11 by using a beam 1 includes: SUL config1 and rsrp-ThresholdSSB-SUL1, SUL config2 and rsrp-ThresholdSSB-SUL2, and SUL config3 and rsrp-ThresholdSSB-SUL3. The beam 1 sent by the network device includes: a plurality of SSBs and indexes: an SSB index 1, an SSB index 2, and an SSB index 3 of the plurality of SSBs.

The UE may select an SUL based on reference signal strength of the SSBs corresponding to the SSB index 1, the SSB index 2, and the SSB index 3, to initiate random access. For example, if the SSB corresponding to the SSB index 1 has highest reference signal strength, the UE may select to initiate the random access over an SUL-1.

Example 3

In another possible implementation, each piece of SUL configuration information may further include: validity identifiers and/or priority information of SULs. In other words, when a plurality of SULs are configured in the SUL configuration information, each piece of SUL configuration information may include one or a combination of a plurality of parameters of the validity identifier and the priority information.

The UE may select an SUL based on one or a combination of a plurality of parameters of an SUL threshold, an SSB index, the validity identifier, and the priority information, to initiate random access.

A process in which the UE selects the SUL to initiate the random access is described below by using an example in which each piece of SUL configuration information includes the SUL thresholds and the validity identifiers of the SULs.

TABLE 2.2

| Beam | SUL configuration information |
|---|---|
| SIB-beam 1 SSB index 1 | RACH-ConfigCommon: SUL config1: available rsrp-ThresholdSSB-SUL1 SUL config2: unavailable rsrp-ThresholdSSB-SUL2 |
| SIB-beam 2 SSB index 2 | RACH-ConfigCommon: SUL config1: unavailable rsrp-ThresholdSSB-SUL1 SUL config2: available rsrp-ThresholdSSB-SUL2 |

As shown in Table 2.2, when UE 1 within a coverage range of the beam 1 receives the beam 1, the UE 1 measures RSRP of an NDL in an area in which the UE 1 is located, and the UE 1 may determine, based on the validity identifiers, that a valid SUL is SUL config1, and compare the RSRP of the NDL with rsrp-ThresholdSSB-SUL1. If the RSRP of the NDL is less than rsrp-ThresholdSSB-SUL1, the UE 1 may initiate random access over SUL config1. If the RSRP of the NDL is not less than rsrp-ThresholdSSB-SUL1, the UE 1 may initiate the random access over the NUL.

In a possible implementation, in Table 2.2, each piece of SUL configuration information may alternatively include only one SSB index. When the validity identifier conflicts with the SUL indicated by the SSB index, the UE may select the SUL based on the validity identifier to initiate random access.

A process in which the UE selects the SUL to initiate the random access is described below by using an example in which each piece of SUL configuration information includes SUL thresholds and priority information of SULs.

TABLE 2.3

| Beam | SUL configuration information |
|---|---|
| SIB-beam 1 SSB index 1 | RACH-ConfigCommon: SUL config1: 2 rsrp-ThresholdSSB-SUL1 SUL config2: 1 rsrp-ThresholdSSB-SUL2 |
| SIB-beam 2 SSB index 2 | RACH-ConfigCommon: SUL config1: 1 rsrp-ThresholdSSB-SUL1 SUL config2: 2 rsrp-ThresholdSSB-SUL2 |

As shown in Table 2.3, the beam 1 sent by the network device 11 carries an SSB index 1, the SUL configuration information in the beam 1 is: SUL config1 and a corresponding SUL threshold rsrp-ThresholdSSB-SUL1, where a priority of SUL config1 is 2; and SUL config2 and a corresponding SUL threshold rsrp-ThresholdSSB-SUL2, where a priority of SUL config2 is 1. The SUL configuration information in the beam 2 is: SUL config1 and a corresponding SUL threshold rsrp-ThresholdSSB-SUL1, where a priority of SUL config1 is 1; and SUL config2 and a corresponding SUL threshold rsrp-ThresholdSSB-SUL2, where a priority of SUL config2 is 2.

When UE 1 within a coverage range of the beam 1 receives the beam 1, the UE 1 measures RSRP of an NDL in an area in which the UE 1 is located, and the UE 1 may determine, based on the SSB index 1, that an indicated SUL is SUL config1, and compare the RSRP of the NDL with rsrp-ThresholdSSB-SUL1. If the RSRP of the NDL is less than rsrp-ThresholdSSB-SUL1, the UE 1 may initiate random access over SUL config1. If the RSRP of the NDL is not less than rsrp-ThresholdSSB-SUL1, the UE 1 may determine, based on the priority information, that an SUL with a higher priority is SUL config2, and compare the RSRP of the NDL with rsrp-ThresholdSSB-SUL2. If the RSRP of the NDL is less than rsrp-ThresholdSSB-SUL2, the UE 1 may initiate random access over SUL config2. If the RSRP of the NDL is not less than rsrp-ThresholdSSB-SUL2, the UE 1 may initiate random access over the NUL.

That is, the UE 1 may preferentially initiate the random access based on the SUL indicated by the SSB index. If the UE 1 does not initiate the access over the SUL indicated by the SSB index, the UE 1 may further select, based on the measured RSRP of the NDL and the SUL thresholds corresponding to the priority information, an uplink resource for initiating the access. It should be noted that the foregoing some manners of initiating the random access are merely some examples of this application, and this application is not limited thereto.

Embodiment 3

The application scenario shown in FIG. 2B is still used as an example. In this embodiment, a first network device may omnidirectionally broadcast SUL configuration information in a system SIB. The SUL configuration information includes at least a matching relationship between a plurality of SULs and a plurality of SDLs and SDL measurement configuration information. The SDL measurement configuration information may include a reference signal class, a reference signal configuration (such as a subframe ratio), and the like. The SULs and the SDLs in the SUL configuration information are provided by a second network device (a network device 12, a network device 13, or a network device 14).

After receiving the SIB, the UE measures reference signal strength of the SDLs based on the SDL measurement configuration information, and may further measure reference signal strength of an NDL. The measured reference signal strength of the SDLs and the measured reference signal strength of the NDL may all be RSRP.

The UE may select a UL (SUL or NUL) based on the measured reference signal strength of the SDLs and the measured reference signal strength of the NDL, to initiate random access. In Embodiment 3, there may be a plurality of implementations in which the UE selects the UL to initiate the random access. This application is described by using several specific examples.

Example 1

As shown in Table 3.1, the first network device omnidirectionally broadcasts a SIB in the SIB system, and SUL configuration information received by the UE includes: SUL config1 associated with an SDL 1, SUL config2 associated with an SDL 2, and SUL config3 associated with an SDL 3.

TABLE 3.1

| SIB (SUL configuration information) |
|---|
| RACH-ConfigCommon: SUL config1 |

TABLE 3.1-continued

| SIB (SUL configuration information) |
|---|
| Related SDL1 meas msg |
| SUL config2: |
| Related SDL2 meas msg |
| SUL config3: |
| SIB (SUL configuration information) |
| Related SDL3 meas msg |

Figure 4A:
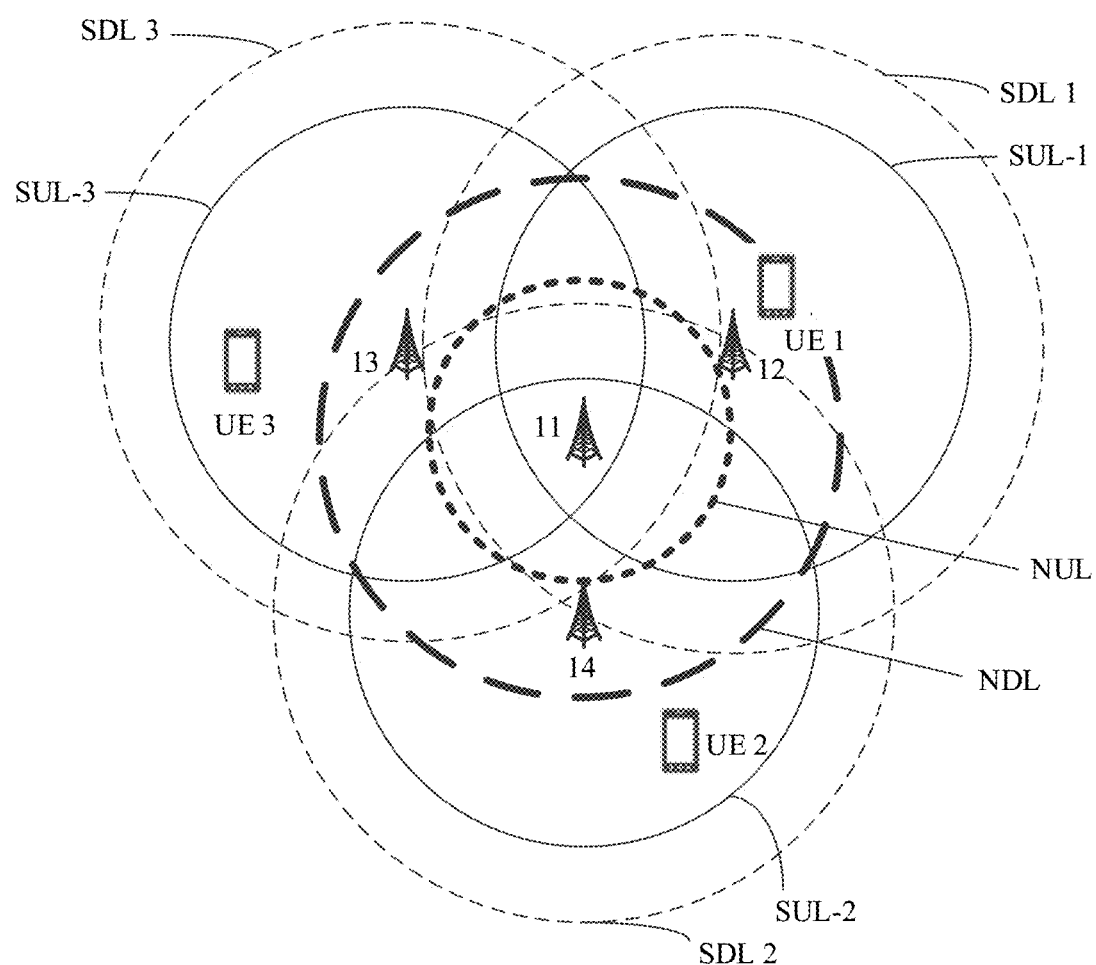
FIG. 4A is a schematic diagram of an application scenario according to an embodiment of this application.

FIG. 4A is a schematic diagram of an application scenario according to an embodiment of this application. As shown in FIG. 4A, a network device 11 may omnidirectionally broadcast a SIB in a SIB system to configure SULs and configure associated SDLs (supplementary downlinks, supplementary downlinks). In FIG. 4A, a curve SUL-1 and a curve SDL 1 are a supplementary uplink and a supplementary downlink that are configured associatively, a curve SUL-2 and a curve SDL 2 are a supplementary uplink and a supplementary downlink that are configured associatively, and a curve SUL-3 and a curve SDL3 are a supplementary uplink and a supplementary downlink that are configured associatively. In this way, the UE may further measure distances from the UE to the second network devices (the network device 12, the network device 13, and the network device 14) by using reference signal strength of the SDLs. For example, higher reference signal strength of the SDL measured by the UE may indicate a smaller distance from the network device corresponding to the SDL. UE 1 in FIG. 4A is used as an example. If reference signal strength of the SDL 1 measured by the UE 1 may be higher than reference signal strength of the SDL 2 and reference signal strength of the SDL 3, the UE 1 is closer to the network device 12. Therefore, in this example, the UE may select an SUL based on the reference signal strength of the SDLs to initiate random access.

Specifically, when receiving the SIB, the UE measures the reference signal strength of the SDLs based on the SDL measurement configuration information. After reference signal strength of the NDL is measured, there may be the following several cases of selecting a UL to initiate the random access.

1. If detecting reference signal strength of all the SDLs in a plurality of SDLs, the UE may compare the reference signal strength of the SDLs with the reference signal strength of the NDL, and select a UL corresponding to a DL with highest reference signal strength as a carrier to initiate the random access. For example, the UE detects that the reference signal strength of the SDL 1 is SDL1-RSRP, the reference signal strength of the SDL 2 is SDL2-RSRP, and the reference signal strength of the SDL 3 is SDL3-RSRP, and further detects that the reference signal strength of the NDL is NDL-RSRP. If the NDL has highest reference signal strength, in other words, the NDL-RSRP is greater than the SDL1-RSRP, the SDL2-RSRP, and the SDL3-RSRP, the UE may perform access over an NUL. If the SDL 1 has highest reference signal strength SDL1-RSRP, the UE may initiate the random access over an SUL corresponding to the SDL 1.
2. If detecting reference signal strength of some SDLs in a plurality of SDLs, the UE may compare the detected reference signal strength of some SDLs in the plurality of SDLs with the reference signal strength of the NDL, and select a UL corresponding to a DL with highest reference signal strength as a carrier to initiate the random access. For example, the UE detects that the reference signal strength of the SDL 1 is SDL1-RSRP and the reference signal strength of the SDL 2 is SDL2-RSRP, detects no reference signal strength of the SDL 3, and further detects that the reference signal strength of the NDL is NDL-RSRP. If the NDL has highest reference signal strength, or the NDL-RSRP is greater than the SDL1-RSRP and the SDL2-RSRP, the UE may perform access over an NUL. If the SDL 1 has highest reference signal strength SDL1-RSRP, the UE may initiate the random access over an SUL corresponding to the SDL 1.
3. If detecting no reference signal strength of any one of a plurality of SDLs, the UE does not initiate the random access over the SUL. If detecting the reference signal strength of the NDL, the UE may initiate the random access over an NUL. If detecting neither the reference signal strength of any SDL nor the reference signal strength of the NDL, the UE may not initiate the random access.

Example 2

As shown in Table 3.2, in comparison with Example 1 in Embodiment 3, in a SIB broadcast by the first network device in the SIB system, in addition to SUL config1 associated with an SDL 1, SUL config2 associated with an SDL 2, and SUL config3 associated with an SDL 3, SUL configuration information further includes an NDL threshold NDL-RSRP (ref).

TABLE 3.2

| SIB (SUL configuration information) |
|---|
| RACH-ConfigCommon: |
| SUL config1 |
| Related SDL1 meas msg |
| SUL config2: |
| Related SDL2 meas msg |
| SUL config3: |
| Related SDL3 meas msg |
| NDL-RSRP (ref) |

Figure 4B:
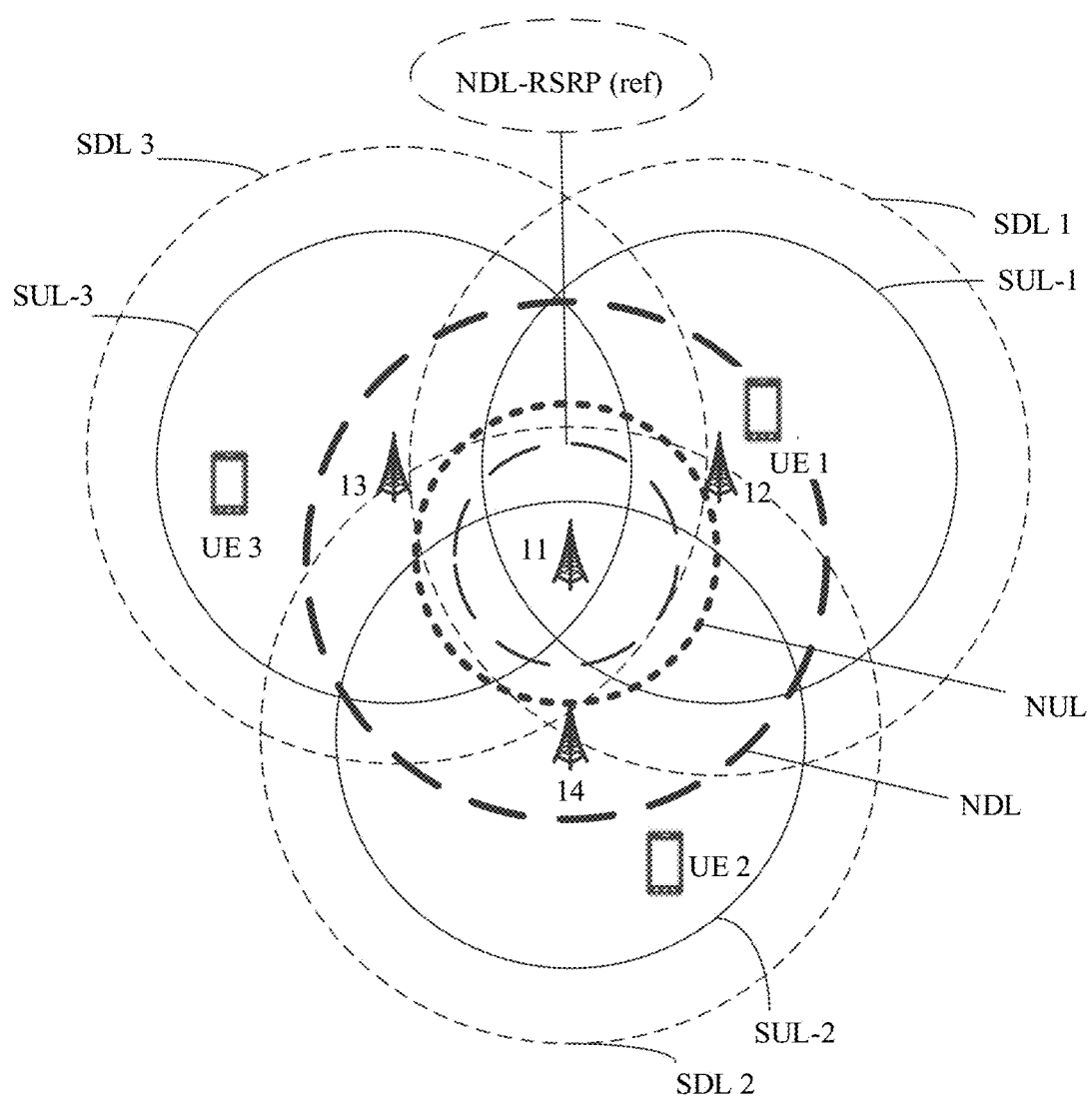
FIG. 4B is a schematic diagram of an application scenario according to an embodiment of this application.

FIG. 4B is a schematic diagram of an application scenario according to an embodiment of this application. As shown in FIG. 4B, in addition to the same configuration as that in FIG. 4A, the NDL threshold NDL-RSRP (ref) is further configured in FIG. 4B. When the reference signal strength of the NDL is less than the NDL threshold, the UE may select an SUL based on the reference signal strength of the SDLs, to initiate random access. When the reference signal strength of the NDL is not less than the NDL threshold, the UE may determine that a distance from the first network device is small, the NUL provided by the first network device may meet a requirement, and the UE may initiate the random access over the NUL.

Specifically, when receiving the SIB, the UE measures the reference signal strength of the SDLs based on the SDL measurement configuration information. After the reference signal strength of the NDL is measured, with reference to the NDL RSRP (ref), there may be the following several cases of selecting a UL to initiate the random access.

1. The UE measures the reference signal strength of all the SDLs in the plurality of SDLs. If the reference signal strength of the NDL is less than the NDL threshold NDL-RSRP (ref), the UE may determine that the distance from the first network device is large, and may not be within a coverage range of the NUL. The UE may select an SUL corresponding to an SDL with highest reference signal strength to initiate the random access. If the reference signal strength of the NDL is not less than the NDL threshold NDL-RSRP (ref), the UE may be close to the first network device, and is within a coverage range of the NUL, and the UE may initiate the random access over the NUL.

For example, as shown in FIG. 4B, UE 1 is used as an example. The UE 1 detects that reference signal strength of the SDL 1 detected by is SDL1-RSRP, reference signal strength of the SDL 2 is SDL2-RSRP, and reference signal strength of the SDL 3 is SDL3-RSRP (not shown in the figure). The UE 1 further detects that the reference signal strength of the NDL is NDL-RSRP. If the reference signal strength NDL-RSRP of the NDL is not less than the NDL-RSRP (ref), the UE 1 may initiate the random access over the NUL. In the example shown in FIG. 4B, the UE 1 is far from the first network device 11, and the reference signal strength NDL-RSRP of the NDL may be less than the NDL-RSRP (ref). If the reference signal strength NDL-RSRP of the NDL is less than the NDL-RSRP (ref), the UE 1 may determine a maximum value of the SDL1-RSRP, the SDL2-RSRP, and the SDL3-RSRP. If the SDL1-RSRP is the maximum value, the UE 1 may initiate the random access over SUL config1 corresponding to the SDL 1.

2. The UE detects reference signal strength of some SDLs in the plurality of SDLs. If the reference signal strength of the NDL is less than the NDL threshold NDL-RSRP (ref), the UE may determine that the distance from the first network device is large, and may not be within a coverage range of the NUL. The UE may select, based on the reference signal strength of some SDLs in the plurality of detected SDLs, an SUL corresponding to an SDL with highest reference signal strength, to initiate the random access. If the reference signal strength of the NDL is not less than the NDL threshold NDL-RSRP (ref), the UE may be close to the first network device, and is within a coverage range of the NUL, and the UE may initiate the random access over the NUL.

For example, as shown in FIG. 4B, UE 1 is used as an example. The UE 1 detects that reference signal strength of the SDL 1 is SDL1-RSRP and reference signal strength of the SDL 2 is SDL2-RSRP, detects no reference signal strength of the SDL 3, and further detects that the reference signal strength of the NDL is NDL-RSRP. If the reference signal strength NDL-RSRP of the NDL is less than the NDL-RSRP (ref), the UE 1 may determine a maximum value of the SDL1-RSRP and the SDL2-RSRP. If the SDL1-RSRP is the maximum value, the UE 1 may initiate the random access over SUL config1 corresponding to the SDL 1.

3. The UE detects no reference signal strength of any one of the plurality of SDLs. The UE does not initiate the random access over the SUL. If the UE detects the reference signal strength of the NDL, the UE may initiate the random access over the NUL. If detecting neither the reference signal strength of any SDL nor the reference signal strength of the NDL, the UE may not initiate the random access.

Example 3

In Example 3, in addition to the matching relationship between the plurality of SULs and the plurality of SDLs and the SDL measurement configuration information, the SUL configuration information may further include a plurality of SDL thresholds SDL X-RSRP (ref) respectively corresponding to the plurality of SDLs.

As shown in Table 3.3, a SIB broadcast by the first network device in the SIB system includes SUL configuration information. In addition to SUL config1 associated with an SDL 1, SUL config2 associated with an SDL 2, and SUL config3 associated with an SDL 3, the SUL configuration information further includes a plurality of SDL thresholds SDL X-RSRP (ref) respectively corresponding to a plurality of SDLs.

TABLE 3.3

| SIB (SUL configuration information) |
| --- |
| RACH-ConfigCommon: SUL config1 Related SDL1 meas msg SDL1-RSRP (ref); SUL config2: Related SDL2 meas msg SDL2-RSRP (ref); SUL config3: Related SDL3 meas msg SDL3-RSRP (ref) |

Figure 4C:
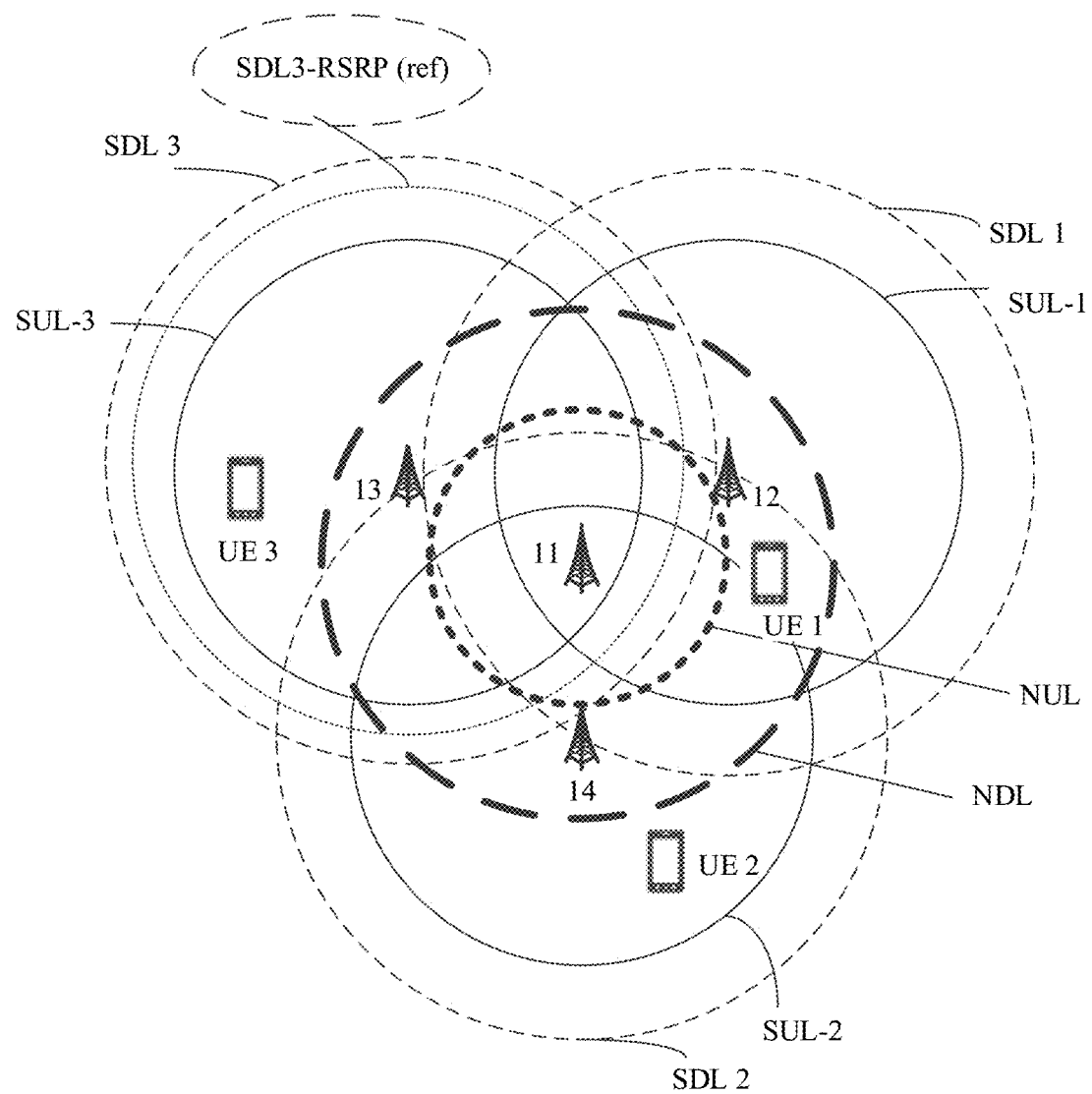
FIG. 4C is a schematic diagram of an application scenario according to an embodiment of this application.

FIG. 4C is a schematic diagram of an application scenario according to an embodiment of this application. As shown in FIG. 4C, in addition to the same configuration as that in FIG. 4A, the SDL thresholds corresponding to the plurality of SDLs are further configured in FIG. 4C. FIG. 4C shows only a threshold SDL3-RSRP (ref) of the SDL 3. In the application scenario shown in FIG. 4C, after measuring reference signal strength of the SDLs, the UE may select an available SUL for service based on a relationship between the reference signal strength of the SDLs and the SDL thresholds.

Specifically, when receiving the SIB, the UE measures the reference signal strength of the SDLs based on the SDL measurement configuration information. After the reference signal strength of the NDL is measured, with reference to the SDL thresholds, there may be the following several cases of selecting an uplink resource, to initiate the random access.

1. The UE detects the reference signal strength of all the SDLs in the plurality of SDLs. When the reference signal strength of the SDLs is greater than the corresponding SDL thresholds, the UE may determine that SULs corresponding to the SDLs are available for service. For example, when the SDL1-RSRP is greater than the SDL1-RSRP (ref), the UE may initiate the random access over an SUL-1 corresponding to the SDL 1.

Therefore, in this example, the UE may select the available SULs for service based on the reference signal strength of the SDLs and the corresponding SDL thresholds. The UE selects, based on the reference signal strength of the SDLs associated with the available SULs for service and the reference signal strength of the NDL, a UL corresponding to a DL with highest reference signal strength, to initiate the random access. Optionally, if the reference signal strength of the NDL is greater than the reference signal strength of the SDLs associated with all the SULs with the available services, the UE may initiate the random access over the NUL. If an SDL whose reference signal strength is greater than the NDL exists in the SDLs associated with the available SULs for service, the UE may initiate the random access over an SUL corresponding to the SDL whose reference signal strength is greater than that of the NDL.

For example, as shown in FIG. 4C, UE 1 is used as an example. The UE 1 detects that reference signal strength of the SDL 1 is SDL1-RSRP, reference signal strength of the SDL 2 is SDL2-RSRP, and reference signal strength of the SDL 3 is SDL3-RSRP, and further detects that the reference signal strength of the NDL is NDL-RSRP. If comparing the reference signal strength of the SDLs with the corresponding SDL thresholds, the UE 1 determines that the SDL1-RSRP is greater than the SDL1-RSRP (ref), the SDL2-RSRP is greater than the SDL2-RSRP (ref), but the SDL3-RSRP is less than the SDL3-RSRP (ref). The UE 1 may determine that the SUL-1 corresponding to the SDL 1 and the SUL-2 corresponding to the SDL 2 are available for service. It can be learned from the schematic diagram in FIG. 4C that the UE 1 is close to the second network device 12 corresponding to the SDL 1 and the second network device 14 corresponding to the SDL 2. The UE 1 may further compare the SDL1-RSRP and the SDL2-RSRP with the NDL-RSRP. If the NDL-RSRP is the highest, the UE 1 may initiate the random access over the NUL. If the SDL1-RSRP is the highest, the UE 1 may initiate the random access over the SUL-1 corresponding to the SDL 1. In the example shown in FIG. 4C, the UE 1 is closer to the second network device 12, and may learn through measurement that the SDL1-RSRP is the highest. The UE 1 may initiate the random access over the SUL-1 corresponding to the SDL 1.

2. The UE detects reference signal strength of some SDLs in the plurality of SDLs. The UE still selects available SULs for service based on the detected reference signal strength of some SDLs and corresponding SDL thresholds. The UE selects, based on the reference signal strength of the SDLs associated with the available SULs for service and the reference signal strength of the NDL, a UL corresponding to a DL with highest reference signal strength, to initiate the random access.

For example, as shown in FIG. 4C, UE 2 is used as an example. The UE 2 detects that reference signal strength of the SDL 1 is SDL1-RSRP and reference signal strength of the SDL 2 is SDL2-RSRP, and detects no reference signal of the SDL 3. The UE 2 further detects that the reference signal strength of the NDL is NDL-RSRP. If comparing the reference signal strength of the SDLs with the corresponding SDL thresholds, the UE 2 determines that the SDL1-RSRP is greater than the SDL1-RSRP (ref), and the SDL2-RSRP is greater than the SDL2-RSRP (ref). The UE 2 may determine that the SUL-1 corresponding to the SDL 1 and the SUL-2 corresponding to the SDL 2 are available for service. The UE 2 may further compare the SDL1-RSRP and the SDL2-RSRP with the NDL-RSRP. If the NDL-RSRP is the highest, the UE 2 may initiate the random access over the NUL. If the SDL2-RSRP is the highest, the UE 2 may initiate the random access over the SUL-2 corresponding to the SDL 2. In the example shown in FIG. 4C, the UE 2 is closer to the second network device 14, and may learn through measurement that the SDL2-RSRP is the highest. The UE 2 may initiate the random access over the SUL-2 corresponding to the SDL 2.

3. The UE detects no reference signal strength of any one of the plurality of SDLs. The UE does not initiate the random access over the SUL. If the UE detects the reference signal strength of the NDL, the UE may initiate the random access over the NUL. If detecting neither the reference signal strength of any SDL nor the reference signal strength of the NDL, the UE may not initiate the random access.

It should be noted that corresponding to a case in which the UE detects the reference signal strength of all or some of the plurality of SDLs, if all the detected reference signal strength of the SDLs is not greater than the corresponding SDL thresholds, the UE does not initiate the random access over the SUL. In this case, if a reference signal of the NDL is detected, the UE may initiate the random access over the NUL. If no reference signal of the NDL is detected, the UE may not perform access.

The SULs that can provide services may be first obtained through filtering by using the SDL thresholds, and an appropriate access resource is then selected from the available SULs for service, so that efficiency is improved.

Example 4

In Example 4, in addition to the matching relationship between the plurality of SULs and the plurality of SDLs and the SDL measurement configuration information, the SUL configuration information may further include a plurality of SDL thresholds SDLX-RSRP (ref) respectively corresponding to the plurality of SDLs and one NDL threshold NDL-RSRP (ref).

As shown in Table 3.4, a SIB broadcast by the first network device in the SIB system includes SUL configuration information. In addition to SUL config1 associated with an SDL 1, SUL config2 associated with an SDL 2, and SUL config3 associated with an SDL 3, the SUL configuration information further includes a plurality of SDL thresholds SDLX-RSRP (ref) respectively corresponding to a plurality of SDLs and one NDL threshold NDL-RSRP (ref).

TABLE 3.4

| SIB (SUL configuration information) |
|---|
| RACH-ConfigCommon:<br>SUL config1<br>Related SDL1 meas msg<br>SDL1-RSRP (ref);<br>SUL config2:<br>Related SDL2 meas msg<br>SDL2-RSRP (ref);<br>SUL config3:<br>Related SDL3 meas msg<br>SDL3-RSRP (ref)<br>NDL-RSRP (ref) |

Figure 4D:
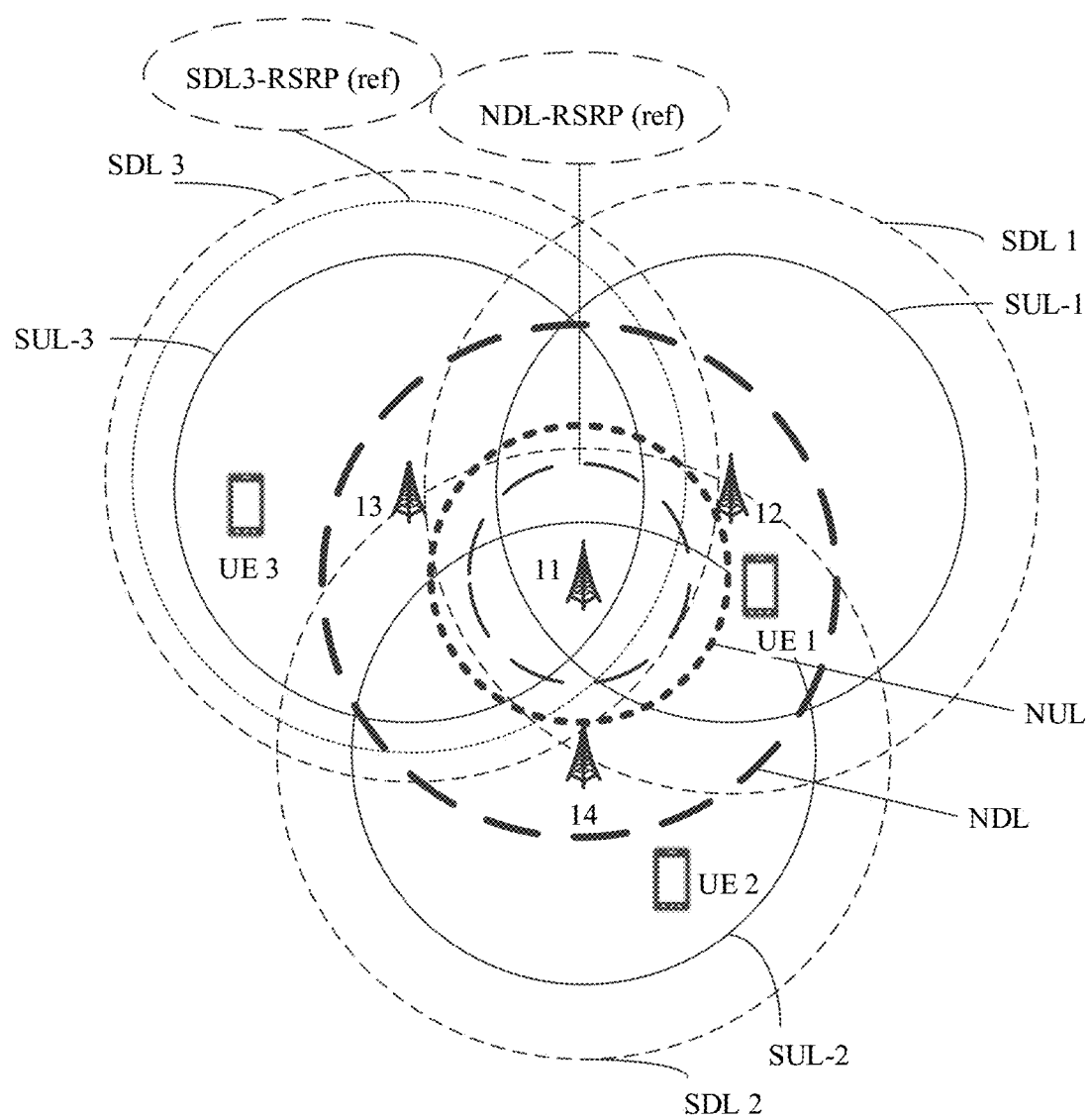
FIG. 4D is a schematic diagram of an application scenario according to an embodiment of this application.

FIG. 4D is a schematic diagram of an application scenario according to an embodiment of this application. In the application scenario shown in FIG. 4D, after measuring reference signal strength of the SDLs and reference signal strength of an NDL, the UE may select an uplink resource with reference to the SDL thresholds and the NDL threshold.

Specifically, after receiving the SIB, the UE measures the reference signal strength of the SDLs based on the SDL measurement configuration information, and measures the reference signal strength of the NDL. The UE selects available SULs for service based on the reference signal strength of the SDLs and the corresponding SDL thresholds, and then selects an uplink resource from the available SULs for service or an NUL with reference to a relationship between the reference signal strength of the NDL and the NDL threshold. Specifically, there may be the following several cases:

1. The UE detects the reference signal strength of all the SDLs in the plurality of SDLs. When the reference signal strength of the SDLs is greater than the corresponding SDL thresholds, the UE may determine that SULs corresponding to the SDLs are available for service. For example, when the SDL1-RSRP is greater than the SDL1-RSRP (ref), the UE may initiate the random access over an SUL-1 corresponding to the SDL 1.

Therefore, in this example, the UE may select the available SULs for service based on the reference signal strength of the SDLs and the corresponding SDL thresholds. The UE may determine whether the reference signal strength of the NDL is less than the NDL threshold NDL-RSRP (ref). If the reference signal strength of the NDL is not less than the NDL threshold NDL-RSRP (ref), the UE may determine that a distance from the first network device is small, and may initiate random access over the NUL within a service range of the NUL provided by the first network device. If the reference signal strength of the NDL is less than the NDL threshold NDL-RSRP (ref), the UE may select, from the available SULs for service, an SUL corresponding to an SDL with highest reference signal strength to initiate random access.

For example, as shown in FIG. 4D, UE 1 is used as an example. The UE 1 detects that reference signal strength of the SDL 1 is SDL1-RSRP, reference signal strength of the SDL 2 is SDL2-RSRP, and reference signal strength of the SDL 3 is SDL3-RSRP, and further detects that the reference signal strength of the NDL is NDL-RSRP. If comparing the reference signal strength of the SDLs with the corresponding SDL thresholds, the UE 1 determines that the SDL1-RSRP is greater than the SDL1-RSRP (ref), the SDL2-RSRP is greater than the SDL2-RSRP (ref), but the SDL3-RSRP is less than the SDL3-RSRP (ref). The UE 1 may determine that the SUL-1 corresponding to the SDL 1 and the SUL-2 corresponding to the SDL 2 are available for service. The UE 1 may compare the NDL-RSRP with the NDL-RSRP (ref), and a result of the comparison may be that the NDL-RSRP is less than the NDL-RSRP (ref). In the example in FIG. 4D, if the UE 1 is out of a coverage range of the NUL, the UE 1 does not initiate the random access over the NUL. The UE 1 may select an SUL from the SUL-1 and the SUL-2 that are available for service, to initiate the random access. Specifically, the UE 1 may compare the SDL1-RSRP and the SDL2-RSRP, and select an SUL corresponding to an SDL with highest reference signal strength to initiate the random access. In the example in FIG. 4D, the UE 1 is close to the second network device 12, and may learn through measurement that the SDL1-RSRP is greater than the SDL2-RSRP. The UE 1 may select the SUL-1 to initiate the random access.

2. The UE detects reference signal strength of some SDLs in the plurality of SDLs. The UE still selects available SULs for service based on the detected reference signal strength of some SDLs and corresponding SDL thresholds. If the reference signal strength of the NDL is less than the NDL threshold NDL-RSRP (ref), the UE may select, from the available SULs for service, an SUL corresponding to an SDL with highest reference signal strength to initiate random access.

For example, as shown in FIG. 4C, UE 2 is used as an example. The UE 2 detects that reference signal strength of the SDL 1 is SDL1-RSRP and reference signal strength of the SDL 2 is SDL2-RSRP, and detects no reference signal of the SDL 3. The UE 2 further detects that the reference signal strength of the NDL is NDL-RSRP. If comparing the reference signal strength of the SDLs with the corresponding SDL thresholds, the UE 2 determines that the SDL1-RSRP is greater than the SDL1-RSRP (ref), and the SDL2-RSRP is greater than the SDL2-RSRP (ref). The UE 2 may determine that the SUL-1 corresponding to the SDL 1 and the SUL-2 corresponding to the SDL 2 are available for service.

The UE 2 may compare the NDL-RSRP with the NDL-RSRP (ref), and a result of the comparison may be that the NDL-RSRP is less than the NDL-RSRP (ref). In the example in FIG. 4D, if the UE 2 is out of a coverage range of the NUL, the UE 2 does not initiate the random access over the NUL. The UE 2 may select an SUL from the SUL-1 and the SUL-2 that are available for service, to initiate the random access. Specifically, the UE 2 may compare the SDL1-RSRP and the SDL2-RSRP, and select an SUL corresponding to an SDL with highest reference signal strength to initiate the random access. In the example in FIG. 4D, the UE 2 is close to the second network device 14, and may learn through measurement that the SDL2-RSRP is greater than the SDL1-RSRP. The UE 2 may select the SUL-2 to initiate the random access.

3. The UE detects no reference signal strength of any one of the plurality of SDLs. The UE does not initiate the random access over the SUL. If the UE detects the reference signal strength of the NDL, the UE may initiate the random access over the NUL. If detecting neither the reference signal strength of any SDL nor the reference signal strength of the NDL, the UE may not initiate the random access.

It should be noted that corresponding to a case in which the UE detects the reference signal strength of all or some of the plurality of SDLs, if all the detected reference signal strength of the SDLs is not greater than the corresponding SDL thresholds, the UE does not initiate the random access over the SUL. In this case, if a reference signal of the NDL is detected, the UE may initiate the random access over the NUL. If no reference signal of the NDL is detected, the UE may not perform access.

Embodiment 4

The application scenario shown in FIG. 2B is still used as an example. In this embodiment, a first network device sends SIBs with different configurations by using different NDL beams, where the SIB includes SUL configuration information, and SUL configuration information included in the SIBs in different NDL beams may be different or the same. For configuration information included in the SUL configuration information, refer to the examples configured in Embodiment 3. The SUL configuration information may include: a matching relationship between at least one SUL and at least one SDL, and at least one piece of SDL measurement configuration information. The SUL and the SDL in the SUL configuration information are provided by a second network device (a network device 12, a network device 13, or a network device 14).

For a process in which the first network device sends the SIBs by using different NDL beams, refer to the examples in Embodiment 1 and Embodiment 2.

In an example, the first network device sends SIBs by using different NDL beams. SUL configuration information in each SIB may include: one SUL, one SDL, and SDL measurement configuration information. SUL configuration information configured in the SIBs in the NDL beams is different. In other words, SUL configuration information configured in the SIBs includes different SULs and different SDLs.

In another example, the first network device sends SIBs by using different NDL beams. SUL configuration information in each SIB may include: a matching relationship between a plurality of SULs and a plurality of SDLs, and SDL measurement configuration information. The SUL configuration information in each SIB may further include: a validity identifier and/or priority information of each SUL. In this example, the SUL configuration information in different NDL beams may be different. The SULs and the SDLs configured in the SUL configuration information in different NDL beams are different, or the configured SULs and SDLs are the same, but validity identifiers and/or priority information are different.

In another example, the first network device sends SIBs by using different NDL beams. SUL configuration information in each SIB may include: a matching relationship between a plurality of SULs and a plurality of SDLs, and SDL measurement configuration information. The SUL configuration information in different NDL beams may be the same or different. In this example, the NDL beams sent by the first network device may further include: SSBs and SSB indexes SSB indexes. Different NDL beams include different SSB indexes, and the SSB index may further indicate an SUL used to initiate access. In this example, the SUL configuration information may further include a validity identifier and/or priority information of each SUL.

The foregoing are some examples in which different NDL beams are used to send the SIBs to configure the SULs in this embodiment. This application is not limited thereto. The following describes a random access method in this embodiment by using an example in which the SUL configuration information in each SIB may include: one SUL, one SDL, and SDL measurement configuration information.

Example 1

Figure 5A:
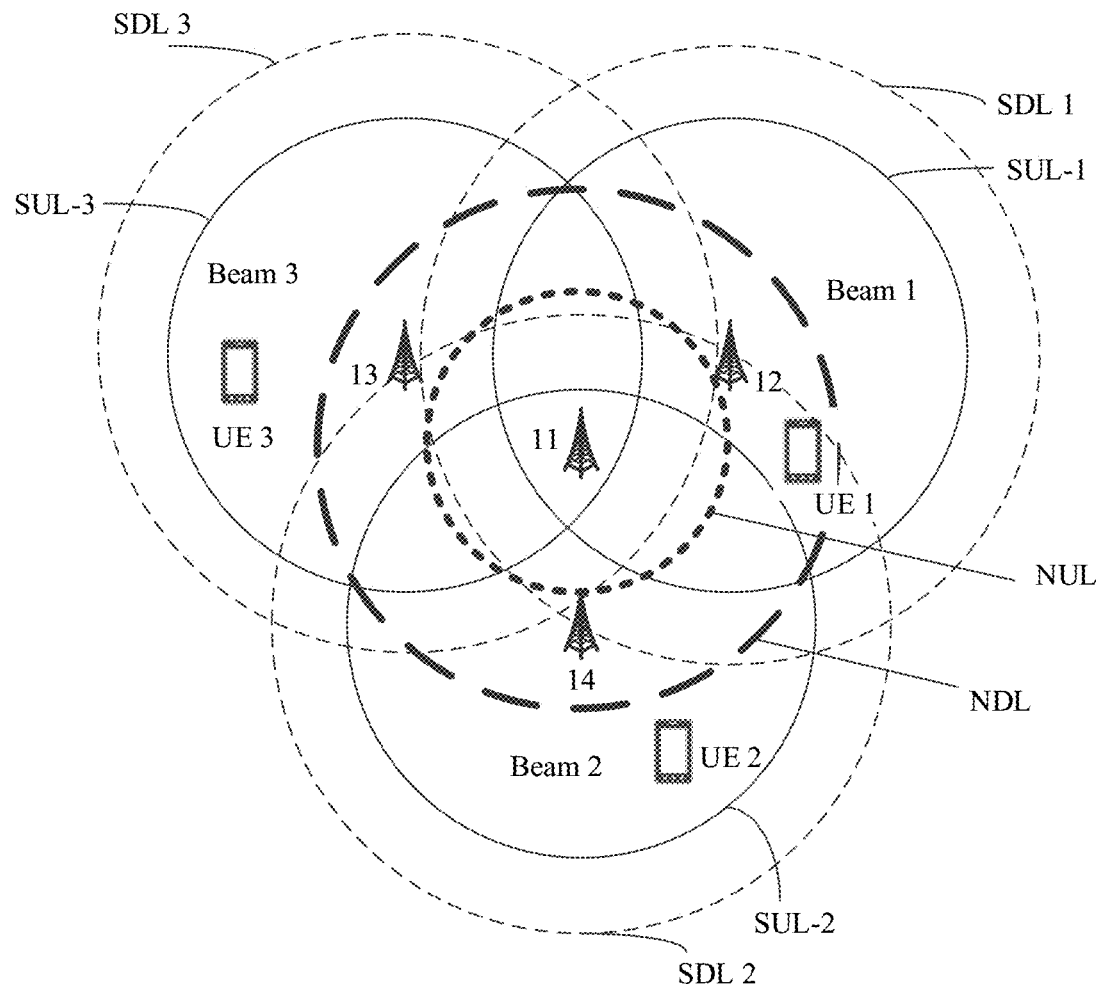
FIG. 5A is a schematic diagram of an application scenario according to an embodiment of this application.

FIG. 5A is a schematic diagram of an application scenario according to an embodiment of this application. As shown in FIG. 5A and Table 4.1, SUL configuration information in a SIB sent by a first network device 11 by using a beam 1 includes: an SUL identifier SUL config1 of an SUL-1 and an SDL 1 (SDL config1) matching the SUL-1; SUL configuration information in a SIB sent by using a beam 2 includes: an SUL identifier SUL config2 of an SUL-2 and an SDL 2 (SDL config2) matching the SUL-2; and SUL configuration information in a SIB sent by using a beam 3 includes: an SUL identifier SUL config3 of an SUL-3 and an SDL 3 (SDL config3) matching the SUL-3. That is, the network device 11 sends the SIBs with different configurations by using different NDL beams. The SUL configuration information in each SIB may further include SDL measurement configuration information, which is not shown in Table 4.1.

TABLE 4.1

| Beam | SUL configuration information |
| --- | --- |
| SIB-beam 1 | RACH-ConfigCommon:<br>SUL config1<br>SDL config1 |
| SIB-beam 2 | RACH-ConfigCommon:<br>SUL config2<br>SDL config2 |
| SIB-beam 3 | RACH-ConfigCommon:<br>SUL config3<br>SDL config3 |

After receiving the SIBs, the UE may measure reference signal strength of the SDLs based on the SDL measurement configuration information, and the UE may further measure reference signal strength of an NDL, and select a UL for random access based on the measured reference signal strength of the SDLs and the measured reference signal strength of the NDL. Specifically, there may be the following several different cases:

1. The UE measures only reference signal strength of an SDL corresponding to one NDL beam. The UE may compare the reference signal strength of the SDL with the reference signal strength of the NDL, and select, from the SDL and the NDL, a UL corresponding to a DL with high reference signal strength to initiate the random access. For example, if the reference signal strength of the SDL is less than the reference signal strength of the NDL, the UE may initiate the access over the NUL. If the reference signal strength of the SDL is greater than the reference signal strength of the NDL, the UE may initiate the access over an SUL corresponding to the SDL.

As shown in FIG. 5A, when receiving the beam 1, the UE 1 measures reference signal strength of an NDL in an area in which the UE 1 is located, and measures reference signal strength of the SDL based on the SDL measurement configuration information. If the UE 1 measures only reference signal strength of the SDL 1 within a coverage range of the beam 1, the UE 1 may compare the reference signal strength of the SDL 1 with the reference signal strength of the NDL. If the reference signal strength of the SDL 1 is less than the reference signal strength of the NDL, the UE 1 may initiate access over an NUL. If the reference signal strength of the SDL 1 is greater than the reference signal strength of the NDL, the UE may initiate access over the SUL-1 corresponding to the SDL 1.

2. The UE measures reference signal strength of the SDLs corresponding to a plurality of NDL beams. Because the UE may be located in an area overlapped between coverage ranges of the plurality of NDL beams, the UE may measure the reference signal strength of the SDLs corresponding to the plurality of NDL beams. The UE may compare the reference signal strength of the plurality of SDLs with the reference signal strength of the NDL, and select a UL corresponding to a DL with highest reference signal strength to initiate the random access. If all the reference signal strength of the plurality of SDLs is all less than the reference signal strength of the NDL, the UE may initiate the random access over an NUL. If reference signal strength of SDLs in the plurality of SDLs is greater than the reference signal strength of the NDL, the UE may select, from the SDLs whose reference signal strength is greater than the reference signal strength of the NDL, an SUL corresponding to an SDL with highest reference signal strength, to initiate the random access.

As shown in FIG. 5A, the UE 1 with coverage ranges of the beam 1 and the beam 2 measures reference signal strength of the NDL in the area in which the UE 1 is located, and measures reference signal strength of the SDLs based on the SDL measurement configuration information. Because the UE 1 is located within the coverage ranges of the beam 1 and the beam 2, the UE 1 may measure the reference signal strength of the SDL 1 and the reference signal strength of the SDL 2. If measuring the reference signal strength of the SDL 1 and the reference signal strength of the SDL 2, the UE 1 may compare the reference signal strength of the SDL 1 and the reference signal strength of the SDL 2 with the reference signal strength of the NDL, and select, from the SDL 1, the SDL 2, and NDL, a UL corresponding to the DL with highest reference signal strength to initiate the random access. As shown in FIG. 5A, the UE 1 is at an edge of an inner side of a curve NDL, is out of a coverage range of a curve NUL, and is far from the first network device 11. Therefore, the reference signal strength of the NDL measured by the UE 1 may be low. Similarly, although the UE 1 is within a coverage range of a curve SDL 2, but is located at an edge part close to an inner side, and is far from a second network device 14. Therefore, the reference signal strength of the SDL 2 measured by the UE 1 may be low. If the UE 1 is close to the second network device 12, and is within a coverage range of a curve SDL 1, the reference signal strength of the SDL 1 measured by the UE 1 may be high. Therefore, the UE 1 may select the SUL-1 corresponding to the SDL 1 to initiate the random access.

3. If the UE does not measure the reference signal strength of the SDLs corresponding to the NDL beams in any direction, the UE may not initiate the random access over the SUL. If measuring a reference signal of the NDL, the UE may initiate the random access over an NUL. If measuring neither the reference signal strength of the SDLs nor the reference signal strength of the NDL, the UE may not initiate the random access.

Example 2

Figure 5B:
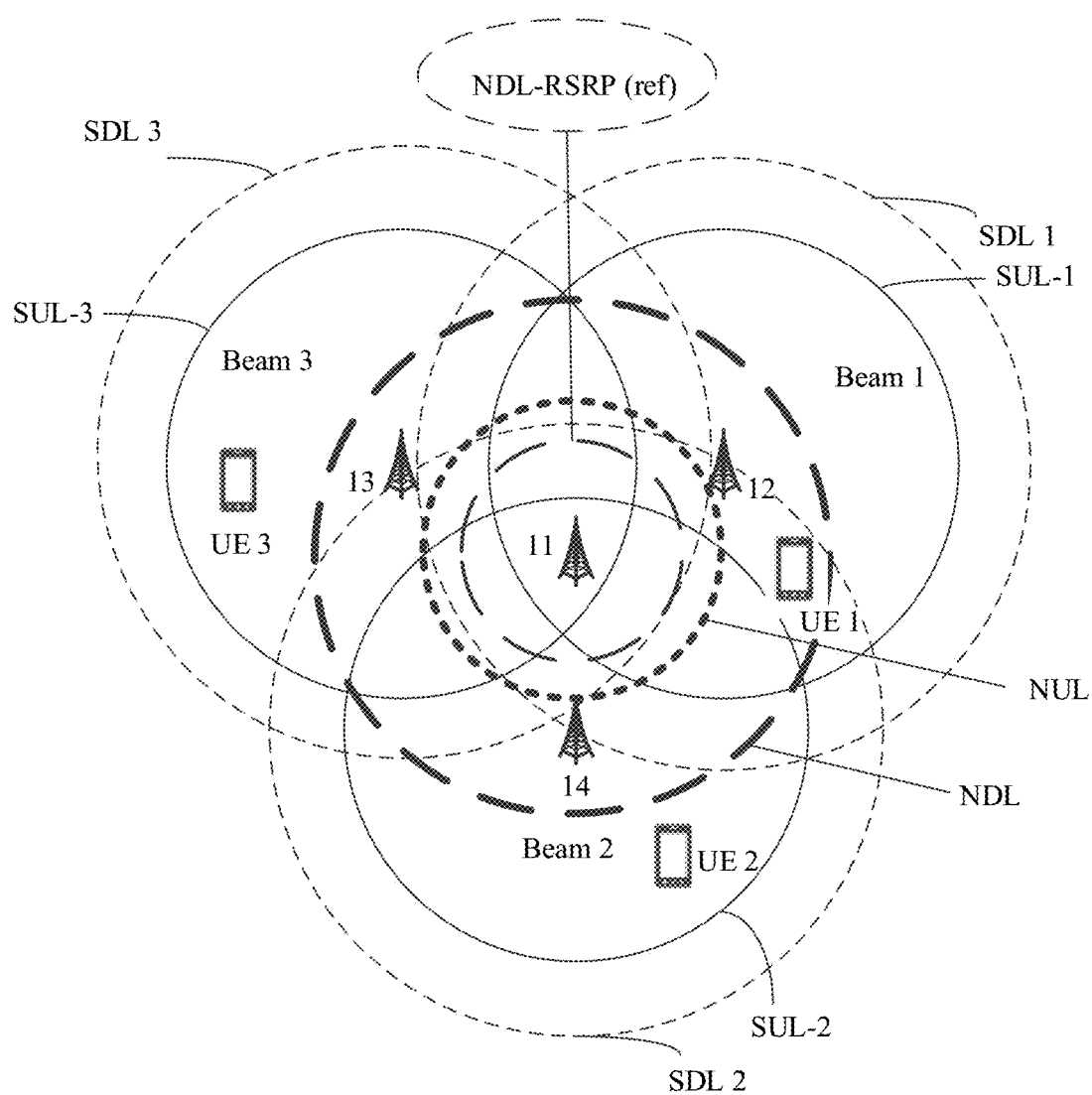
FIG. 5B is a schematic diagram of an application scenario according to an embodiment of this application.

In comparison with Example 1, SUL configuration information of each SIB in Example 2 may further include an NDL threshold NDL-RSRP. FIG. 5B is a schematic diagram of an application scenario according to an embodiment of this application. As shown in FIG. 5B, in addition to the same configuration as that in FIG. 5A, an NDL threshold NDL-RSRP (ref) is further configured in FIG. 5B. When the reference signal strength of the NDL is less than the NDL threshold, the UE may select an SUL based on the reference signal strength of the SDLs, to initiate random access. When the reference signal strength of the NDL is not less than the NDL threshold, the UE may determine that a distance from the first network device is small, the NUL provided by the first network device may meet a requirement, and the UE may initiate the random access over the NUL.

As shown in FIG. 5B and Table 4.2, SUL configuration information in a SIB sent by a first network device 11 by using a beam 1 includes: an SUL identifier SUL config1 of an SUL-1, an SDL 1 (SDL config1) matching the SUL-1, and an NDL threshold rsrp-ThresholdSSB-SUL1; SUL configuration information in a SIB sent by using a beam 2 includes: an SUL identifier SUL config2 of an SUL-2, an SDL 2 (SDL config2) matching the SUL-2, and an NDL threshold rsrp-ThresholdSSB-SUL2; and SUL configuration information in a SIB sent by using a beam 3 includes: an SUL identifier SUL config3 of an SUL-3, an SDL 3 (SDL config3) matching the SUL-3, and an NDL threshold rsrp-ThresholdSSB-SUL3. That is, the network device 11 sends the SIBs with different configurations by using different NDL beams. The SUL configuration information in each SIB may further include SDL measurement configuration information, which is not shown in Table 4.2.

TABLE 4.2

| Beam | SUL configuration information |
|---|---|
| SIB-beam 1 | RACH-ConfigCommon:<br>SUL config1<br>SDL config1<br>rsrp-ThresholdSSB-SUL1 |
| SIB-beam 2 | RACH-ConfigCommon:<br>SUL config2<br>SDL config2<br>rsrp-ThresholdSSB-SUL2 |
| SIB-beam 3 | RACH-ConfigCommon:<br>SUL config3:<br>SDL config3<br>rsrp-ThresholdSSB-SUL3 |

It should be noted that the SUL configuration information in the SIBs may have a same NDL threshold or different NDL thresholds. For schematic diagrams in which the SUL configuration information in the SIBs has the same NDL threshold and different NDL thresholds, refer to FIG. 3A and FIG. 3B. FIG. 5B shows an example in which the SUL configuration information in the SIBs has the same NDL threshold.

After receiving the SIBs, the UE may measure reference signal strength of the SDLs based on the SDL measurement configuration information, and the UE may further measure reference signal strength of an NDL, and select a UL for random access based on the measured reference signal strength of the SDLs and the measured reference signal strength of the NDL and with reference to the NDL threshold. Specifically, there may be the following several different cases:

1. The UE measures only reference signal strength of an SDL corresponding to one NDL beam. The UE may compare the reference signal strength of the NDL with the NDL threshold. If the reference signal strength of the NDL is less than the NDL threshold, the UE may initiate the random access over an SUL corresponding to an SDL whose reference signal strength is measured. If the reference signal strength of the NDL is not less than the NDL threshold, the UE may initiate the random access over an NUL.

For example, as shown in FIG. 5B, UE 1 is used as an example. When receiving the beam 1, the UE 1 measures reference signal strength of the SDLs based on the SDL measurement configuration information, and measures reference signal strength of an NDL in an area in which the UE 1 is located. If the UE 1 measures only the reference signal strength of the SDL 1 within a coverage range of the beam 1, the UE 1 compares a relationship between the reference signal strength of the NDL and the NDL threshold. If the reference signal strength of the NDL is less than the NDL threshold, the UE 1 may initiate the random access over the SUL-1 corresponding to the SDL 1 whose reference signal strength is measured. If the reference signal strength of the NDL is not less than the NDL threshold, the UE 1 may initiate the random access over the NUL.

2. The UE measures reference signal strength of the SDLs corresponding to a plurality of NDL beams. Because the UE may be located in an area overlapped between coverage ranges of the plurality of NDL beams, the UE may measure the reference signal strength of the SDLs corresponding to the plurality of NDL beams. The UE may compare a relationship between the reference signal strength of the NDL and the NDL thresholds. When a same NDL threshold is configured in the SUL configuration information in the SIBs, the UE compares the NDL reference signal strength with the same NDL threshold. When different NDL thresholds are configured in the SUL configuration information in a plurality of SIBs, the UE may compare the reference signal strength of the NDL with the NDL thresholds configured in the SIBs carried in the NDL beams. If the reference signal strength of the NDL is less than the NDL thresholds, the UE may initiate the random access over an SUL corresponding to an SDL with highest reference signal strength in the SDLs whose reference signal strength is measured. If the reference signal strength of the NDL is not less than the NDL threshold, the UE may initiate the random access over an NUL.

For example, as shown in FIG. 5B, UE 1 is used as an example. When receiving the beam 1, the UE 1 measures reference signal strength of the SDL based on the SDL measurement configuration information, and measures reference signal strength of an NDL in an area in which the UE 1 is located. The UE 1 measures reference signal strength of the SDLs corresponding to a plurality of NDL beams. For example, the UE 1 measures reference signal strength of the SDL 1 and reference signal strength of the SDL 2. The UE 1 compares the reference signal strength of the NDL with the NDL thresholds. If the reference signal strength of the NDL is less than the NDL thresholds, the UE 1 may determine, from the measured reference signal strength of a plurality of SDLs, an SDL corresponding to highest reference signal strength, and initiate random access over an SUL corresponding to the SDL with the highest reference signal strength. In this example, the UE 1 is at an edge of an inner side of a curve NDL, is out of a coverage range of a curve NUL, and is far from the first network device 11. Therefore, the reference signal strength of the NDL measured by the UE 1 may be low and is less than the NDL thresholds. Similarly, although the UE 1 is within a coverage range of a curve SDL 2, but is located at an edge part close to an inner side, and is far from a second network device 14. Therefore, the reference signal strength of the SDL 2 measured by the UE 1 may be low. If the UE 1 is close to the second network device 12, and is within a coverage range of a curve SDL 1, the reference signal strength of the SDL 1 measured by the UE 1 may be high. Therefore, the UE 1 may select the SUL-1 corresponding to the SDL 1 to initiate the random access.

3. If the UE does not measure the reference signal strength of the SDLs corresponding to the NDL beams in any direction, the UE may not initiate the random access over the SUL. If measuring a reference signal of the NDL, the UE may initiate the random access over an NUL. If measuring neither the reference signal strength of the SDLs nor the reference signal strength of the NDL, the UE may not initiate the random access.

Example 3

In comparison with Example 1, SUL configuration information of each SIB in Example 3 may further include an SDL threshold. As shown in Table 4.3, in addition to the SUL and the SUL corresponding to the SUL, the SUL configuration information sent by the network device in each beam further includes the SDL threshold corresponding to the SDL.

TABLE 4.3

| Beam | SUL configuration information |
| --- | --- |
| SIB-beam 1 | RACH-ConfigCommon: |
|  | SUL config1 |
|  | SDL config1 |
|  | SDL1-RSRP (ref) |
| SIB-beam 2 | RACH-ConfigCommon: |
|  | SUL config2 |
|  | SDL config2 |
|  | SDL2-RSRP (ref) |
| SIB-beam 3 | RACH-ConfigCommon: |
|  | SUL config3: |
|  | SDL config3 |
|  | SDL3-RSRP (ref) |

Figure 5C:
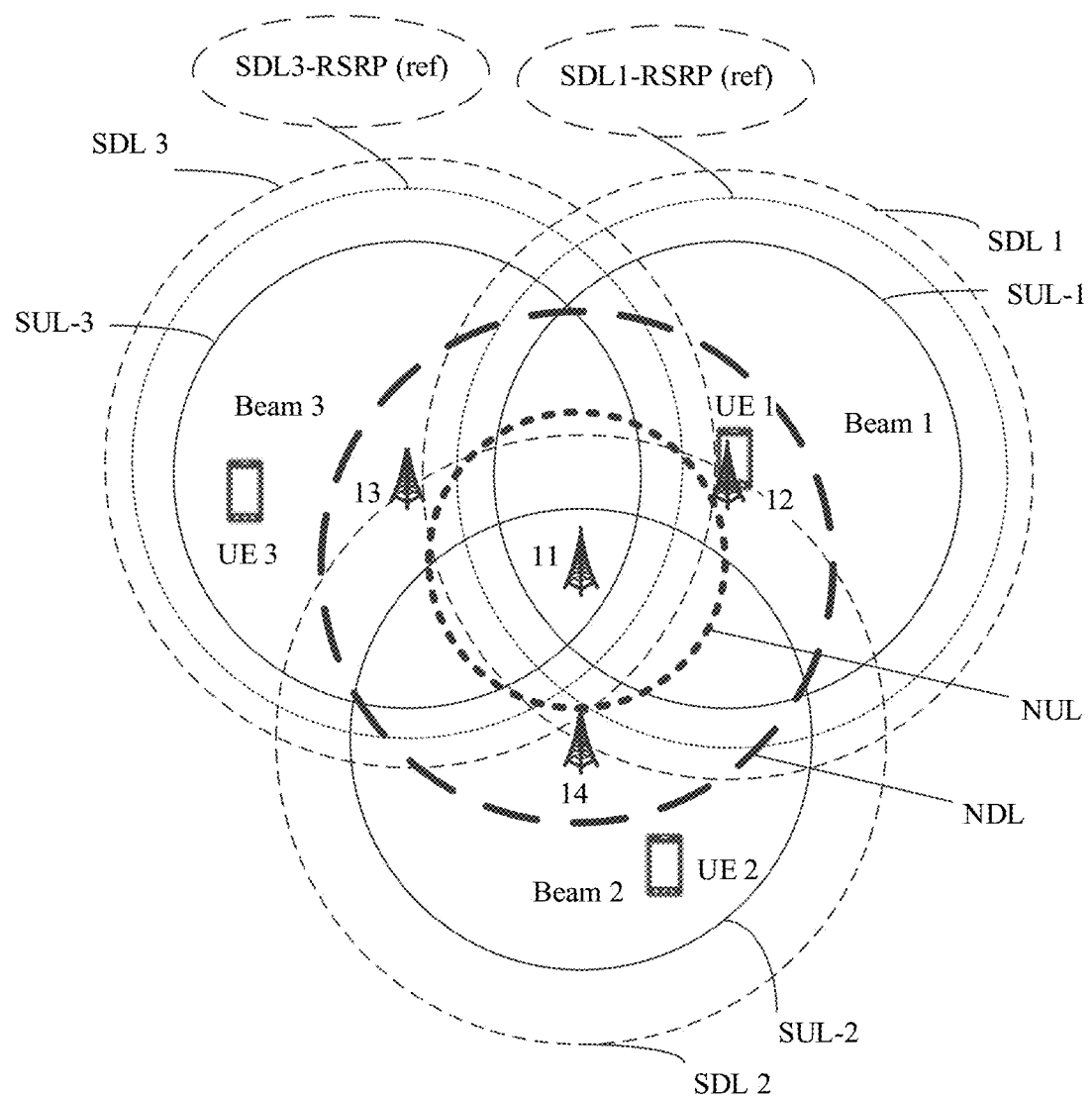
FIG. 5C is a schematic diagram of an application scenario according to an embodiment of this application.

FIG. 5C is a schematic diagram of an application scenario according to an embodiment of this application. As shown in FIG. 5C, in addition to the same configuration as that in FIG. 5A, the SDL thresholds corresponding to the plurality of SDLs are further configured in FIG. 5C. FIG. 5C shows only a threshold SDL1-RSRP (ref) of an SDL 1 and a threshold SDL3-RSRP (ref) of an SDL3. In the application scenario shown in FIG. 5C, after measuring reference signal strength of the SDLs, the UE may select an available SUL for service based on a relationship between the reference signal strength of the SDLs and the SDL thresholds.

Specifically, when receiving the SIB, the UE measures the reference signal strength of the SDLs based on the SDL measurement configuration information. After the reference signal strength of the NDL is measured, with reference to the SDL thresholds, there may be the following several cases of selecting an uplink resource, to initiate the random access.

1. The UE measures only reference signal strength of an SDL corresponding to one NDL beam. The UE may compare the reference signal strength of the SDL with a corresponding SDL threshold. If the reference signal strength of the SDL is greater than the corresponding SDL threshold, the UE may determine that an SUL matching the SDL is available for service. If the reference signal strength of the SDL is not greater than the corresponding SDL threshold, the UE may determine that an SUL matching the SDL is unavailable for service. In this case, the UE may not initiate the random access over the SUL. The UE may compare the reference signal strength of the SDL matching the available SUL for service with the reference signal strength of the NDL, and select, from the SDL and the NDL, a UL corresponding to a DL with high reference signal strength to initiate the random access. For example, for the SDL matching the available SUL for service, if the reference signal strength of the SDL is less than the reference signal strength of the NDL, the UE may initiate the access over the NUL. If the reference signal strength of the SDL is greater than the reference signal strength of the NDL, the UE may initiate the access over the SUL corresponding to the SDL.

As shown in FIG. 5C, UE 1 is used as an example. When receiving the beam 1, the UE 1 measures reference signal strength of an NDL in an area in which the UE 1 is located, and measures reference signal strength of the SDL based on the SDL measurement configuration information. If measuring only reference signal strength of the SDL 1 within a coverage range of the beam 1, the UE 1 may compare the reference signal strength of the SDL 1 with the SDL threshold SDL1-RSRP (ref) of the SDL 1. The UE 1 is within a coverage range of a curve SDL1-RSRP (ref), the reference signal strength of the SDL 1 is less than the SDL1-RSRP (ref), and an SUL-1 matching the SDL 1 is available for service. The UE 1 may compare the reference signal strength of the SDL 1 with the reference signal strength of the NDL. If the reference signal strength of the SDL 1 is less than the reference signal strength of the NDL, the UE 1 may initiate access over an NUL. If the reference signal strength of the SDL 1 is greater than the reference signal strength of the NDL, the UE may initiate access over the SUL-1 corresponding to the SDL 1.

2. The UE measures reference signal strength of the SDLs corresponding to a plurality of NDL beams. Because the UE may be located in an area overlapped between coverage ranges of the plurality of NDL beams, the UE may measure the reference signal strength of the SDLs corresponding to the plurality of NDL beams.

The UE may respectively compare reference signal strength of the plurality of SDLs with the SDL thresholds corresponding to the SDLs, and may determine, based on a relationship between the reference signal strength of the SDLs and the corresponding SDL thresholds, whether SULs matching the SDLs are available for service.

For the SDLs matching the available SULs for service, the UE may compare the reference signal strength of the SDLs with the reference signal strength of the NDL, and select a UL corresponding to a DL with highest reference signal strength to initiate the random access. If the reference signal strength of the SDLs matching the available SULs for services is all less than the reference signal strength of the NDL, the UE may initiate the random access over the NUL. If reference signal strength of SDLs in the SDLs matching the available SULs for service is greater than the reference signal strength of the NDL, and it is assumed that the SDLs having reference signal strength is greater than the reference signal strength of the NDL and matching available SULs for service are first SDLs, the UE may select, from the first SDLs whose reference signal strength is greater than reference signal strength of the NDL, an SUL corresponding to a second SDL with highest reference signal strength, to initiate the random access.

As shown in FIG. 5C, UE 1 is still used as an example. The UE 1 is near a second network device 12. The UE 1 measures reference signal strength of an NDL in an area in which the UE 1 is located, and measures reference signal strength of the SDLs based on the SDL measurement configuration information. Because the UE 1 is near an intersection point of a curve SDL 2 and a curve SDL 3 and is located within a coverage range of a curve SDL 1, the UE 1 may measure reference signal strength of the SDL 1, reference signal strength of the SDL 2, and reference signal strength of the SDL 3. If measuring the reference signal strength of the SDL1, the reference signal strength of the SDL 2, and the reference signal strength of the SDL 3, the UE 1 may separately compare the reference signal strength of the SDL 1 with the SDL threshold SDL1-RSRP (ref), the reference signal strength of the SDL 2 with the SDL threshold SDL2-RSRP (ref), and the reference signal strength of the SDL 3 with the SDL threshold SDL3-RSRP (ref). As shown in FIG. 5C, the SUL-1 matching the SDL 1 is available for service provided that the reference signal strength of the SDL 1 is greater than the SDL threshold SDL1-RSRP (ref).

The UE 1 may compare the reference signal strength of the SDL 1 with the reference signal strength of the NDL, and select, from the SDL 1 and the NDL, a UL corresponding to a DL with highest reference signal strength to initiate the random access. As shown in FIG. 5C, the UE 1 is at an edge of an inner side of a curve NDL, is out of a coverage range of a curve NUL, and is far from the first network device 11. Therefore, the reference signal strength of the NDL measured by the UE 1 may be low. If the UE 1 is close to the second network device 12, and is within a coverage range of a curve SDL 1, the reference signal strength of the SDL 1 measured by the UE 1 may be high. Therefore, the UE 1 may select the SUL-1 corresponding to the SDL 1 to initiate the random access.

3. If the UE does not measure reference signal strength of the SDLs corresponding to the NDL beams in any direction, or reference signal strength of the SDLs measured by the UE is all less than the corresponding SDL thresholds, there are no available SULs for service, and the UE may not initiate the random access over the SULs. In this case, if measuring the reference signal of the NDL, the UE may initiate the random access over an NUL. If either measuring no reference signal strength of the NDL, the UE may not initiate the random access.

Example 4

In comparison with Example 1, SUL configuration information of each SIB in Example 4 may further include an SDL threshold and an NDL threshold. As shown in Table 4.4, in addition to the SUL and the SUL corresponding to the SUL, the SUL configuration information sent by the network device in each beam further includes the NDL threshold and the SDL threshold corresponding to the SDL.

TABLE 4.4

| Beam | SUL configuration information |
| --- | --- |
| SIB-beam 1 | RACH-ConfigCommon: |
| | SUL config1 |
| | SDL config1 |
| | SDL1-RSRP (ref) |
| | rsrp-ThresholdSSB-SUL1 |
| SIB-beam 2 | RACH-ConfigCommon: |
| | SUL config2 |
| | SDL config2 |
| | SDL2-RSRP (ref) |
| | rsrp-ThresholdSSB-SUL2 |
| SIB-beam 3 | RACH-ConfigCommon: |
| | SUL config3: |
| | SDL config3 |
| | SDL3-RSRP (ref) |
| | rsrp-ThresholdSSB-SUL3 |

Figure 5D:
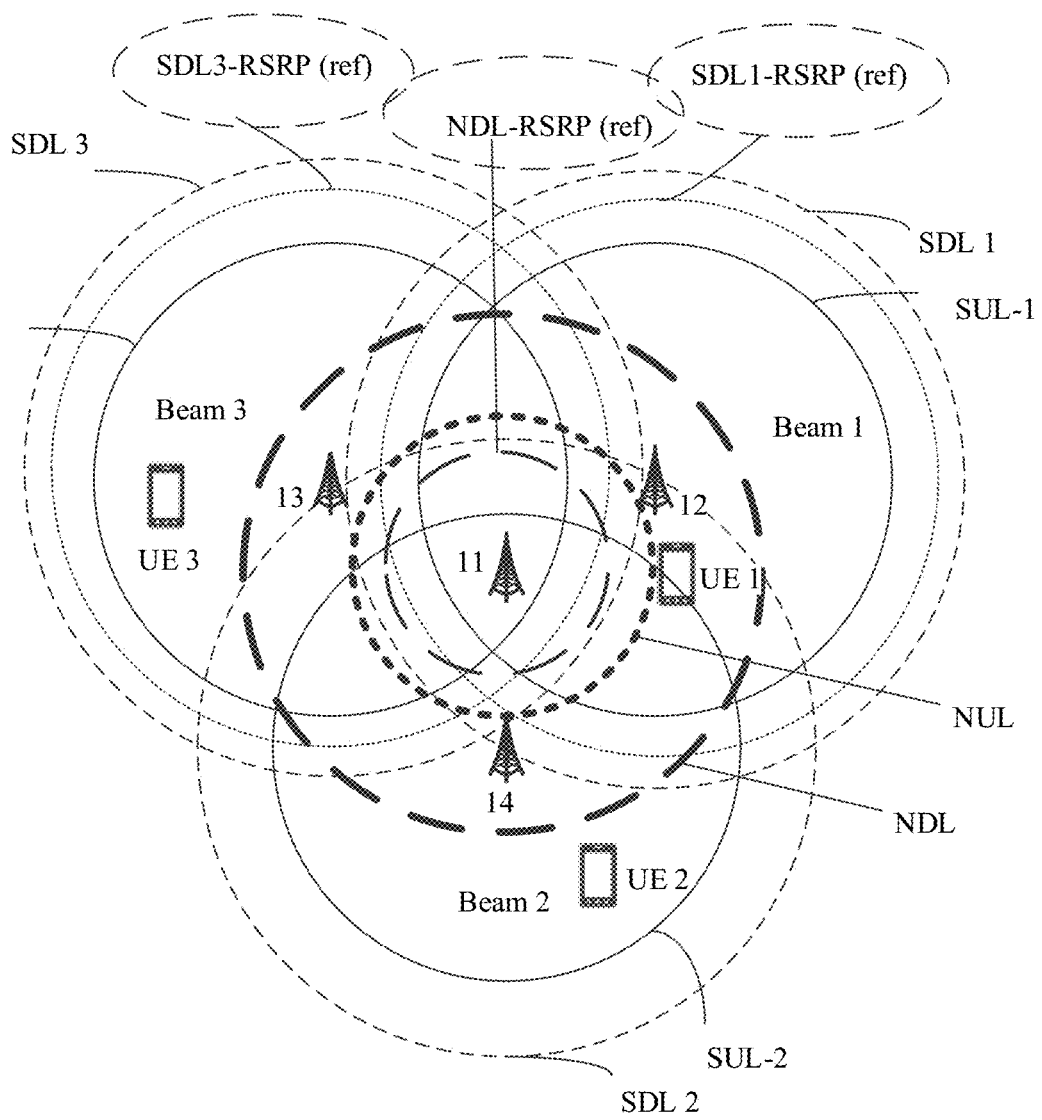
FIG. 5D is a schematic diagram of an application scenario according to an embodiment of this application.

FIG. 5D is a schematic diagram of an application scenario according to an embodiment of this application. In the application scenario shown in FIG. 5D, after measuring reference signal strength of the SDLs and reference signal strength of an NDL, the UE may select an uplink resource with reference to the SDL thresholds and the NDL threshold.

Specifically, after receiving SIBs by using the NDL beams, the UE measures the reference signal strength of the SDLs based on the SDL measurement configuration information, and measures the reference signal strength of the NDL. The UE selects available SULs for service based on the reference signal strength of the SDLs and the corresponding SDL thresholds, and then selects an uplink resource from the available SULs for service or an NUL with reference to a relationship between the reference signal strength of the NDL and the NDL threshold. Specifically, there may be the following several cases:

1. The UE measures only reference signal strength of an SDL corresponding to one NDL beam. The UE may compare the reference signal strength of the SDL with a corresponding SDL threshold. If the reference signal strength of the SDL is greater than the corresponding SDL threshold, the UE may determine that an SUL matching the SDL is available for service. If the reference signal strength of the SDL is not greater than the corresponding SDL threshold, the UE may determine that an SUL matching the SDL is unavailable for service. In this case, the UE may not initiate the random access over the SUL.

The UE may further compare a relationship between the reference signal strength of the NDL and the NDL threshold. When the reference signal strength of the NDL is less than the NDL threshold, the UE may select, from the SDLs matching the SULs available for service, an SUL corresponding to an SDL with highest reference signal strength, to initiate the random access. When the reference signal strength of the NDL is less than the NDL threshold, and only reference signal strength of one SDL is measured and an SUL corresponding to the SDL is available for service, the UE may initiate the random access over the SUL matching the SDL.

For example, as shown in FIG. 5D, UE 1 is used as an example. When receiving the beam 1, the UE 1 measures reference signal strength of an NDL in an area in which the UE 1 is located, and measures reference signal strength of the SDL based on the SDL measurement configuration information. If measuring only reference signal strength of the SDL 1 within a coverage range of the beam 1, the UE 1 may compare the reference signal strength of the SDL 1 with the SDL threshold SDL1-RSRP (ref) of the SDL 1. The UE 1 is within a coverage range of a curve SDL1-RSRP (ref), the reference signal strength of the SDL 1 is less than the SDL1-RSRP (ref), and an SUL-1 matching the SDL 1 is available for service. The UE 1 may compare the reference signal strength of the NDL with the NDL threshold. If the reference signal strength of the NDL is not less than the NDL threshold, the UE 1 may initiate access over an NUL. If the reference signal strength of the NDL is less than the NDL threshold, the UE may initiate access over the SUL-1 corresponding to the SDL 1.

2. The UE measures reference signal strength of the SDLs corresponding to a plurality of NDL beams. Because the UE may be located in an area overlapped between coverage ranges of the plurality of NDL beams, the UE may measure the reference signal strength of the SDLs corresponding to the plurality of NDL beams.

The UE may respectively compare reference signal strength of the plurality of SDLs with the SDL thresholds corresponding to the SDLs, and may determine, based on a relationship between the reference signal strength of the SDLs and the corresponding SDL thresholds, whether SULs matching the SDLs are available for service.

The UE may further compare a relationship between the reference signal strength of the NDL and the NDL threshold. When the reference signal strength of the NDL is less than the NDL threshold, the UE may select, from the SDLs matching the SULs available for service, an SUL corresponding to an SDL with highest reference signal strength, to initiate the random access. When the reference signal strength of the NDL is not less than the NDL threshold, the UE may initiate the random access over an NUL.

For example, as shown in FIG. 5D, UE 1 is used as an example. The UE 1 detects that reference signal strength of the SDL 1 is SDL1-RSRP, reference signal strength of the SDL 2 is SDL2-RSRP, and reference signal strength of the SDL 3 is SDL3-RSRP, and further detects that the reference signal strength of the NDL is NDL-RSRP. If comparing the reference signal strength of the SDLs with the corresponding SDL thresholds, the UE 1 determines that the SDL1-RSRP is greater than the SDL1-RSRP (ref), the SDL2-RSRP is greater than the SDL2-RSRP (ref), but the SDL3-RSRP is less than the SDL3-RSRP (ref). The UE 1 may determine that the SUL-1 corresponding to the SDL 1 and the SUL-2 corresponding to the SDL 2 are available for service.

The UE may compare the NDL-RSRP with the NDL-RSRP (ref), and a result of the comparison may be that the NDL-RSRP is less than the NDL-RSRP (ref). In the example in FIG. 5D, if the UE 1 is out of a coverage range of the NUL, the UE 1 does not initiate the random access over the NUL. The UE 1 may select an SUL from the SUL-1 and the SUL-2 that are available for service, to initiate the random access. Specifically, the UE 1 may compare the SDL1-RSRP and the SDL2-RSRP, and select an SUL corresponding to an SDL with highest reference signal strength to initiate the random access. In the example in FIG. 4D, the UE 1 is close to the second network device 12, and may learn through measurement that the SDL1-RSRP is greater than the SDL2-RSRP. The UE 1 may select the SUL-1 to initiate the random access.

3. If the UE does not measure reference signal strength of the SDLs corresponding to the NDL beams in any direction, or reference signal strength of the SDLs measured by the UE is all less than the corresponding SDL thresholds, there are no available SULs for service, and the UE may not initiate the random access over the SULs. In this case, if measuring the reference signal of the NDL, the UE may initiate the random access over an NUL. If either measuring no reference signal strength of the NDL, the UE may not initiate the random access.

It should be noted that in this embodiment, the SUL configuration information may further include one or a combination of a plurality of parameters of a validity identifier of the SUL, priority information, or SSB information.

After receiving the SUL configuration information, the UE may further select the SUL according to the solution in this embodiment and with reference to the one or the combination of the plurality of parameters of the validity identifier of the SUL, the priority information, and the SSB information, to initiate the random access. For a combination manner, refer to related content in Embodiment 1 of this application. Details are not described again.

The random access method in this embodiment is described below by using an example in which SUL configuration information in each SIB may include a matching relationship between a plurality of SULs and a plurality of SDLs and SDL measurement configuration information, and the SUL configuration information in each SIB may further include a validity identifier and/or priority information of each SUL.

Example 5

The example shown in FIG. 5A is still used as a schematic diagram of an application scenario in this example. As shown in FIG. 5A and Table 4.5, SUL configuration information in a SIB sent by a first network device 11 by using a beam 1 includes: an SUL identifier SUL config1 of an SUL-1 and an SDL 1 (SDL config1) matching the SUL-1, a validity identifier available of SUL config1, an SUL identifier SUL config2 of an SUL-2 and an SDL 2 (SDL config2) matching the SUL-2, a validity identifier available of SUL config2, an SUL identifier SUL config3 of an SUL-3 and an SDL 3 (SDL config3) matching the SUL-3, and a validity identifier unavailable of SUL config3.

TABLE 4.5

| Beam | SUL configuration information |
|---|---|
| SIB-beam 1 | RACH-ConfigCommon:<br>SUL config1: available<br>SDL config1<br>SUL config2: available<br>SDL config2<br>SUL config3: unavailable<br>SDL config3 |
| SIB-beam 2 | RACH-ConfigCommon:<br>SUL config1: unavailable<br>SDL config1<br>SUL config2: available<br>SDL config2 |

TABLE 4.5-continued

| Beam | SUL configuration information |
| --- | --- |
| SIB-beam 3 | SUL config3: unavailable<br>SDL config3<br>RACH-ConfigCommon:<br>SUL config1: unavailable<br>SDL config1<br>SUL config2: unavailable<br>SDL config2<br>SUL config3: available<br>SDL config3 |

The SUL configuration information in a SIB sent by the first network device 11 by using the beam 2 includes: an SUL identifier SUL config1 of an SUL-1 and an SDL 1 (SDL config1) matching the SUL-1, a validity identifier unavailable of SUL config1, an SUL identifier SUL config2 of an SUL-2 and an SDL 2 (SDL config2) matching the SUL-2, a validity identifier available of SUL config2, an SUL identifier SUL config3 of an SUL-3 and an SDL 3 (SDL config3) matching the SUL-3, and a validity identifier unavailable of SUL config3.

The SUL configuration information in a SIB sent by the first network device 11 by using the beam 3 includes: an SUL identifier SUL config1 of an SUL-1 and an SDL 1 (SDL config1) matching the SUL-1, a validity identifier unavailable of SUL config1, an SUL identifier SUL config2 of an SUL-2 and an SDL 2 (SDL config2) matching the SUL-2, a validity identifier unavailable of SUL config2, an SUL identifier SUL config3 of an SUL-3 and an SDL 3 (SDL config3) matching the SUL-3, and a validity identifier available of SUL config3.

That is, the network device 11 sends the SIBs with different configurations by using different NDL beams. The SUL configuration information in each SIB may further include SDL measurement configuration information, which is not shown in Table 4.5.

In this example, after receiving the SIBs, UE measures reference signal strength of the SDLs based on the SDL measurement configuration information, and may determine valid SULs based on the validity identifiers of the SULs, and the UE may further measure reference signal strength of an NDL, and select a UL for random access based on the reference signal strength of the SDLs corresponding to the valid SULs and the reference signal strength of the NDL. For example, the UE may select, from the reference signal strength of the SDLs corresponding to the valid SULs and the reference signal strength of the NDL, a UL corresponding to a DL with highest reference signal strength to initiate the random access. If the reference signal strength of the NDL is greater than the reference signal strength of the SDLs corresponding to all the valid SULs, the UE may initiate the random access over an NUL. If reference signal strength of SDLs (first SDLs) corresponding to valid SULs is greater than the reference signal strength of the NDL, the UE may select, from the first SDLs, an SUL corresponding to a second SDL with highest reference signal strength, to initiate the random access.

For example, as shown in FIG. 5A, UE 1 within coverage ranges of the beam 1 and the beam 2 measures reference signal strength of an NDL in an area in which the UE 1 is located. The UE 1 receives the SUL configuration information sent by using the beam 1, and measures reference signal strength of the SDL 1, reference signal strength of the SDL 2, and reference signal strength of the SDL 3 based on the SDL measurement configuration information, and the UE 1 determines, based on the SUL configuration information, that valid SULs are the SUL-1 and the SUL-2. Therefore, the UE 1 may compare the reference signal strength of the SDL 1 and the reference signal strength of the SDL 2 with the reference signal strength of the NDL, and select a UL corresponding to a DL with highest reference signal strength to initiate random access. As shown in FIG. 5A, the UE 1 is at an edge of an inner side of a curve NDL, is out of a coverage range of a curve NUL, and is far from the first network device 11. Therefore, the reference signal strength of the NDL measured by the UE 1 may be low. Similarly, although the UE 1 is within a coverage range of a curve SDL 2, but is located at an edge part close to an inner side, and is far from a second network device 14. Therefore, the reference signal strength of the SDL 2 measured by the UE 1 may be low. If the UE 1 is close to the second network device 12, and is within a coverage range of a curve SDL 1, the reference signal strength of the SDL 1 measured by the UE 1 may be high. Therefore, the UE 1 may select the SUL-1 corresponding to the SDL 1 to initiate the random access.

Example 6

The example shown in FIG. 5A is still used as a schematic diagram of an application scenario in this example. As shown in FIG. 5A and Table 4.6, SUL configuration information in a SIB sent by a first network device 11 by using a beam 1 includes: an SUL identifier SUL config1 of an SUL-1 and an SDL 1 (SDL config1) matching the SUL-1, where priority information of SUL config1 is 1; an SUL identifier SUL config2 of an SUL-2 and an SDL 2 (SDL config2) matching the SUL-2, where priority information of SUL config2 is 2; and an SUL identifier SUL config3 of an SUL-3 and an SDL 3 (SDL config3) matching the SUL-3, where priority information of SUL config3 is 3.

TABLE 4.6

| Beam | SUL configuration information |
| --- | --- |
| SIB-beam 1 | RACH-ConfigCommon:<br>SUL config1: 1<br>SDL config1<br>SUL config2: 2<br>SDL config2<br>SUL config3: 3<br>SDL config3 |
| SIB-beam 2 | RACH-ConfigCommon:<br>SUL config1: 2<br>SDL config1<br>SUL config2: 1<br>SDL config2<br>SUL config3: 3<br>SDL config3 |
| SIB-beam 3 | RACH-ConfigCommon:<br>SUL config1: 3<br>SDL config1<br>SUL config2: 2<br>SDL config2<br>SUL config3: 1<br>SDL config3 |

The SUL configuration information in a SIB sent by the first network device 11 by using the beam 2 includes: an SUL identifier SUL config1 of an SUL-1 and an SDL 1 (SDL config1) matching the SUL-1, where priority information of SUL config1 is 2; an SUL identifier SUL config2 of an SUL-2 and an SDL 2 (SDL config2) matching the SUL-2, where priority information of SUL config2 is 1; and an SUL identifier SUL config3 of an SUL-3 and an SDL 3 (SDL config3) matching the SUL-3, where priority information of SUL config3 is 3.

The SUL configuration information in a SIB sent by the first network device 11 by using the beam 3 includes: an SUL identifier SUL config1 of an SUL-1 and an SDL 1 (SDL config1) matching the SUL-1, where priority information of SUL config1 is 3; an SUL identifier SUL config2 of an SUL-2 and an SDL 2 (SDL config2) matching the SUL-2, where priority information of SUL config2 is 2; and an SUL identifier SUL config3 of an SUL-3 and an SDL 3 (SDL config3) matching the SUL-3, where priority information of SUL config3 is 1.

That is, the network device 11 sends the SIBs with different configurations by using different NDL beams. The SUL configuration information in each SIB may further include SDL measurement configuration information, which is not shown in Table 4.6.

In this example, after receiving the SIBs, UE measures reference signal strength of the SDLs based on the SDL measurement configuration information, and may determine an SUL with a highest priority based on the priority information of the SULs, and the UE may further measure reference signal strength of an NDL, and select a UL for random access based on reference signal strength of an SDL corresponding to the SUL with the highest priority and the reference signal strength of the NDL. Alternatively, the UE may determine a plurality of SULs with higher priorities based on the priority information of the SULs, and select a UL for random access based on reference signal strength of SDLs corresponding to the plurality of SULs with the higher priorities and the reference signal strength of the NDL.

For example, as shown in FIG. 5A, UE 1 within coverage ranges of the beam 1 and the beam 2 measures reference signal strength of an NDL in an area in which the UE 1 is located. The UE 1 receives the SUL configuration information sent by the beam 1, and measures reference signal strength of the SDL 1, reference signal strength of the SDL 2, and reference signal strength of the SDL 3 based on the SDL measurement configuration information, and the UE 1 determines, based on the SUL configuration information, that an SUL with a highest priority is the SUL-1. Therefore, the UE 1 may compare the reference signal strength of the SDL 1 with the reference signal strength of the NDL, and select a UL corresponding to a DL with highest reference signal strength to initiate random access. As shown in FIG. 5A, the UE 1 is at an edge of an inner side of a curve NDL, is out of a coverage range of a curve NUL, and is far from the first network device 11. Therefore, the reference signal strength of the NDL measured by the UE 1 may be low. If the UE 1 is close to the second network device 12, and is within a coverage range of a curve SDL 1, the reference signal strength of the SDL 1 measured by the UE 1 may be high. Therefore, the UE 1 may select the SUL-1 corresponding to the SDL 1 to initiate the random access.

Example 7

In addition to the matching relationship between the plurality of SULs and the plurality of SDLs, the SDL measurement configuration information, and the validity identifier and/or the priority information of each SUL, the SUL configuration information in each SIB may further include one NDL threshold NDL-RSRP and/or SDL thresholds respectively corresponding to the plurality of SDLs.

In this example, after receiving the SUL configuration information, the UE may select an SUL from the plurality of SULs with reference to the validity identifier and/or the priority information of each SUL, the NDL threshold NDL-RSRP, and the SDL thresholds respectively corresponding to the plurality of SDLs, to initiate random access.

TABLE 4.7

| Beam | SUL configuration information |
|---|---|
| SIB-beam 1 | RACH-ConfigCommon:<br>SUL config1: available<br>SDL config1: SDL1-RSRP(ref)<br>SUL config2: available<br>SDL config2: SDL2-RSRP(ref)<br>SUL config3: unavailable<br>SDL config3: SDL3-RSRP(ref) |
| SIB-beam 2 | RACH-ConfigCommon:<br>SUL config1: unavailable<br>SDL config1: SDL1-RSRP(ref)<br>SUL config2: available<br>SDL config2: SDL2-RSRP(ref)<br>SUL config3: unavailable<br>SDL config3: SDL3-RSRP(ref) |
| SIB-beam 3 | RACH-ConfigCommon:<br>SUL config1: unavailable<br>SDL config1: SDL1-RSRP(ref)<br>SUL config2: unavailable<br>SDL config2: SDL2-RSRP(ref)<br>SUL config3: available<br>SDL config3: SDL3-RSRP(ref) |

This example is described with reference to FIG. 5C and Table 4.7. In addition to the same configuration as that in FIG. 5A, the SDL thresholds corresponding to the plurality of SDLs are further configured in FIG. 5C. FIG. 5C shows only a threshold SDL1-RSRP (ref) of an SDL 1 and a threshold SDL3-RSRP (ref) of an SDL 3. In the example in Table 4.7, a validity identifier is configured for each SUL. In an application scenario shown in FIG. 5C, after receiving SIBs, UE measures reference signal strength of the SDLs based on the SDL measurement configuration information, may determine valid SULs based on the validity identifiers of the SULs, and select an available SUL for service from the valid SULs based on a relationship between reference signal strength of SDLs corresponding to the valid SULs and the SDL thresholds.

The UE then selects, from the SDL and the NDL based on reference signal strength of an SDL corresponding to the available SUL for service and reference signal strength of an NDL, a UL corresponding to a DL with high reference signal strength, to initiate the random access. For example, for the SDL matching the available SUL for service, if the reference signal strength of the SDL is less than the reference signal strength of the NDL, the UE may initiate the access over the NUL. If the reference signal strength of the SDL is greater than the reference signal strength of the NDL, the UE may initiate the access over the SUL corresponding to the SDL. For a specific process, refer to descriptions of Example 3 in this embodiment. Details are not described again.

TABLE 4.8

| Beam | SUL configuration information |
|---|---|
| SIB-beam 1 | RACH-ConfigCommon:<br>SUL config1: available<br>SDL config1<br>SUL config2: available<br>SDL config2<br>SUL config3: unavailable<br>SDL config3<br>rsrp-ThresholdSSB-SUL |

TABLE 4.8-continued

| Beam | SUL configuration information |
| --- | --- |
| SIB-beam 2 | RACH-ConfigCommon:<br>SUL config1: unavailable<br>SDL config1<br>SUL config2: available<br>SDL config2<br>SUL config3: unavailable<br>SDL config3<br>rsrp-ThresholdSSB-SUL |
| SIB-beam 3 | RACH-ConfigCommon:<br>SUL config1: unavailable<br>SDL config1<br>SUL config2: unavailable<br>SDL config2<br>SUL config3: available<br>SDL config3<br>rsrp-ThresholdSSB-SUL |

This example is described with reference to FIG. 5B and Table 4.8. In addition to the same configuration as that in FIG. 5A, an NDL threshold is further configured in FIG. 5C. It should be noted that NDL thresholds in SUL configuration information of SIBs may be the same or different. For schematic diagrams in which the SUL configuration information in the SIBs has the same NDL threshold and different NDL thresholds, refer to FIG. 3A and FIG. 3B. FIG. 5B shows an example in which the SUL configuration information in the SIBs has the same NDL threshold. In the example in Table 4.8, a validity identifier of each SUL is configured.

In this example, after receiving the SIBs, the UE may measure reference signal strength of the SDLs based on the SDL measurement configuration information, and may further measure reference signal strength of an NDL. The UE may determine valid SULs based on the validity identifiers of the SULs. The UE may compare a relationship between the reference signal strength of the NDL and the NDL thresholds. If the reference signal strength of the NDL is less than the NDL thresholds, the UE may select, from SDLs corresponding to the valid SULs, an SUL corresponding to an SDL with highest reference signal strength, to initiate the random access. If the reference signal strength of the NDL is not less than the NDL threshold, the UE may initiate the random access over an NUL.

For example, as described in FIG. 5B, UE 1 is used as an example. When receiving the beam 1, the UE 1 measures reference signal strength of the SDLs based on the SDL measurement configuration information, and measures reference signal strength of an NDL in an area in which the UE 1 is located. If the UE 1 measures reference signal strength of an SDL 1, reference signal strength of an SDL 2, and reference signal strength of an SDL 3, the UE may determine, based on the validity identifiers of the SULs, that valid SULs are an SUL-1 and an SUL-2. The UE 1 compares the reference signal strength of the NDL with the NDL threshold. If the reference signal strength of the NDL is less than the NDL threshold, the UE 1 may determine, from the SDL 1 corresponding to the SUL-1 and the SDL 2 corresponding to the SUL-2SDL, an SDL corresponding to highest reference signal strength, and initiate random access over an SUL corresponding to the SDL with the highest reference signal strength.

In this example, the UE 1 is at an edge of an inner side of a curve NDL, is out of a coverage range of a curve NUL, and is far from the first network device 11. Therefore, the reference signal strength of the NDL measured by the UE 1 may be low and is less than the NDL thresholds. Similarly, although the UE 1 is within a coverage range of a curve SDL 2, but is located at an edge part close to an inner side, and is far from a second network device 14. Therefore, the reference signal strength of the SDL 2 measured by the UE 1 may be low. If the UE 1 is close to the second network device 12, and is within a coverage range of a curve SDL 1, the reference signal strength of the SDL 1 measured by the UE 1 may be high. Therefore, the UE 1 may select the SUL-1 corresponding to the SDL 1 to initiate the random access.

TABLE 4.9

| Beam | SUL configuration information |
| --- | --- |
| SIB-beam 1 | RACH-ConfigCommon:<br>SUL config1: 1<br>SDL config1: SDL1-RSRP(ref)<br>SUL config2: 2<br>SDL config2: SDL2-RSRP(ref)<br>SUL config3: 3<br>SDL config3: SDL3-RSRP(ref) |
| SIB-beam 2 | RACH-ConfigCommon:<br>SUL config1: 3<br>SDL config1: SDL1-RSRP(ref)<br>SUL config2: 1<br>SDL config2: SDL2-RSRP(ref)<br>SUL config3: 2<br>SDL config3: SDL3-RSRP(ref) |
| SIB-beam 3 | RACH-ConfigCommon:<br>SUL config1: 3<br>SDL config1: SDL1-RSRP(ref)<br>SUL config2: 2<br>SDL config2: SDL2-RSRP(ref)<br>SUL config3: 1<br>SDL config3: SDL3-RSRP(ref) |

This example is described with reference to FIG. 5C and Table 4.9. In addition to the same configuration as that in FIG. 5A, the SDL thresholds corresponding to the plurality of SDLs are further configured in FIG. 5C. FIG. 5C shows only a threshold SDL1-RSRP (ref) of an SDL 1 and a threshold SDL3-RSRP (ref) of an SDL 3. In the example in Table 4.9, priority information is configured for each SUL. In an application scenario shown in FIG. 5C, with reference to the configuration in Table 4.9, after receiving SIBs, the UE measures reference signal strength of the SDLs based on the SDL measurement configuration information, and the UE may select available SULs for service from SULs corresponding to the SDLs whose reference signal strength is measured and based on a relationship between the reference signal strength of the SDLs whose reference signal strength is measured and the SDL thresholds. The UE may determine an SUL with a highest priority from the available SULs for service and based on the priority information of the SULs, to initiate the random access.

For example, as shown in FIG. 5C, UE 1 is used as an example. If measuring reference signal strength of an SDL 1, reference signal strength of an SDL 2, and reference signal strength of an SDL 3, the UE 1 may separately compare the reference signal strength of the SDL 1 with an SDL threshold SDL1-RSRP (ref), the reference signal strength of the SDL 2 with an SDL threshold SDL2-RSRP (ref), and the reference signal strength of the SDL 3 with an SDL threshold SDL3-RSRP (ref). If the reference signal strength of the SDL 1 is greater than the SDL threshold SDL1-RSRP (ref), and the reference signal strength of the SDL 2 is greater than the SDL threshold SDL2-RSRP (ref), the SUL-1 and the SUL-2 are available for service. It can be learned based on priority information of the SUL-1 and the SUL-2 that the SUL-1 has a high priority, and the UE 1 may initiate the random access over the SUL-1.

TABLE 4.10

| Beam | SUL configuration information |
|---|---|
| SIB-beam 1 | RACH-ConfigCommon:<br>SUL config1: 1<br>SDL config1<br>SUL config2: 2<br>SDL config2<br>SUL config3: 3<br>SDL config3<br>rsrp-ThresholdSSB-SUL |
| SIB-beam 2 | RACH-ConfigCommon:<br>SUL config1: 3<br>SDL config1<br>SUL config2: 1<br>SDL config2<br>SUL config3: 2<br>SDL config3<br>rsrp-ThresholdSSB-SUL |
| SIB-beam 3 | RACH-ConfigCommon:<br>SUL config1: 3<br>SDL config1<br>SUL config2: 2<br>SDL config2<br>SUL config3: 1<br>SDL config3<br>rsrp-ThresholdSSB-SUL |

This example is described with reference to FIG. 5B and Table 4.10. In addition to the same configuration as that in FIG. 5A, an NDL threshold is further configured in FIG. 5C. It should be noted that NDL thresholds in SUL configuration information of SIBs may be the same or different. In the example in Table 4.10, priority information of each SUL is configured.

In this example, after receiving SIBs, the UE may measure reference signal strength of SDLs based on the SDL measurement configuration information, and may further measure reference signal strength of an NDL. The UE may compare a relationship between the reference signal strength of the NDL and NDL thresholds. If the reference signal strength of the NDL is less than the NDL thresholds, the UE may select, based on the priority information of the SULs, an SUL with a highest priority to initiate the random access. If the reference signal strength of the NDL is not less than the NDL threshold, the UE may initiate the random access over an NUL.

Example 8

The random access method in this embodiment is described below by using an example in which SUL configuration information in each SIB may include a matching relationship between a plurality of SULs and a plurality of SDLs and SDL measurement configuration information, an NDL beam sent by the first network device includes an SSB and an SSB index SSB index, and different NDL beams include different SSB indexes.

TABLE 4.11

| Beam | SUL configuration information |
|---|---|
| SIB-beam 1<br>SSB index 1 | RACH-ConfigCommon:<br>SUL config1<br>SDL config1<br>SUL config2<br>SDL config2 |

TABLE 4.11-continued

| Beam | SUL configuration information |
|---|---|
| | SUL config3<br>SDL config3 |
| SIB-beam 2<br>SSB index 2 | RACH-ConfigCommon:<br>SUL config1<br>SDL config1<br>SUL config2<br>SDL config2<br>SUL config3<br>SDL config3 |
| SIB-beam 3<br>SSB index 3 | RACH-ConfigCommon:<br>SUL config1<br>SDL config1<br>SUL config2<br>SDL config2<br>SUL config3<br>SDL config3 |

As shown in FIG. 5A and Table 4.11, the SUL configuration information in SIBs sent by a first network device 11 by using the beam 1, the beam 2, and the beam 3 includes: an SUL identifier SUL config1 of an SUL-1 and an SDL 1 (SDL config1) matching the SUL-1, an SUL identifier SUL config2 of an SUL-2 and an SDL 2 (SDL config2) matching the SUL-2, and an SUL identifier SUL config3 of an SUL-3 and an SDL 3 (SDL config3) matching the SUL-3. An index in the SSB sent by the first network device by using the beam 1 is the SSB index 1, an index in the SSB sent by using the beam 2 is the SSB index 2, and an index in the SSB sent by using the beam 3 is the SSB index 3. The three beams may include different indexes.

In this example, in an initial access phase, the UE receives the SSBs sent by using the beams, to obtain the SSB indexes SSB indexes. After receiving the SUL configuration information, the UE obtains a total quantity of configured SUL cells, and may select an SUL based on a remainder between a value of the SSB index and the total quantity of SUL cells, to initiate random access. For example, in this example, assuming that the SSB index 1 is 1, the SSB index 2 is 2, and the SSB index 3 is 3, an accessed SUL indicated by the SSB index 1 is an SUL-1, an accessed SUL indicated by the SSB index 2 is an SUL-2, and an accessed SUL indicated by the SSB index 3 is an SUL-3.

In this example, the SUL configuration information may further include a validity identifier and/or priority information of each SUL. If the validity identifier of each SUL is included, when the SUL indicated by the SSB index conflicts with the SUL indicated by the validity identifier, the UE may select an SUL whose validity identifier is valid to initiate the random access. If the priority information of each SUL is included, when a priority of the SUL indicated by the SSB index is not the highest, the UE may select the SUL indicated by the SSB index to initiate the random access.

It should be noted that the manners of selecting the SUL to initiate the random access in the foregoing examples are merely some examples of this application, and this application is not limited thereto. A user may set the SUL configuration information based on an actual requirement and in the manners shown in the examples in this application, to distinguish between different SULs.

Embodiment 5

The application scenario shown in FIG. 1B is used as an example. A second network device (a network device 300) can provide an SUL service only for some areas of a cell of a first network device (a network device 200). In this example, the first network device may send SIBs with different configurations to UE by using NDL beams, where the SIB includes SUL configuration information, and SUL configuration information included in the SIBs in different NDL beams is different. The SUL configuration information may include an SUL identifier of at least one SUL and at least one SUL threshold.

In a possible implementation, in this embodiment, the SUL configuration information may further include a validity identifier of the SUL threshold. In an area not covered by the SUL, in the SIB sent by the first network device by using the NDL beam, the SUL threshold included in the SUL configuration information may be invalid. Alternatively, different SUL thresholds are configured in different SIBs. In an area not covered by the SUL, in the SIB sent by the first network device by using the NDL beam, the SUL threshold included in the SUL configuration information is set to 0. In this way, the UE may initiate random access over an NUL.

Example 1

TABLE 5.1

| Beam | SUL configuration information |
|---|---|
| SIB-beam 1 | RACH-ConfigCommon: SUL config rsrp-ThresholdSSB-SUL1: available |
| SIB-beam 2 | RACH-ConfigCommon: SUL config rsrp-ThresholdSSB-SUL2: unavailable |

Figure 6A:
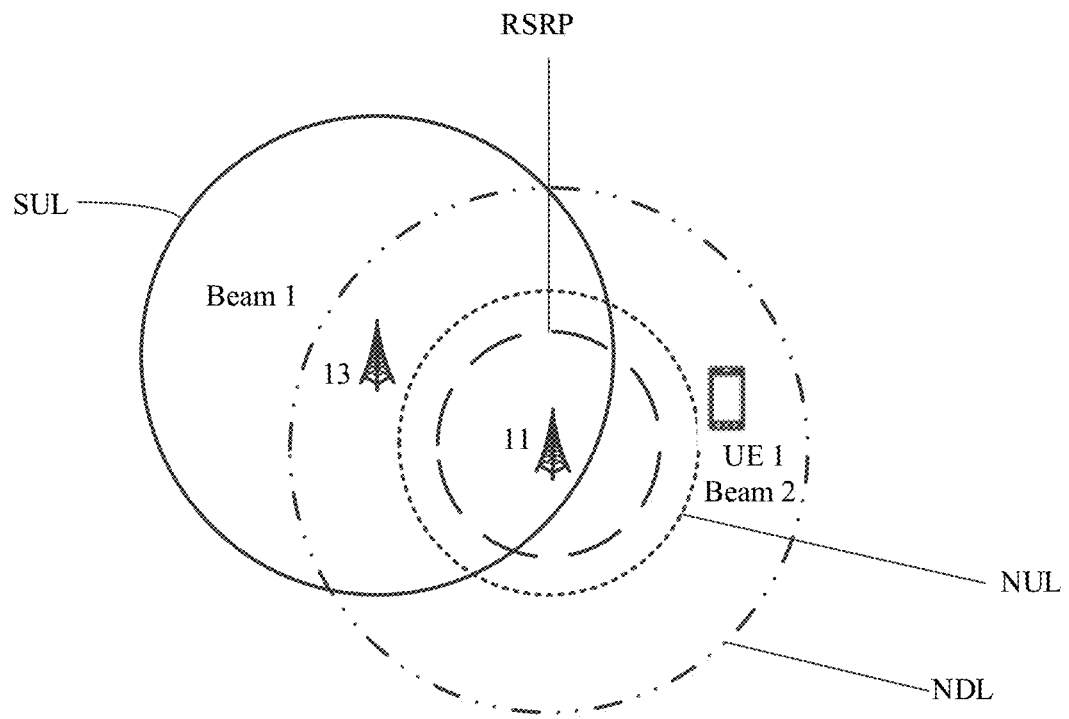
FIG. 6A is a schematic diagram of a scenario of random access according to an example of this application.

FIG. 6A is a schematic diagram of a scenario of random access according to an example of this application. As shown in FIG. 6A and Table 5.1, the SUL configuration information in a SIB sent by a network device 11 by using the beam 1 includes: an SUL identifier SUL config1 of an SUL-1, an SUL threshold rsrp-ThresholdSSB-SUL1, and a validity identifier of the SUL threshold being valid (available). The SUL configuration information in a SIB sent by using the beam 2 includes: an SUL identifier SUL config2 of an SUL-2, an SUL threshold rsrp-ThresholdSSB-SUL2, and a validity identifier of the SUL threshold being invalid (unavailable).

Figure 6B:
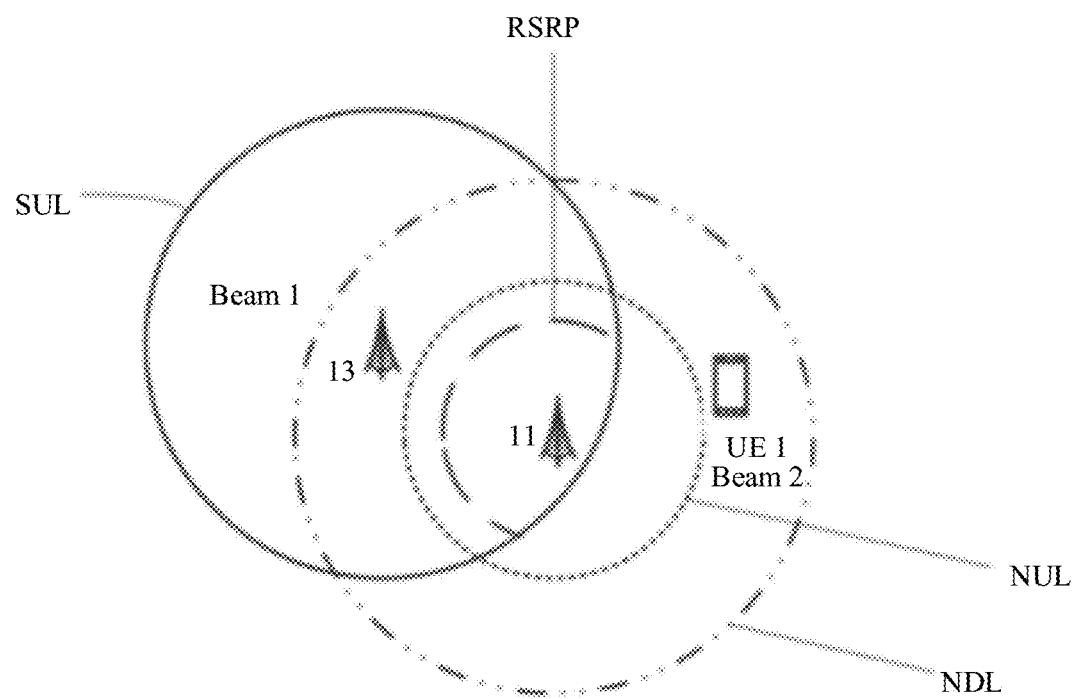
FIG. 6B is a schematic diagram of a scenario of random access according to an example of this application.

As shown in FIG. 6B, UE 1 is out of a coverage range of an SUL. When receiving a beam 2, the UE 1 determines that a validity identifier of an SUL threshold is invalid, and may initiate random access over an NUL.

Example 2

TABLE 5.2

| Beam | SUL configuration information |
|---|---|
| SIB-beam 1 | RACH-ConfigCommon: SUL config rsrp-ThresholdSSB-SUL1 |
| SIB-beam 2 | RACH-ConfigCommon: SUL config rsrp-ThresholdSSB-SUL2 |

A difference between Example 2 and Example 1 in this embodiment lies in that, in a SIB sent by the first network device by using the beam 2, the SUL threshold included in the SUL configuration information is 0.

FIG. 6B is a schematic diagram of a scenario of random access according to an example of this application. As shown in FIG. 6B, in an area not covered by the SUL, the SUL threshold is 0, and the UE 1 is out of the range covered by the SUL. When the UE 1 receives the beam 2, UE 2 measures RSRP of an NDL in an area in which the UE 2 is located, and determines that the SUL threshold is 0. The UE 1 compares the RSRP of the NDL with the SUL threshold, and if determining that the RSRP of the NDL is greater than the SUL threshold, may initiate the random access over the NUL.

Figure 7:
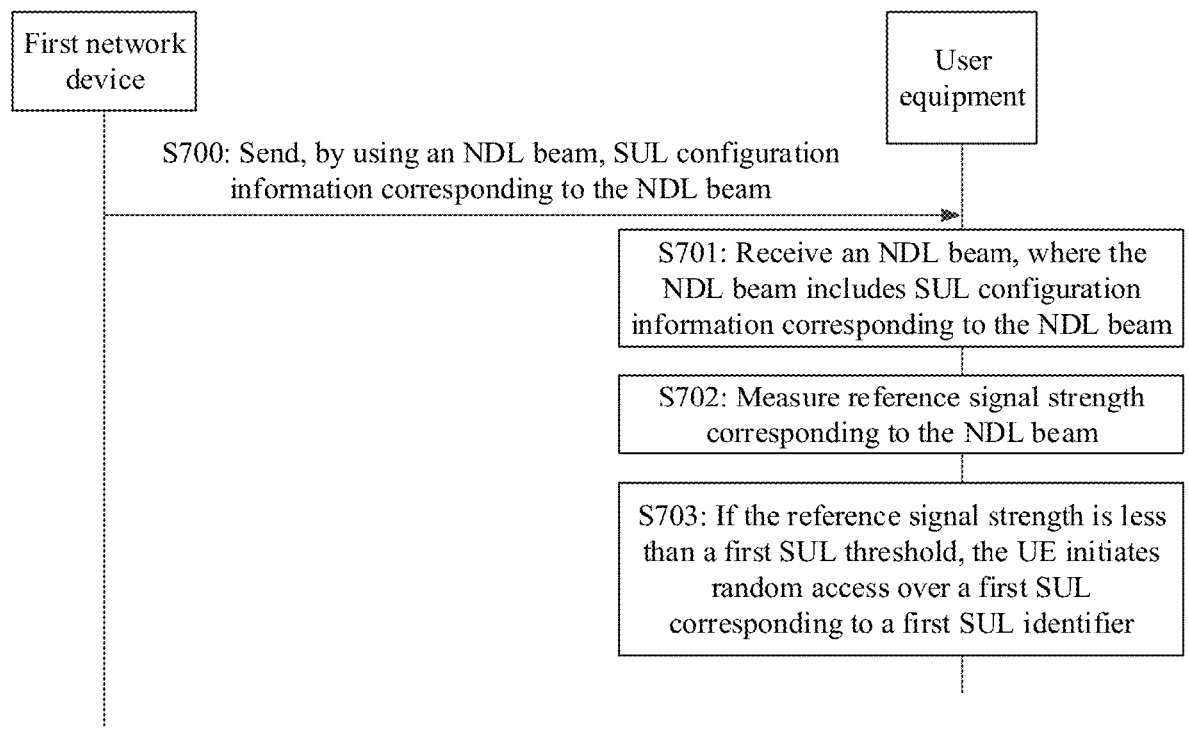
FIG. 7 is an interaction diagram of a random access method according to an embodiment of this application.

FIG. 7 is an interaction diagram of a random access method according to an embodiment of this application.

An embodiment of this application provides a random access method, which may be applied to a first network device. As shown in FIG. 7, the method may include the following steps. Step S700: The first network device sends, by using a normal downlink NDL beam, supplementary uplink SUL configuration information corresponding to the NDL beam, so that UE measures reference signal strength corresponding to the NDL beam, and if the reference signal strength is less than a first SUL threshold, the UE initiates random access over a first SUL corresponding to a first SUL identifier (for a specific process of the UE, refer to descriptions in steps S701 to S703).

The SUL configuration information includes an SUL identifier of at least one SUL and at least one SUL threshold, and different NDL beams correspond to different SUL configuration information. The at least one SUL is an SUL provided by a second network device, the SUL identifier of the at least one SUL includes a first SUL identifier, and the at least one SUL threshold includes a first SUL threshold corresponding to the first SUL identifier.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access.

In a possible implementation, the first network device is a base station, a small cell, or another user equipment. For example, the first network device may be an NR base station. The first network device may send an NDL beam to the UE. The NDL beam includes SUL configuration information corresponding to the NDL beam, and SIBs in different NDL beams include different SUL configuration information. Because NDL beams received by the UE in different areas are different, the UE may distinguish between the accessed SULs based on the NDL beams, as shown in Embodiment 1 of this application.

In a possible implementation, SUL configuration information of one NDL beam may include one SUL and one SUL threshold, as shown in Example 1 of Embodiment 1.

In another possible implementation, SUL configuration information of one NDL beam may include SUL identifiers of a plurality of SULs and a plurality of SUL thresholds. The plurality of SUL thresholds may be the same or different. The SUL configuration information further includes one or a combination of the following parameters of each SUL: a first validity identifier and priority information, for example, as shown in Example 2, Example 3, and Example 4 of Embodiment 1.

In a possible implementation, when the SUL configuration information includes a plurality of SULs, the NDL beam may further include an SSB index, different NDL beams include different SSB indexes, and the SSB index indicates an SUL used to initiate random access. The NDL beam may include one or more SSB indexes, as described in Example 1 and Example 2 of Embodiment 2.

In a possible implementation, when the SUL configuration information includes a plurality of SULs, the NDL beam may include an SSB index, and each piece of SUL configuration information may further include one or a combination of a plurality of parameters of a validity identifier and priority information. In other words, when receiving the SUL configuration information, the UE may select an SUL based on one or a combination of a plurality of parameters of the SSB index, the validity identifier, and the priority information in the beam, to initiate random access, as described in Example 3 of Embodiment 2.

The SUL may be flexibly configured with reference to the validity identifier, the priority information, and the SSB index, so that the UE may select the accessed SUL based on different scenarios.

In a possible implementation, the SUL configuration information further includes a second validity identifier of the SUL threshold, where the second validity identifier may be valid or invalid. In an area not covered by the SUL, in a SIB of the NDL beam sent by the first network device, the SUL threshold included in the SUL configuration information may be invalid. In this way, the UE may initiate the random access over the NUL. This may be used to distinguish between an area covered by the SUL and the area not covered by the SUL, to resolve a problem that the area not covered by the SUL cannot be distinguished by using a single RSRP threshold, as described in Embodiment 5.

An embodiment of this application further provides a random access method, which may be applied to UE. As shown in FIG. 7, the method may include the following steps.

Step S701: The user equipment UE receives a normal downlink NDL beam, where the NDL beam includes supplementary uplink SUL configuration information corresponding to the NDL beam.

NDL beams received by the UE in different areas are different, different NDL beams include different SUL configuration information, and the SUL configuration information includes an SUL identifier of at least one SUL and at least one SUL threshold. The NDL beam is a beam sent by the first network device, and the at least one SUL is an SUL provided by a second network device. The SUL identifier of the at least one SUL includes a first SUL identifier, and the at least one SUL threshold includes a first SUL threshold corresponding to the first SUL identifier.

Step S702: The UE measures reference signal strength corresponding to the NDL beam.

Step S703: If the reference signal strength is less than the first SUL threshold, the UE initiates random access over a first SUL corresponding to the first SUL identifier.

In a possible implementation, SUL configuration information of one NDL beam may include one SUL and one SUL threshold, as shown in Example 1 of Embodiment 1. The NDL beams received by the UE in different areas are different, and different NDL beams include different SUL configuration information. The UE selects, based on the received SUL configuration information and the measured reference signal strength, the SUL configured in the SUL configuration information for access. Details are not described again. In another possible implementation, SUL configuration information of one NDL beam may include SUL identifiers of a plurality of SULs and a plurality of SUL thresholds. The plurality of SUL thresholds may be the same or different. The SUL configuration information further includes one or a combination of the following parameters of each SUL: a first validity identifier and priority information, for example, as shown in Example 2, Example 3, and Example 4 of Embodiment 1. When receiving the beams, by measuring reference signal strength of the NDL, the UE may select an SUL from the plurality of SULs based on the reference signal strength of the NDL, the SUL thresholds, and the validity identifier and/or the priority information of each SUL, to initiate random access.

In another possible implementation, when the SUL configuration information includes a plurality of SULs, the NDL beam may further include an SSB index, different NDL beams include different SSB indexes, and the SSB index indicates an SUL used to initiate random access. The NDL beam may include one or more SSB indexes, as described in Example 1 and Example 2 of Embodiment 2. Each piece of SUL configuration information may further include one or a combination of a plurality of parameters of a validity identifier and priority information. In other words, when receiving the SUL configuration information, the UE may select an SUL based on one or a combination of a plurality of parameters of the SSB index, the validity identifier, and the priority information in the beam, to initiate random access, as described in Example 3 of Embodiment 2.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access.

In comparison with the examples shown in FIG. 3A and FIG. 2B, the user equipment in FIG. 3A may select, based on a relationship between the measured reference signal strength and the SUL thresholds, an SUL cell configured in the NDL beam in which the user equipment is located to initiate random access. However, in the example shown in FIG. 2B, the user equipment cannot distinguish between three different SULs. Therefore, according to the random access method in this application, a technical problem that different SULs cannot be distinguished from each other by using a single RSRP threshold can be resolved.

In a possible implementation, the SUL configuration information includes SUL identifiers of a plurality of SULs and a plurality of SUL thresholds, and the SUL configuration information further includes a first validity identifier and/or priority information of each SUL; and the SUL corresponding to the first SUL identifier has a valid first validity identifier and/or a highest priority. For a specific implementation, refer to Example 2, Example 3, and Example 4 in Embodiment 1.

In a possible implementation, the SUL configuration information includes SUL identifiers of a plurality of SULs and a plurality of SUL thresholds, the NDL beam further includes an SSB index, different NDL beams received by the UE include different SSB indexes, and the SSB index indicates the first SUL. In a possible implementation, the first SUL identifier is a remainder between a value of the SSB index and a total quantity of the plurality of SULs, or the first SUL identifier is a value of the SSB index. For a specific implementation, refer to Example 1, Example 2, and Example 3 in Embodiment 2. The SUL may be flexibly configured with reference to the validity identifier, the priority information, and the SSB index, so that the UE may select the accessed SUL based on different scenarios.

In a possible implementation, the SUL configuration information further includes a second validity identifier of the at least one SUL threshold, and the method further includes: initiating random access over the NUL if the second validity identifier of the SUL threshold is invalid or the SUL threshold is 0 or a negative value. For a specific implementation, refer to Embodiment 5. In an area not covered by the SUL, in a SIB of the NDL beam sent by the first network device, the SUL threshold included in the SUL configuration information may be invalid. In this way, the UE may initiate the random access over the NUL. This may be used to distinguish between an area covered by the SUL and the area not covered by the SUL, to resolve a problem that the area not covered by the SUL cannot be distinguished by using a single RSRP threshold.

Figure 8:
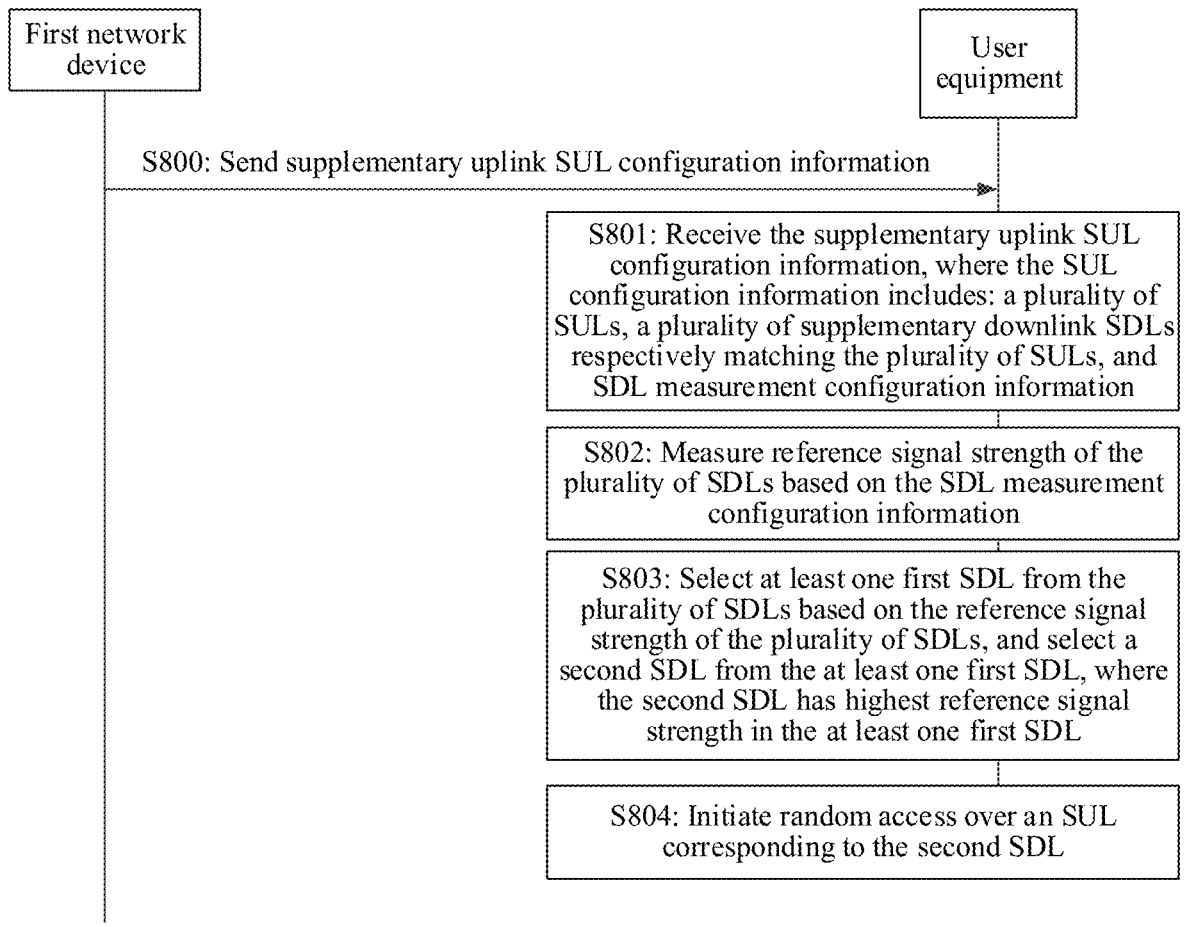
FIG. 8 is an interaction diagram of a random access method according to another embodiment of this application.

FIG. 8 is an interaction diagram of a random access method according to another embodiment of this application. This application further provides a random access method, which may be applied to a first network device. As shown in FIG. 8, the method may include the following steps.

Step S800: Send supplementary uplink SUL configuration information. The SUL configuration information may include: a plurality of SULs, a plurality of SDLs respectively matching the plurality of SULs, and SDL measurement configuration information, so that user equipment UE measures reference signal strength of the plurality of SDLs based on the SDL measurement configuration information, and initiates random access over an SUL corresponding to a second SDL, where the second SDL has highest reference signal strength in at least one first SDL, and the at least one first SDL is selected by the UE from the plurality of SDLs based on the reference signal strength of the plurality of SDLs.

This application further provides a random access method, which may be applied to user equipment. As shown in FIG. 8, the method may include the following steps:

S801: The user equipment UE receives the supplementary uplink SUL configuration information, where the SUL configuration information includes a plurality of SULs, a plurality of supplementary downlink SDLs respectively matching the plurality of SULs, and SDL measurement configuration information.

S802: The UE measures reference signal strength of the plurality of SDLs based on the SDL measurement configuration information.

S803: The UE selects at least one first SDL from the plurality of SDLs based on the reference signal strength of the plurality of SDLs, and selects a second SDL from the at least one first SDL, where the second SDL has highest reference signal strength in the at least one first SDL.

S804: The UE initiates random access over an SUL corresponding to the second SDL.

The first network device configures the plurality of SULs and the plurality of SDLs in pairs (a plurality of pairs of SULs and SDLs) and the SDL measurement configuration information corresponding to the SDLs, so that the UE may measure the reference signal strength of the SDLs based on the SDL measurement configuration information, and select the SUL based on the reference signal strength of the SDLs to initiate the random access. In this way, the UE may distinguish between different SULs according to a selection policy, and a technical problem that different SULs cannot be distinguished from each other by using a single RSRP threshold can be resolved.

In a possible implementation, in step S800, the sending SUL configuration information may include: omnidirectionally broadcasting the SUL configuration information. In step S801, that the UE receives SUL configuration information may include: The UE receives the broadcast SUL configuration information.

In a possible implementation, the SUL configuration information further includes NDL measurement configuration information, and the method further includes: The UE measures reference signal strength of a normal downlink NDL. That the UE selects at least one first SDL from the plurality of SDLs based on the reference signal strength of the plurality of SDLs includes: The UE selects the at least one first SDL from the plurality of SDLs based on the reference signal strength of the plurality of SDLs and the reference signal strength of the NDL, where reference signal strength of the at least one first SDL is greater than the reference signal strength of the NDL, as shown in Example 1 of Embodiment 3.

In this embodiment, the SUL configuration information may further include: a normal downlink NDL threshold and/or a plurality of SDL thresholds. After receiving the SUL configuration information, the UE measures the reference signal strength of the plurality of SDLs, and may select the at least one first SDL from the plurality of SDLs based on the reference signal strength of the plurality of SDLs and one or a combination of the following parameters: the NDL threshold and the plurality of SDL thresholds.

With reference to the NDL threshold, a distance from the UE to the network device that provides an NUL resource can be more accurately determined, and a more appropriate UL is selected to initiate the random access. With reference to the SDL thresholds, some SULs that cannot provide services can be filtered out, and a finally accessed SUL may be selected from SULs that can provide the services. This can improve access efficiency.

In a possible implementation, the SUL configuration information further includes an NDL threshold, and the method further includes: The UE measures reference signal strength of a normal downlink NDL, where when the reference signal strength of the NDL is less than the NDL threshold, an SDL whose reference signal strength is measured is the at least one first SDL, as shown in Example 2 of Embodiment 3.

In a possible implementation, the SUL configuration information further includes an NDL threshold and SDL thresholds corresponding to the SDLs, and the method further includes: The UE measures reference signal strength of a normal downlink NDL. When reference signal strength of the at least one first SDL is greater than the corresponding SDL threshold, the selecting a second SDL from the at least one first SDL includes: If the reference signal strength of the NDL is less than the NDL threshold, the UE selects the second SDL with the highest reference signal strength from the at least one first SDL to initiate random access, as shown in Example 4 of Embodiment 3.

In a possible implementation, the SUL configuration information includes SDL thresholds corresponding to the SDLs, and the method further includes: The UE measures reference signal strength of a normal downlink NDL. That the UE selects at least one first SDL from the plurality of SDLs based on the reference signal strength of the plurality of SDLs includes: The UE selects the at least one first SDL from the plurality of SDLs based on the reference signal strength of the plurality of SDLs, the SDL thresholds, and the reference signal strength of the NDL, where reference signal strength of the at least one first SDL is greater than corresponding SDL thresholds, and is greater than the reference signal strength of the NDL, as shown in Example 3 of Embodiment 3.

In a possible implementation, in step S800, the sending SUL configuration information may include: sending, by using an NDL beam, SUL configuration information corresponding to the NDL beam, where the SUL configuration information corresponding to the NDL beam includes one SUL, one SDL matching the SUL, and SDL measurement configuration information, where different NDL beams correspond to different SUL configuration information. In step S801, that the UE receives SUL configuration information may include: The UE receives a normal downlink NDL beam, where the NDL beam includes SUL configuration information corresponding to the NDL beam. In this implementation, the SUL configuration information may further include NDL measurement configuration information, and the method may further include: The UE measures reference signal strength of a normal downlink NDL. That the UE selects at least one first SDL from the plurality of SDLs based on the reference signal strength of the plurality of SDLs includes: The UE selects the at least one first SDL from the plurality of SDLs based on the reference signal strength of the plurality of SDLs and the reference signal strength of the NDL, where reference signal strength of the at least one first SDL is greater than the reference signal strength of the NDL. For details, refer to Example 1 of Embodiment 4.

Different SUL configuration information is configured in different NDL beams, in other words, different SUL cells are configured in different NDL beams. In this way, after receiving the NDL beams, the UE located within coverage ranges of different NDL beams may select an SUL configured in the NDL beam to initiate the random access. Different SULs are distinguished from each other by using different beams. According to the random access method provided in this embodiment of this application, a technical problem that different SULs cannot be distinguished from each other by using a single RSRP threshold can be resolved.

In a possible implementation, the SUL configuration information corresponding to the NDL beam includes one SUL, one SDL matching the SUL, and SDL measurement configuration information, the SUL configuration information corresponding to the NDL beam further includes: an NDL threshold and/or an SDL threshold. After receiving the NDL beam, the UE measures reference signal strength of the SDL based on the SDL measurement configuration information, and may further measure reference signal strength of an NDL. The UE may select a UL for random access based on the measured reference signal strength of the SDL and the measured reference signal strength of the NDL with reference to the NDL threshold and/or the SDL threshold. For details, refer to Example 2, Example 3, and Example 4 of Embodiment 4.

With reference to the NDL threshold, a distance from the UE to the network device that provides an NUL resource can be more accurately determined, and a more appropriate UL is selected to initiate the random access. With reference to the SDL thresholds, some SULs that cannot provide services can be filtered out, and a finally accessed SUL may be selected from SULs that can provide the services. This can improve access efficiency.

In a possible implementation, in step S800, the sending SUL configuration information may include: sending, by using an NDL beam, SUL configuration information corresponding to the NDL beam, where the SUL configuration information corresponding to the NDL beam includes a plurality of SUL, a plurality of SDLs respectively matching the plurality of SULs, and SDL measurement configuration information; and the NDL beam further includes an SSB index, different NDL beams include different SSB indexes, and the SSB index indicates an SUL used to initiate random access; and/or the SUL configuration information corresponding to the NDL beam further includes one or a combination of the following parameters of each SUL: a validity identifier and priority information.

In this implementation, in step S803, that the UE selects at least one first SDL from the plurality of SDLs based on the reference signal strength of the plurality of SDLs may include: The UE selects the at least one first SDL from the plurality of SDLs based on the reference signal strength of the plurality of SDLs and one or a combination of the following parameters: the SSB index, the validity identifier, and the priority information, where an SUL corresponding to the first SDL is the SUL indicated by the SSB index, and has a valid validity identifier or a highest priority.

In this implementation, the SUL configuration information corresponding to the NDL beam may further include: an NDL threshold and/or an SDL threshold. In step S803, that the UE selects at least one first SDL from the plurality of SDLs based on the reference signal strength of the plurality of SDLs may include: The UE selects the at least one first SDL from the plurality of SDLs based on the reference signal strength of the plurality of SDLs and one or a combination of the following parameters: the NDL threshold, the SDL threshold, the SSB index, the validity identifier, and the priority information.

For details, refer to Example 5, Example 6, Example 7, and Example 8 in Embodiment 4. Details are not described again. The SUL may be flexibly configured with reference to the validity identifier, the priority information, and the SSB index, so that the UE may select the accessed SUL based on different scenarios.

Figure 9:
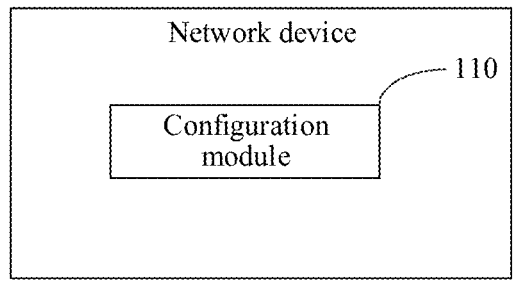
FIG. 9 is a block diagram of a random access apparatus according to an embodiment of this application.

FIG. 9 is a block diagram of a random access apparatus according to an embodiment of this application. The random access apparatus shown in FIG. 9 may be applied to a network device, and is configured to perform step S800 in FIG. 8. The apparatus includes: a configuration module 110, configured to send supplementary uplink SUL configuration information, where the SUL configuration information includes a plurality of SULs, a plurality of SDLs respectively matching the plurality of SULs, and SDL measurement configuration information, so that the user equipment UE measures reference signal strength of the plurality of SDLs based on the SDL measurement configuration information, and initiates random access over an SUL corresponding to a second SDL, where the second SDL has highest reference signal strength in at least one first SDL, and the at least one first SDL is selected by the UE from the plurality of SDLs based on the reference signal strength of the plurality of SDLs. For details, refer to Embodiment 3 and Embodiment 4.

In a possible implementation, the configuration module 110 includes: a broadcast unit, configured to omnidirectionally broadcast the SUL configuration information. In this implementation, the SUL configuration information may further include: a normal downlink NDL threshold and/or a plurality of SDL thresholds. For details, refer to Embodiment 3.

In a possible implementation, the configuration module 110 includes: a first sending unit, configured to send, to the UE by using an NDL beam, SUL configuration information corresponding to the NDL beam, where the SUL configuration information corresponding to the NDL beam includes one SUL, one SDL matching the SUL, and SDL measurement configuration information, where different NDL beams correspond to different SUL configuration information. In this implementation, the SUL configuration information corresponding to the NDL beam may further include: an NDL threshold and/or an SDL threshold. For details, refer to Embodiment 4.

In a possible implementation, the configuration module 110 includes: a second sending unit, configured to send, by using an NDL beam, SUL configuration information corresponding to the NDL beam, where the SUL configuration information corresponding to the NDL beam includes a plurality of SUL, a plurality of SDLs respectively matching the plurality of SULs, and SDL measurement configuration information; and the NDL beam further includes an SSB index, different NDL beams include different SSB indexes, and the SSB index indicates an SUL used to initiate random access; and/or the SUL configuration information corresponding to the NDL beam further includes one or a combination of the following parameters of each SUL: a validity identifier and priority information. In this implementation, the SUL configuration information corresponding to the NDL beam may further include: an NDL threshold and/or an SDL threshold. For details, refer to Embodiment 4.

Figure 10:
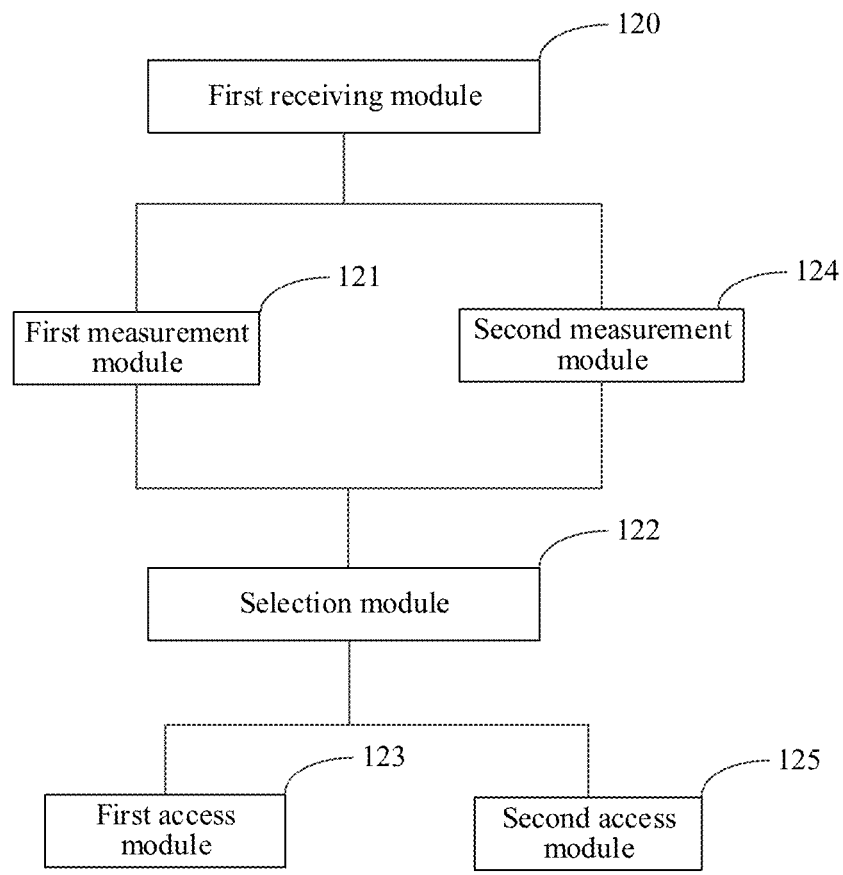
FIG. 10 is a block diagram of a random access apparatus according to an embodiment of this application.

FIG. 10 is a block diagram of a random access apparatus according to an embodiment of this application. The random access apparatus shown in FIG. 10 may be applied to user equipment UE. The random access apparatus may include:

a first receiving module 120, configured to receive supplementary uplink SUL configuration information, where the SUL configuration information includes a plurality of SULs, a plurality of supplementary downlink SDLs respectively matching the plurality of SULs, and SDL measurement configuration information;

a first measurement module 121, configured to measure reference signal strength of the plurality of SDLs based on the SDL measurement configuration information;

a selection module 122, configured to select at least one first SDL from the plurality of SDLs based on the reference signal strength of the plurality of SDLs, and select a second SDL from the at least one first SDL, where the second SDL has highest reference signal strength in the at least one first SDL; and a first access module 123, configured to initiate random access over an SUL corresponding to the second SDL.

In a possible implementation, the first receiving module 120 includes: a first receiving unit, configured to receive a normal downlink NDL beam, where the NDL beam includes SUL configuration information corresponding to the NDL beam, and the SUL configuration information corresponding to the NDL beam includes one SUL, one SDL matching the one SUL, and SDL measurement configuration information.

In a possible implementation, the SUL configuration information corresponding to the NDL beam includes a plurality of SULs, a plurality of SDLs respectively matching the plurality of SULs, and SDL measurement configuration information; and the NDL beam further includes an SSB index, different NDL beams include different SSB indexes, and the SSB index indicates an SUL used to initiate random access; and/or the SUL configuration information corresponding to the NDL beam further includes one or a combination of the following parameters of each SUL: a validity identifier and priority information.

In a possible implementation, the selection module 122 includes: a first selection unit, configured to select the at least one first SDL from the plurality of SDLs based on the reference signal strength of the plurality of SDLs and one or a combination of the following parameters: the SSB index, the validity identifier, and the priority information, where an SUL corresponding to the first SDL is the SUL indicated by the SSB index, and has a valid validity identifier or a highest priority.

In a possible implementation, the first receiving module 120 includes: a second receiving unit, configured to receive the SUL configuration information broadcast by the network device.

In a possible implementation, the SUL configuration information further includes NDL measurement configuration information, and the apparatus further includes: a second measurement module 124, configured to measure reference signal strength of a normal downlink NDL. The selection module 122 includes: a second selection unit, configured to select the at least one first SDL from the plurality of SDLs based on the reference signal strength of the plurality of SDLs and the reference signal strength of the NDL, where reference signal strength of the at least one first SDL is greater than the reference signal strength of the NDL.

In a possible implementation, the apparatus further includes: a second access module 125, configured to initiate random access over the NUL if the reference signal strength of the plurality of SDLs is not measured, or the measured reference signal strength of the plurality of SDLs is less than or equal to the reference signal strength of the NDL, and the reference signal strength of the NDL is measured.

In a possible implementation, the SUL configuration information further includes an NDL threshold, and when the reference signal strength of the NDL is less than the NDL threshold, an SDL whose reference signal strength is measured is the at least one first SDL.

In a possible implementation, the second access module 125 is further configured to initiate random access over the NUL if the reference signal strength of the NDL is not less than the NDL threshold. If the reference signal strength of the plurality of SDLs is not measured, and the reference signal strength of the NDL is measured, the UE initiates the random access over the NUL.

In a possible implementation, the SUL configuration information further includes an NDL threshold and SDL thresholds corresponding to the SDLs. When reference signal strength of the at least one first SDL is greater than the corresponding SDL threshold, the selection module 122 includes: a third selection unit, configured to, if the reference signal strength of the NDL is less than the NDL threshold, select the second SDL with the highest reference signal strength from the at least one first SDL.

In a possible implementation, the second access module 125 is further configured to initiate random access over the NUL if the reference signal strength of the plurality of SDLs is not measured, or the measured reference signal strength of the plurality of SDLs is less than or equal to the corresponding SDL thresholds, and the reference signal strength of the NDL is measured.

In a possible implementation, the SUL configuration information includes SDL thresholds corresponding to the SDLs, and the selection module 122 includes: a fourth selection unit, configured to select the at least one first SDL from the plurality of SDLs based on the reference signal strength of the plurality of SDLs, the SDL thresholds, and the reference signal strength of the NDL, where reference signal strength of the at least one first SDL is greater than corresponding SDL thresholds, and is greater than the reference signal strength of the NDL.

In a possible implementation, the second access module 125 is further configured to initiate random access over the NUL if the reference signal strength of the plurality of SDLs is not measured, or the measured reference signal strength of the plurality of SDLs is less than or equal to the corresponding SDL thresholds, or the measured reference signal strength of the plurality of SDLs is less than reference signal strength of the NDL, and the reference signal strength of the NDL is measured.

Figure 11:
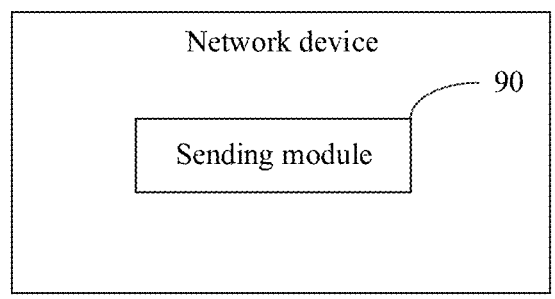
FIG. 11 is a block diagram of a random access apparatus according to an embodiment of this application.

FIG. 11 is a block diagram of a random access apparatus according to an embodiment of this application. The random access apparatus shown in FIG. 11 may be applied to a network device. The apparatus may include:

a sending module 90, configured to send, by using a normal downlink NDL beam, supplementary uplink SUL configuration information corresponding to the NDL beam, where the SUL configuration information includes an SUL identifier of at least one SUL and at least one SUL threshold, and different NDL beams correspond to different SUL configuration information, where the at least one SUL is an SUL provided by a second network device; and the SUL identifier of the at least one SUL includes a first SUL identifier, and the at least one SUL threshold includes a first SUL threshold corresponding to the first SUL identifier, so that when the UE measures reference signal strength corresponding to the NDL beam, if the reference signal strength is less than the first SUL threshold, the UE initiates random access over a first SUL corresponding to the first SUL identifier.

In a possible implementation, the SUL configuration information includes SUL identifiers of a plurality of SULs and a plurality of SUL thresholds, and the SUL configuration information further includes one or a combination of the following parameters of each SUL: a first validity identifier and priority information; and/or the NDL beam further includes an SSB index, different NDL beams include different SSB indexes, and the SSB index indicates an SUL used to initiate random access.

In a possible implementation, the SUL configuration information further includes a second validity identifier of the SUL threshold.

Figure 12:
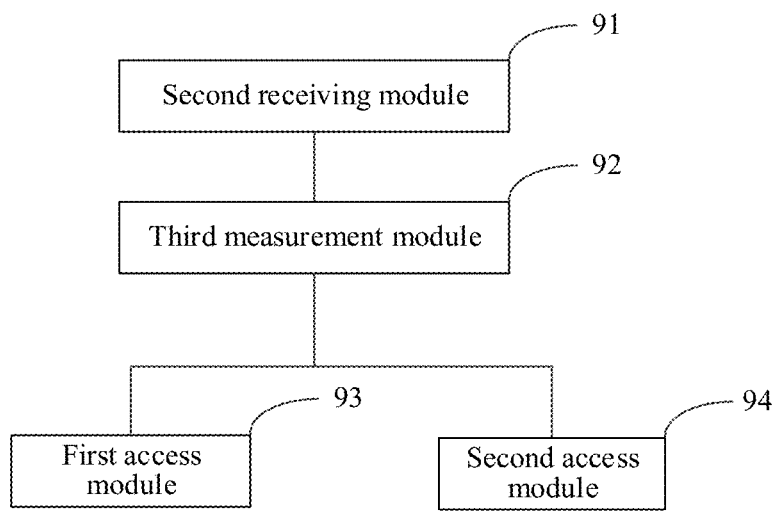
FIG. 12 is a block diagram of a random access apparatus according to an embodiment of this application.

FIG. 12 is a block diagram of a random access apparatus according to an embodiment of this application. The random access apparatus shown in FIG. 12 may be applied to user equipment UE. The apparatus may include:

a second receiving module 91, configured to receive a normal downlink NDL beam, where the NDL beam includes supplementary uplink SUL configuration information corresponding to the NDL beam, and the SUL configuration information includes an SUL identifier of at least one SUL and at least one SUL threshold, where the NDL beam is a beam sent by the first network device, and the at least one SUL is an SUL provided by a second network device; and the SUL identifier of the at least one SUL includes a first SUL identifier, and the at least one SUL threshold includes a first SUL threshold corresponding to the first SUL identifier;

a third measurement module 92, configured to measure reference signal strength corresponding to the NDL beam; and a first access module 93, configured to: if the reference signal strength is less than the first SUL threshold, initiate random access over a first SUL corresponding to the first SUL identifier.

In a possible implementation, NDL beams received by the UE in different areas are different, and different NDL beams include different SUL configuration information.

In a possible implementation, the first network device is a base station, a small cell, or another user equipment.

In a possible implementation, the SUL configuration information includes SUL identifiers of a plurality of SULs and a plurality of SUL thresholds, and the SUL configuration information further includes a first validity identifier and/or priority information of each SUL; and the SUL corresponding to the first SUL identifier has a valid first validity identifier and/or a highest priority.

In a possible implementation, the SUL configuration information includes SUL identifiers of a plurality of SULs and a plurality of SUL thresholds, the NDL beam further includes an SSB index, different NDL beams received by the UE include different SSB indexes, and the SSB index indicates the first SUL. In a possible implementation, the first SUL identifier is a remainder between a value of the SSB index and a total quantity of the plurality of SULs, or the first SUL identifier is a value of the SSB index.

In a possible implementation, the SUL configuration information further includes a second validity identifier of the at least one SUL threshold, and the apparatus further includes: a second access module 94, configured to initiate random access over the NUL if the second validity identifier of the SUL threshold is invalid or the SUL threshold is 0 or a negative value.

Figure 13:
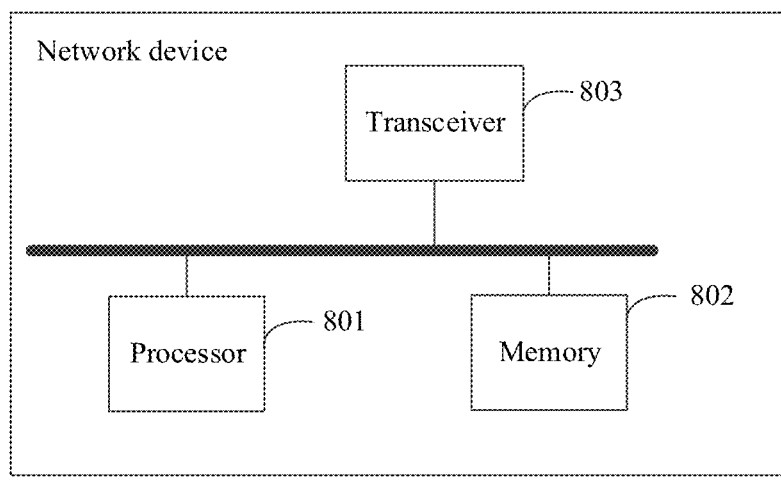
FIG. 13 is a block diagram of a network device according to an embodiment of this application.

FIG. 13 is a block diagram of a network device according to an embodiment of this application. The network device shown in FIG. 13 may be the first network device, the second network device, or the network device described above. As shown in FIG. 13, the network device may include a processor 801, a memory 802, a transceiver 803, and the like. The processor, the memory, and the transceiver may be connected through one or more buses. A function to be implemented by a sending module 90 or a configuration module 110 may be implemented by the transceiver 803 of the network device, or may be implemented by the processor 801 by controlling the transceiver 803.

The processor 801 is a control center of the network device, and is connected to all parts of the entire network device by using various interfaces and lines, and performs various functions of the network device and/or processes data by operating or executing a software program and/or a module stored in the memory 802 and invoking data stored in the memory. The processor may include an integrated circuit (integrated circuit, IC for short), for example, may include a single packaged IC or may include a plurality of connected packaged ICs with a same function or different functions. For example, the processor may include only a central processing unit (central processing unit, CPU for short), or may be a combination of a GPU, a digital signal processor (digital signal processor, DSP for short), and a control chip (for example, a baseband chip) in a transceiver. In an implementation of the present invention, the CPU may include a single operation core, or may include a plurality of operation cores.

The transceiver 803 is configured to establish a communication channel, so that the network device is connected to a receiving device through the communication channel, to implement data transmission between the network devices. The transceiver may include a communication module such as a wireless local area network (wireless local area network, WLAN for short) module, a Bluetooth module, or a baseband (baseband) module, and a radio frequency (radio frequency, RF for short) circuit corresponding to the communication module, and is configured to perform wireless local area network communication, Bluetooth communication, infrared communication, and/or cellular communication system communication, for example, wideband code division multiple access (wideband code division multiple access, WCDMA for short) and/or high speed downlink packet access (high speed downlink packet access, HSDPA for short). The transceiver is configured to control communication between components in the network device, and may support direct memory access (direct memory access).

In different implementations of the present invention, various transceivers in the transceiver 803 usually appear in a form of an integrated circuit chip (integrated circuit chip) and may be selectively combined, but does not need to include all transceivers and corresponding antenna groups. For example, the transceiver 803 may include only a baseband chip, a radio frequency chip, and a corresponding antenna, to provide a communication function in a cellular communication system. The network device may be connected to a cellular network (cellular network) or the internet (internet) through a wireless communication connection, for example, wireless local area network access or WCDMA access, that is established by the transceiver. In some optional implementations of the present invention, a communication module such as the baseband module in the transceiver may be integrated into the processor, typically, such as an APQ+MDM series platform provided by Qualcomm (qualcomm). The radio frequency circuit is configured to receive and send information, or receive and send a signal during a call. For example, the radio frequency circuit receives downlink information from a network device and then sends the downlink information to the processor for processing; and sends uplink-related data to the network device. Usually, the radio frequency circuit includes a well-known circuit configured to perform these functions, and includes but is not limited to, an antenna system, a radio frequency transceiver, one or more amplifiers, a tuner, one or more oscillators, a digital signal processor, a codec (codec) chipset, a subscriber identity module (SIM) card, and a memory. In addition, the radio frequency circuit may further communicate with a network and another device through wireless communication. The wireless communication may use any communication standard or protocol, including, but not limited to, a global system for mobile communications (global system of mobile communication, GSM for short), a general packet radio service (general packet radio service, GPRS for short), code division multiple access (code division multiple access, CDMA for short), wideband code division multiple access (wideband code division multiple access, WCDMA for short), a high speed uplink packet access (high speed uplink packet access, HSUPA for short) technology, long term evolution (long term evolution, LTE for short), an email, or a short message service (short message service, SMS for short).

An embodiment of this application provides a random access apparatus, including: a processor and a memory that is configured to store executable instructions of the processor, where the processor is configured to implement the foregoing method when executing the instructions.

An embodiment of this application provides a nonvolatile computer-readable storage medium, storing computer program instructions. When the computer program instructions are executed by a processor, the foregoing method is implemented.

An embodiment of this application provides a computer program product, including computer readable code or a nonvolatile computer-readable storage medium carrying computer readable code. When the computer readable code is run in a processor in an electronic device, the processor in the electronic device performs the foregoing method.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (non-exhaustive list) of the computer-readable storage media include: a portable computer disk, a hard disk, a random access memory (Random Access Memory, RAM), a read-only memory (Read-Only Memory, ROM), an erasable programmable read-only memory (Erasable Programmable Read-Only Memory, EPROM, or flash memory), a static random access memory (Static Random Access Memory, SRAM), a portable compact disk read-only memory (Compact Disc Read-Only Memory, CD-ROM), a digital versatile disk (Digital Versatile Disc, DVD), a memory stick, a floppy disk, a mechanical encoded device such as a punched card or a groove protrusion structure storing instructions on the punched card or the groove protrusion structure, and any suitable combination thereof.

The computer-readable program instructions or code described herein may be downloaded from the computer-readable storage medium to each computing/processing device, or downloaded to an external computer or an external storage device through a network, such as the internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from the network, and forwards the computer-readable program instructions for storage in a computer-readable storage medium in each computing/processing device.

The computer program instructions used to perform operations in this application may be assembly instructions, instruction set architecture (ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is used, the remote computer may be connected to a user computer through any type of network, including a local area network (LAN) or a wide area network (WAN), or may be connected to an external computer (for example, connected by using an Internet service provider through the Internet). In some embodiments, an electronic circuit, for example, a programmable logic circuit, a field-programmable gate array (FPGA), or a programmable logic array (PLA), is customized by using status information of computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block in the flowcharts and/or the block diagrams and a combination of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the accompanying drawings show system architectures, functions, and operations of possible implementations of apparatuses, systems, methods, and computer program products according to a plurality of embodiments of this application. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function used.

It should also be noted that each block in the block diagrams and/or the flowcharts and a combination of blocks in the block diagrams and/or the flowcharts may be implemented by hardware (for example, a circuit or an ASIC (Application-Specific Integrated Circuit, application-specific integrated circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, the disclosed content, and the appended claims. In the claims, "comprising" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Embodiments of this application are described above. The foregoing descriptions are examples, are not exhaustive, and are not limited to the disclosed embodiments. Many modifications and changes are apparent to a person of ordinary skill in the art without departing from the scope and spirit of the described embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. A terminal device, comprising:
   at least one processor; and
   a non-transitory memory coupled to the at least one processor and configured to store programming instructions that, when executed by the at least one processor, cause the terminal device to:
   receive supplementary uplink (SUL) configuration information, wherein the SUL configuration information comprises a plurality of SULs, a plurality of supplementary downlink (SDL) s respectively matching the plurality of SULs, and SDL measurement configuration information;
   measure reference signal strength of the plurality of SDLs based on the SDL measurement configuration information;
   select at least one first SDL from the plurality of SDLs based on the reference signal strength of the plurality of SDLs, and selecting a second SDL from the at least one first SDL, wherein the second SDL has highest reference signal strength in the at least one first SDL; and
   initiate random access over an SUL corresponding to the second SDL.

2. The terminal device of claim 1, wherein the receive SUL configuration information comprises:
   receive a normal downlink (NDL) beam, wherein the NDL beam comprises SUL configuration information corresponding to the NDL beam, and
   the SUL configuration information corresponding to the NDL beam comprises one SUL, one SDL matching the SUL, and SDL measurement configuration information.

3. The terminal device of claim 2, wherein the SUL configuration information corresponding to the NDL beam comprises a plurality of SULs, a plurality of SDLs respectively matching the plurality of SULs, and SDL measurement configuration information; and
   the NDL beam further comprises an SSB index, different NDL beams comprise different SSB indexes, and the SSB index indicates an SUL used to initiate random access.

4. The terminal device of claim 3, wherein the select at least one first SDL from the plurality of SDLs based on the reference signal strength of the plurality of SDLs comprises:
   select the at least one first SDL from the plurality of SDLs based on the reference signal strength of the plurality of SDLs and one or more of the following parameters: the SSB index, the validity identifier, and the priority information, wherein
   an SUL corresponding to the first SDL is the SUL indicated by the SSB index, and has a valid validity identifier or a highest priority.

5. The terminal device of claim 1, wherein the receiving SUL configuration information comprises:
   receive the broadcast SUL configuration information.

6. The terminal device of claim 1, wherein the SUL configuration information further comprises NDL measurement configuration information, and the programming instructions that, when executed by the at least one processor, further cause the terminal device to:
- measure reference signal strength of a normal downlink NDL; and
- the select at least one first SDL from the plurality of SDLs based on the reference signal strength of the plurality of SDLs comprises:
- select the at least one first SDL from the plurality of SDLs based on the reference signal strength of the plurality of SDLs and the reference signal strength of the NDL, wherein reference signal strength of the at least one first SDL is greater than the reference signal strength of the NDL.

7. The terminal device of claim 1, wherein the SUL configuration information further comprises an NDL threshold, and the programming instructions that, when executed by the at least one processor, further cause the terminal device to:
- measure reference signal strength of a normal downlink NDL, wherein
- when the reference signal strength of the NDL is less than the NDL threshold, an SDL whose reference signal strength is measured is the at least one first SDL.

8. The terminal device of claim 1, wherein the SUL configuration information further comprises an NDL threshold and SDL thresholds corresponding to the SDLs, and the programming instructions that, when executed by the at least one processor, further cause the terminal device to:
- measure reference signal strength of a normal downlink NDL; and
- when reference signal strength of the at least one first SDL is greater than the corresponding SDL threshold,
- the select a second SDL from the at least one first SDL comprises:
- when the reference signal strength of the NDL is less than the NDL threshold, select the second SDL with the highest reference signal strength from the at least one first SDL.

9. The terminal device of claim 1, wherein the SUL configuration information comprises SDL thresholds corresponding to the SDLs, and the programming instructions that, when executed by the at least one processor, further cause the terminal device to:
- measure reference signal strength of a normal downlink NDL; and
- the select at least one first SDL from the plurality of SDLs based on the reference signal strength of the plurality of SDLs comprises:
- select the at least one first SDL from the plurality of SDLs based on the reference signal strength of the plurality of SDLs, the SDL thresholds, and the reference signal strength of the NDL, wherein reference signal strength of the at least one first SDL is greater than corresponding SDL thresholds, and is greater than the reference signal strength of the NDL.

10. A base station device, comprising:
- at least one processor; and
- a non-transitory memory coupled to the at least one processor and configured to store programming instructions that, when executed by the at least one processor, cause the base station device to:
- send supplementary uplink (SUL) configuration information, wherein the SUL configuration information comprises a plurality of SULs, a plurality of supplementary downlink (SDL) s respectively matching the plurality of SULs, and SDL measurement configuration information, so that user equipment UE measures reference signal strength of the plurality of SDLs based on the SDL measurement configuration information, and initiates random access over an SUL corresponding to a second SDL, wherein the second SDL has highest reference signal strength in at least one first SDL, and the at least one first SDL is selected by the UE from the plurality of SDLs based on the reference signal strength of the plurality of SDLs.

11. The base station device of claim 10, wherein the send SUL configuration information comprises:
- omnidirectionally broadcast the SUL configuration information.

12. The base station device of claim 11, wherein the SUL configuration information further comprises at least one of a normal downlink (NDL) threshold and a plurality of SDL thresholds.

13. The base station device of claim 10, wherein the send SUL configuration information comprises:
- send SUL configuration information corresponding to the NDL beam by using an NDL beam, wherein the SUL configuration information corresponding to the NDL beam comprises one SUL, one SDL matching the SUL, and SDL measurement configuration information, wherein different NDL beams correspond to different SUL configuration information.

14. The base station device of claim 13, wherein the SUL configuration information corresponding to the NDL beam further comprises at least one of an NDL threshold and an SDL threshold.

15. The base station device of claim 10, wherein the send SUL configuration information comprises: send SUL configuration information corresponding to the NDL beam by using an NDL beam, wherein the SUL configuration information corresponding to the NDL beam comprises a plurality of SUL, a plurality of SDLs respectively matching the plurality of SULs, and SDL measurement configuration information; and
- the NDL beam further comprises an SSB index, different NDL beams comprise different SSB indexes, and the SSB index indicates an SUL used to initiate random access.

16. The base station device of claim 15, wherein the SUL configuration information corresponding to the NDL beam further comprises at least one of an NDL threshold and an SDL threshold.

17. A nonvolatile computer-readable storage medium, storing computer program instructions, wherein when the computer program instructions are executed by a processor, cause a device to:
- receive supplementary uplink (SUL) configuration information, wherein the SUL configuration information comprises a plurality of SULs, a plurality of supplementary downlink (SDL) s respectively matching the plurality of SULs, and SDL measurement configuration information;
- measure reference signal strength of the plurality of SDLs based on the SDL measurement configuration information;
- select at least one first SDL from the plurality of SDLs based on the reference signal strength of the plurality of SDLs, and selecting a second SDL from the at least one first SDL, wherein the second SDL has highest reference signal strength in the at least one first SDL; and initiate random access over an SUL corresponding to the second SDL.

18. The computer-readable storage medium of claim 17, wherein the receive SUL configuration information comprises:
- receive a normal downlink (NDL) beam, wherein the NDL beam comprises SUL configuration information corresponding to the NDL beam, and
- the SUL configuration information corresponding to the NDL beam comprises one SUL, one SDL matching the SUL, and SDL measurement configuration information.

19. The computer-readable storage medium of claim 18, wherein the SUL configuration information corresponding to the NDL beam comprises a plurality of SULs, a plurality of SDLs respectively matching the plurality of SULs, and SDL measurement configuration information; and
- the NDL beam further comprises an SSB index, different NDL beams comprise different SSB indexes, and the SSB index indicates an SUL used to initiate random access; or the SUL configuration information corresponding to the NDL beam further comprises one or more of the following parameters of each SUL: a validity identifier and priority information.

20. The computer-readable storage medium of claim 19, wherein the select at least one first SDL from the plurality of SDLs based on the reference signal strength of the plurality of SDLs comprises:
- select the at least one first SDL from the plurality of SDLs based on the reference signal strength of the plurality of SDLs and one or more of the following parameters: the SSB index, the validity identifier, and the priority information, wherein
- an SUL corresponding to the first SDL is the SUL indicated by the SSB index, and has a valid validity identifier or a highest priority.

\* \* \* \* \*